(12) United States Patent
Imazu et al.

(10) Patent No.: US 11,875,134 B2
(45) Date of Patent: Jan. 16, 2024

(54) INFORMATION PROCESSING DEVICE, INFORMATION PROCESSING METHOD, PROGRAM AND INFORMATION PROCESSING SYSTEM

(71) Applicant: TRIART, INC, Iizuka (JP)

(72) Inventors: Kentaro Imazu, Iizuka (JP); Akihiro Miyamoto, Iizuka (JP); Yusuke Nomura, Iizuka (JP)

(73) Assignee: TRIART, INC., Iizuka (JP)

( * ) Notice: Subject to any disclaimer, the term of this patent is extended or adjusted under 35 U.S.C. 154(b) by 847 days.

(21) Appl. No.: 16/963,520

(22) PCT Filed: Jan. 15, 2019

(86) PCT No.: PCT/JP2019/000872
§ 371 (c)(1),
(2) Date: Oct. 22, 2020

(87) PCT Pub. No.: WO2019/142767
PCT Pub. Date: Jul. 25, 2019

(65) Prior Publication Data
US 2021/0064337 A1     Mar. 4, 2021

(30) Foreign Application Priority Data
Jan. 22, 2018    (JP) ................. 2018-008069

(51) Int. Cl.
*G06F 7/48*     (2006.01)
*G06F 9/30*     (2018.01)
*G06F 9/54*     (2006.01)

(52) U.S. Cl.
CPC .............. *G06F 7/48* (2013.01); *G06F 9/3005* (2013.01); *G06F 9/542* (2013.01)

(58) Field of Classification Search
CPC .......... G06F 7/48; G06F 9/3005; G06F 9/542; G06F 9/5038; G06F 9/5066
(Continued)

(56) References Cited

U.S. PATENT DOCUMENTS

2002/0032716 A1   3/2002   Nagato
2002/0112060 A1   8/2002   Kato
(Continued)

FOREIGN PATENT DOCUMENTS

JP     10-313337 A     11/1998
JP     2002-092366 A    3/2002
(Continued)

OTHER PUBLICATIONS

English language abstract and machine-assisted English translation for JP 2004-023120 A extracted from espacenet.com database on Oct. 13, 2021, 11 pages.
(Continued)

*Primary Examiner* — Tan V Mai
(74) *Attorney, Agent, or Firm* — Howard & Howard Attorneys PLLC

(57) ABSTRACT

An information processing device is provided with a data receiving unit having a function of receiving first algorithm data that is data stating a first algorithm from a first information processing device, a computation execution unit having a function of executing computations based on the first algorithm stated in the first algorithm data received by the data receiving unit and using data stored in a first storage unit in the computations on a basis of the first algorithm data and the data stored in the first storage unit, and a data transmitting unit having a function of transmitting second algorithm data that is data stating a second algorithm according to the first algorithm to a second information processing device.

10 Claims, 26 Drawing Sheets

(58) Field of Classification Search
USPC .......................................................... 708/200
See application file for complete search history.

(56) References Cited

U.S. PATENT DOCUMENTS

| | | |
|---|---|---|
| 2002/0131448 A1 | 9/2002 | Shiba |
| 2014/0143757 A1 | 5/2014 | Buxbaum et al. |
| 2019/0196879 A1* | 6/2019 | Dutta .................... G06F 9/5083 |

FOREIGN PATENT DOCUMENTS

| | | |
|---|---|---|
| JP | 2002-108838 A | 4/2002 |
| JP | 2002-281036 A | 9/2002 |
| JP | 2002-325100 A | 11/2002 |
| JP | 2004-005230 A | 1/2004 |
| JP | 2004023120 A | 1/2004 |
| JP | 2006-309322 A | 11/2006 |
| JP | 2012248919 A | 12/2012 |

OTHER PUBLICATIONS

English language abstract and machine-assisted English translation for JP 2012-248919 A extracted from espacenet.com database on Oct. 13, 2021, 16 pages.
Wood et al.—Ethereum: A Secure Decentralised Generalised Transaction Ledger; EIP-150 Revision (1e18248—Apr. 12, 2017); 32 pages.
International Search Report (Internaional Application No. PCT/JP2019/000872); dated Feb. 2, 2019; 2 pages.

* cited by examiner

| INFORMATION PROCESSING DEVICE (IDENTIFICATION INFORMATION) | POWER (ON/OFF) | ATTRIBUTE α | ATTRIBUTE β | ... |
|---|---|---|---|---|
| 0001 | ON | α1 | β1 | ... |
| 0002 | ON | α2 | β2 | ... |
| 0003 | OFF | α3 | β3 | ... |
| ⋮ | ⋮ | ⋮ | ⋮ | ⋮ |

3011

_INFORMATION PROCESSING DEVICE, INFORMATION PROCESSING METHOD, PROGRAM AND INFORMATION PROCESSING SYSTEM_

TECHNICAL FIELD

The present invention relates to an information processing device, an information processing method, a program, and an information processing system.

This application is the National Stage of International Patent Application No. PCT/JP2019/000872, filed on Jan. 15, 2019, which claims the benefit of Japanese Patent Application No. 2018-008069 filed on Jan. 22, 2018, which are hereby incorporated by reference in their entirety.

BACKGROUND ART

In an information processing system provided with a large number of information processing devices on a network, an information processing device with server functions in some cases collects data stored in each of the other information processing devices and executes predetermined computations on the collected data. In other words, the server and the large number of clients deliver and collect data in a one-to-many relationship.

However, in an information processing system like the above, if an extremely large amount of data is stored by the large number of information processing devices, for example, collecting the data stored in all of the information processing devices and executing the predetermined computations becomes highly intensive for a single server device, causing enormous amounts of time and resources to be used.

Also, in an information processing system like the above, an information processing device other than the information processing device responsible for the server functions is unable to perform the computations.

Note that, as described in Non-Patent Literature 1, one example of the related technology is the technology called Ethereum (see Non-Patent Literature 1). This technology is related to a platform for executing distributed applications by using a blockchain.

However, the technology described in Non-Patent Literature 1 does not address problems of the related art like the above.

CITATION LIST

Non-Patent Literature

Non-Patent Literature 1: DR. GAVIN WOOD, FOUNDER, ETHEREUM & ETHCORE, "ETHEREUM: A SECURE DECENTRALISED GENERALISED TRANSACTION LEDGER" EIP-150 REVISION (759dccd-2017-08-07), [online], 2017 Aug. 7, [retrieved 2017 Dec. 6], Internet URL:https://ethereum.github.io/yellowpaper/paper.pdf

SUMMARY OF INVENTION

Technical Problem

As described above, in the related art, the efficiency of processing using data from a plurality of information processing devices may be inadequate in some cases.

In light of such circumstances, an embodiment of the present invention provides an information processing device, an information processing method, a program, and an information processing system capable of increasing the efficiency of executing predetermined computations using data from a plurality of information processing devices.

Solution to Problem

An information processing device according to an embodiment of the present invention is provided with: a data receiving unit having a function of receiving first algorithm data that is data stating a first algorithm from a first information processing device; a computation execution unit having a function of executing computations based on the first algorithm stated in the first algorithm data received by the data receiving unit and using data stored in a first storage unit in the computations on a basis of the first algorithm data and the data stored in the first storage unit; and a data transmitting unit having a function of transmitting second algorithm data that is data stating a second algorithm according to the first algorithm to a second information processing device, wherein the second algorithm data is transmitted to the second information processing device and at least one other information processing device, for the two or more information processing devices to which the second algorithm data is transmitted, a second computational result determination unit having a function of making a predetermined determination regarding data related to a result of the computations, is provided, and the second computational result determination unit has a function of performing a process on the data related to a result of the computations received from the two or more information processing devices to which the second algorithm data is transmitted in a branched manner from the information processing device different from the information processing device provided with the second computational result determination unit itself, the process being any of a process of determining a number of the information processing devices traversed after branching, and adopting a predetermined number of pieces of the data related to a result of the computations in order of the largest number of traversed information processing devices, a process of determining a time at which the data related to a result of the computations is received, and preferentially adopting the data related to a result of the computations having an earlier time, a process of determining a time at which the data related to a result of the computations is received, and preferentially adopting the data related to a result of the computations having a later time, and a process of determining whether or not a specific information processing device has been traversed after branching, and preferentially adopting the data related to a result of the computations that has traversed the specific information processing device.

An information processing device according to an aspect of the present invention may also be configured such that the data transmitting unit has a function of transmitting third algorithm data that is data stating an initial third algorithm to a next information processing device.

An information processing device according to an aspect of the present invention may also be configured such that the computation execution unit has a function of executing computations on a basis of a fourth algorithm, and the data transmitting unit has a function of treating an algorithm according to the fourth algorithm as the third algorithm, and transmitting the third algorithm data to the next information processing device.

An information processing device according to an aspect of the present invention may be further provided with a first route decision unit having a function of deciding all information processing devices to be included on a route along which an algorithm according to the third algorithm is transmitted and also deciding a sequence of transmission.

An information processing device according to an aspect of the present invention may also be configured such that the first route decision unit has a function of deciding the information processing devices and the sequence on a basis of an attribute of the information processing devices.

An information processing device according to an aspect of the present invention may also be configured such that the first route decision unit has a function of deciding the information processing devices and the sequence on a basis of any of a number of times that the information processing devices have participated in the transmission of the algorithm in the past, a number of responses to questions in the past, or a frequency of responses to questions in the past as the attribute of the information processing devices.

An information processing device according to an aspect of the present invention may be further provided with a second route decision unit having a function of deciding one or more information processing devices, including the second information processing device, to be included on a route along which an algorithm according to the second algorithm is transmitted and also deciding a sequence of transmission.

An information processing device according to an aspect of the present invention may also be configured such that the second route decision unit has a function of deciding the information processing devices and the sequence on a basis of an attribute of the information processing devices.

An information processing device according to an aspect of the present invention may also be configured such that the second route decision unit has a function of deciding the information processing devices and the sequence on a basis of any of a number of times that the information processing devices have participated in the transmission of the algorithm in the past, a number of responses to questions in the past, or a frequency of responses to questions in the past as the attribute of the information processing devices.

An information processing device according to an aspect of the present invention may also be configured such that the second algorithm is the same as the first algorithm. An information processing device according to an aspect of the present invention may also be configured such that the second algorithm is different from the first algorithm.

An information processing device according to an aspect of the present invention may also be configured such that the data receiving unit has a function of receiving data related to a result of computations in the first information processing device from the first information processing device.

An information processing device according to an aspect of the present invention may also be configured such that the data receiving unit has a function of receiving data related to a result of computations in the first information processing device and the first algorithm data simultaneously from the first information processing device.

An information processing device according to an aspect of the present invention may also be configured such that the data transmitting unit has a function of transmitting data related to a result of the computations by the computation execution unit to the second information processing device.

An information processing device according to an aspect of the present invention may also be configured such that the data transmitting unit has a function of transmitting data related to a result of the computations by the computation execution unit and the second algorithm data simultaneously to the second information processing device.

An information processing device according to an aspect of the present invention may be further provided with a first storage unit that stores data, wherein the computation execution unit has a function of executing the computations using the data stored in the first storage unit.

An information processing device according to an aspect of the present invention may also be configured such that the data transmitting unit has a function of transmitting data related to a result of the computations by the computation execution unit to one or more predetermined information processing devices treated as a notification target.

An information processing device according to an aspect of the present invention may also be configured such that the predetermined information processing device or devices at least includes an information processing device from which algorithm data originated.

An information processing device according to an aspect of the present invention may also be configured such that a first computational result determination unit having a function of determining whether or not to treat data related to a result of the computations by the computation execution unit as final data.

An information processing device according to an aspect of the present invention may also be configured such that the first computational result determination unit has a function of determining whether or not to treat data related to a result of the computations by the computation execution unit as final data by using a basis of determination that treats the data related to a result of the computations as the final data in a case in which a number of information processing devices that have already executed computations according to the algorithm is equal to a predetermined threshold or greater, or a basis of determination that treats the data related to a result of the computation by the computation execution unit as the final data in a case in which an amount of information included in the obtained result of the computations is equal to a predetermined threshold or greater.

An information processing device according to an aspect of the present invention may also be configured such that the data receiving unit receives data transmitted from another device, and the computation execution unit executes the computations on a basis of the data received from the other device by the data receiving unit.

An information processing device according to an aspect of the present invention may also be configured such that the other device is a device other than a target to which an algorithm is transmitted.

An information processing device according to an aspect of the present invention may be further provided with a second storage unit that stores some or all of the data received by the data receiving unit.

An information processing device according to an aspect of the present invention may be further provided with a third storage unit that stores some or all of the data transmitted by the data transmitting unit.

An information processing device according to an aspect of the present invention may also be configured such that the computation execution unit executes computations based on the first algorithm stated in the first algorithm data in response to the data receiving unit receiving the first algorithm data, and the data transmitting unit transmits the second algorithm data to the second information processing device in response to the computation execution unit executing the computations.

An information processing device according to an aspect of the present invention may also be configured such that the data receiving unit receives the first algorithm data together with a first parameter from the first information processing device, the computation execution unit uses the first parameter received by the data receiving unit in the computations based on the first algorithm stated in the first algorithm data, and the data transmitting unit transmits the second algorithm data together with a second parameter to the second information processing device.

An information processing method according to an embodiment of the present invention includes: receiving first algorithm data that is data stating a first algorithm from a first information processing device; executing computations based on the first algorithm stated in the received first algorithm data and using data stored in a first storage unit in the computations on a basis of the first algorithm data and the data stored in the first storage unit; transmitting second algorithm data that is data stating a second algorithm according to the first algorithm to a second information processing device and at least one other information processing device; and for the two or more information processing devices to which the second algorithm data is transmitted, performing a process on the data related to a result of the computations received from the two or more information processing devices to which the second algorithm data is transmitted in a branched manner from the information processing device different from the information processing device performing the process itself, the process being any of a process of determining a number of the information processing devices traversed after branching and adopting a predetermined number of pieces of the data related to a result of the computations in order of the largest number of traversed information processing devices, a process of determining a time at which the data related to a result of the computations is received and preferentially adopting the data related to a result of the computations having an earlier time, a process of determining a time at which the data related to a result of the computations is received and preferentially adopting the data related to a result of the computations having a later time, and a process of determining whether or not a specific information processing device has been traversed after branching and preferentially adopting the data related to a result of the computations that has traversed the specific information processing device.

A program according to an embodiment of the present invention is a program causing a computer included in an information processing device to perform: a function of receiving first algorithm data that is data stating a first algorithm from a first information processing device; a function of executing computations based on the first algorithm stated in the received first algorithm data and using data stored in a first storage unit in the computations on a basis of the first algorithm data and the data stored in the first storage unit; a function of transmitting second algorithm data that is data stating a second algorithm according to the first algorithm to a second information processing device and at least one other information processing device; and for the two or more information processing devices to which the second algorithm data is transmitted, a function of performing a process on the data related to a result of the computations received from the two or more information processing devices to which the second algorithm data is transmitted in a branched manner from the information processing device different from the information processing device performing the process itself, the process being any of a process of determining a number of the information processing devices traversed after branching and adopting a predetermined number of pieces of the data related to a result of the computations in order of the largest number of traversed information processing devices, a process of determining a time at which the data related to a result of the computations is received and preferentially adopting the data related to a result of the computations having an earlier time, a process of determining a time at which the data related to a result of the computations is received and preferentially adopting the data related to a result of the computations having a later time, and a process of determining whether or not a specific information processing device has been traversed after branching and preferentially adopting the data related to a result of the computations that has traversed the specific information processing device.

An information processing system according to an embodiment of the present invention is an information processing system provided with an information processing device, wherein the information processing device includes a data receiving unit having a function of receiving first algorithm data that is data stating a first algorithm from a first information processing device; a computation execution unit having a function of executing computations based on the first algorithm stated in the first algorithm data received by the data receiving unit and using data stored in a first storage unit in the computations on a basis of the first algorithm data and the data stored in the first storage unit; and a data transmitting unit having a function of transmitting second algorithm data that is data stating a second algorithm according to the first algorithm to a second information processing device, wherein the second algorithm data is transmitted to the second information processing device and at least one other information processing device, for the two or more information processing devices to which the second algorithm data is transmitted, a second computational result determination unit having a function of making a predetermined determination regarding data related to a result of the computations, is provided, and the second computational result determination unit has a function of performing a process on the data related to a result of the computations received from the two or more information processing devices to which the second algorithm data is transmitted in a branched manner from the information processing device different from the information processing device provided with the second computational result determination unit itself, the process being any of a process of determining a number of the information processing devices traversed after branching and adopting a predetermined number of pieces of the data related to a result of the computations in order of the largest number of traversed information processing devices, a process of determining a time at which the data related to a result of the computations is received and preferentially adopting the data related to a result of the computations having an earlier time, a process of determining a time at which the data related to a result of the computations is received and preferentially adopting the data related to a result of the computations having a later time, and a process of determining whether or not a specific information processing device has been traversed after branching and preferentially adopting the data related to a result of the computations that has traversed the specific information processing device.

Advantageous Effects of Invention

According to the information processing device, information processing method, program, and information processing system described above, it is possible to increase the efficiency of executing predetermined computations using data from a plurality of information processing devices.

DESCRIPTION OF EMBODIMENTS

Embodiments of the present invention will be described in detail and with reference to the drawings.

First Embodiment

Overview of Information Processing System

Figure 1:
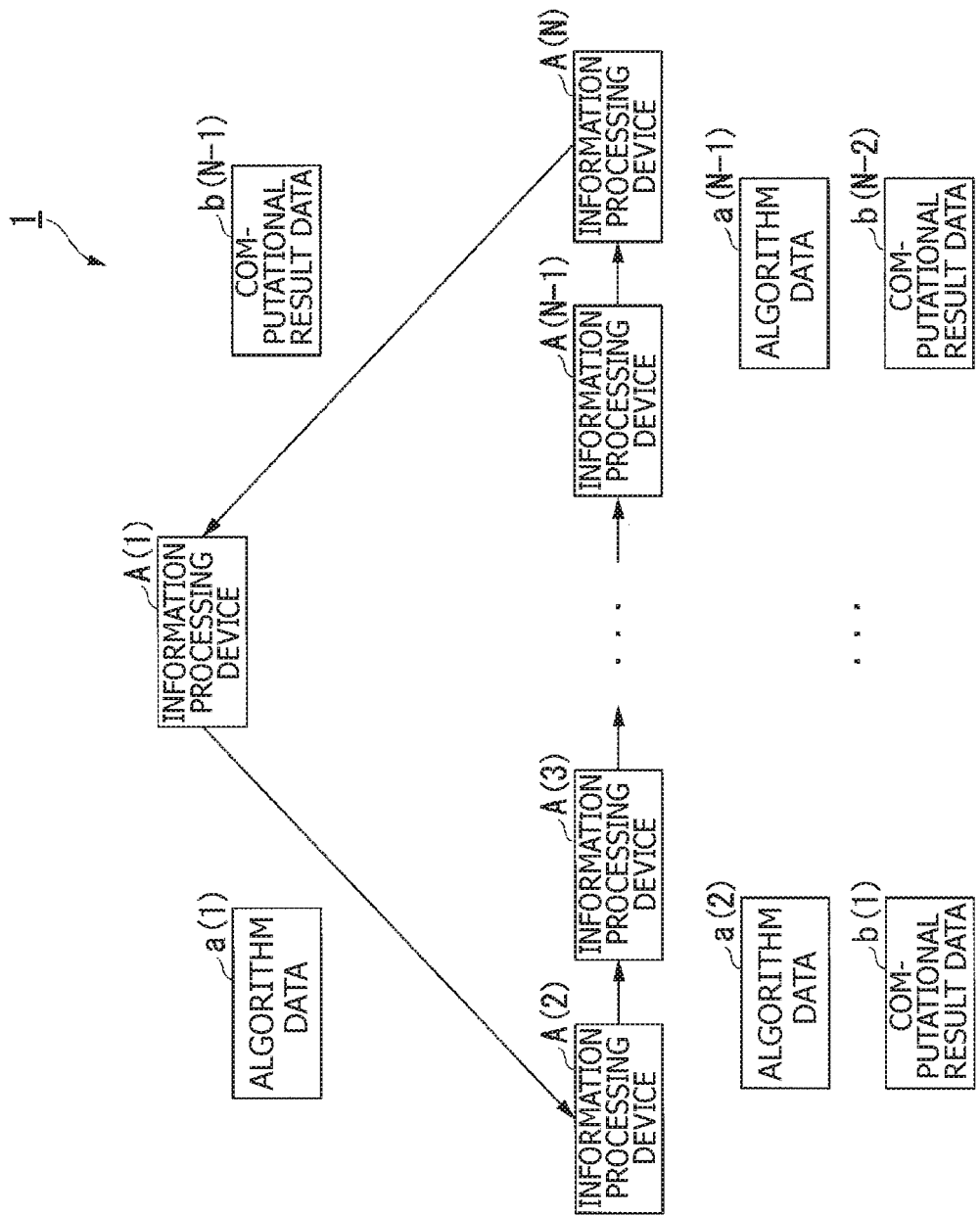
FIG. 1 is a diagram illustrating a schematic configuration example of an information processing system according to an embodiment (first embodiment) of the present invention.

FIG. 1 is a diagram illustrating a schematic configuration example of an information processing system 1 according to an embodiment (first embodiment) of the present invention.

The information processing system 1 according to the present embodiment is provided with N (in the present embodiment, N is taken to be an integer equal to or greater than 3) information processing devices A(1) to A(N).

Note that in FIG. 1, five or more information processing devices A(1) to A(N) are illustrated as an example for convenience, but situations where N=3 or N=4 are also possible.

Each of the information processing devices A(1) to A(N) includes a function of communicating with the other information processing devices A(1) to A(N) as communication peers. The communication may be wired communication, wireless communication, or both wired and wireless communication, for example.

Additionally, the communication performed by each of the information processing devices A(1) to A(N) may be 1:1 (P2P) communication, server-client communication, or some other method of communication. Also, the communication performed by each of the information processing devices A(1) to A(N) may be communication using a virtual private network (VPN), for example.

Each of the information processing devices A(1) to A(N) may be any of various types of devices. Each of the information processing devices A(1) to A(N) may be a device that lacks server functions or a device that includes server functions, for example. Each of the information processing devices A(1) to A(N) may be a computer such as a laptop computer, a desktop computer, a tablet computer, or a smartphone, for example, or may be another type of computer. The other type of computer may be a computer provided in a vehicle such as an automobile, for example. Each of the information processing devices A(1) to A(N) may be configured as a physical terminal or as a virtual terminal, for example. Each of the information processing devices A(1) to A(N) may be on an internal network or on the Internet, for example.

With regard to the types of such devices, the information processing devices A(1) to A(N) may be the same type of device or different types of devices, for example.

Also, each of the information processing devices A(1) to A(N) may be what is called an Internet of Things (IoT) or an information and communications technology (ICT) device, for example.

Furthermore, each of the information processing devices A(1) to A(N) may be managed by any person. Each of the information processing devices A(1) to A(N) may be managed by an individual (for example, an owner) or by an organization (for example, an owning organization or the like), for example. With regard to the types of such administrators, the information processing devices A(1) to A(N) may be managed by the same type of person or by different types of persons, for example.

Overview of Operations by Information Processing System

FIG. 1 will be referenced to illustrate an overview of operations performed in the information processing system 1 according to the present embodiment.

In the present embodiment, one information processing device A(1) (referred to as the "first information processing device A(1)" for convenience) acts as the leader and sets the second to Nth other information processing devices A(2) to A(N).

Note that, although not illustrated in FIG. 1, the information processing system 1 may also be provided with information processing devices other than the N information processing devices A(1) to A(N). In this case, the first information processing device A(1) selects and sets the second to Nth other information processing devices A(2) to A(N) from among more than N information processing devices.

Here, in the present embodiment, the first information processing device A(1) may be predetermined, or may be determined at any timing, for example. As a specific example, the first information processing device A(1) may be determined according to an operation performed by a user (person) at any timing. As a specific example, the first information processing device A(1) may be determined at any timing according to any device automatically determining that a predetermined condition has been satisfied.

Also, in the present embodiment, the second to Nth information processing devices A(2) to A(N) may be predetermined, or may be determined at any timing, for example. As a specific example, the second to Nth information processing devices A(2) to A(N) may be determined according to an operation performed by a user (person) at any timing. As a specific example, the second to Nth information processing devices A(2) to A(N) may be determined by the first information processing device A(1) on the basis of a predetermined condition at any timing before a transmission is sent from the first information processing device A(1).

As another specific example, the second to Nth information processing devices A(2) to A(N) may be determined by a different information processing device whose turn in the order precedes the current device, on the basis of a predetermined condition at any timing before a transmission is sent from the different information processing device (in the example of FIG. 1, the transmission of algorithm data a(1)). As such an example, the ith (where i=2 to N) information processing device A(i) may be determined by the information processing device A(i-1) whose turn in the order precedes the current device by 1.

The first information processing device A(1) transmits predetermined algorithm data a(1) to the second information processing device A(2).

Here, the algorithm data a(1) is data stating a predetermined algorithm, and is data that includes information indicating the algorithm. Note that such data may also be referred to by a term such as program (or program data), for example. The algorithm may also be referred to by a term such as logic, for example.

The predetermined algorithm may be predetermined, or may be determined at any timing, for example. As a specific example, the predetermined algorithm may be determined according to an operation performed by a user (person) at any timing. As a specific example, the predetermined algorithm may be determined by the first information processing device A(1) on the basis of a predetermined condition at any timing before a transmission is sent from the first information processing device A(1) (in the example of FIG. 1, the transmission of the algorithm data a(1)).

The second information processing device A(2) receives the algorithm data a(1) transmitted from the first information processing device A(1). Also, the second information processing device A(2) uses data stored in the second information processing device A(2) itself to execute computations according to the algorithm expressed by the information included in the received algorithm data a(1). The second information processing device A(2) acquires the data of the result of executing the computations (computational result data b(1)).

Thereafter, the second information processing device A(2) transmits predetermined algorithm data a(2) and the computational result data b(1) to the third information processing device A(3).

Here, the algorithm data a(2) is data stating a predetermined algorithm, and is data that includes information indicating the algorithm.

The third information processing device A(3) receives the algorithm data a(2) and the computational result data b(1) transmitted from the second information processing device A(2). Also, the third information processing device A(3) uses data stored in the third information processing device A(3) itself to execute computations according to the algorithm expressed by the information included in the received algorithm data a(2). The third information processing device A(3) acquires the data of the result of executing the computations (computational result data b(2)).

Here, in the present embodiment, the computational result data b(2) reflects the preceding computational result data b(1). As an example, the preceding computational result data b(1) may be included in the computational result data b(2). As another example, when the computational result data b(2) is computed, the preceding computational result data b(1) may be used in the computation.

Thereafter, the third information processing device A(3) transmits predetermined algorithm data a(3) and the computational result data b(2) to the fourth information processing device A(4).

Here, the algorithm data a(3) is data stating a predetermined algorithm, and is data that includes information indicating the algorithm.

The fourth information processing device A(4) to the (N−1)th information processing device A(N−1) perform operations similar to the third information processing device A(3).

In other words, the ith (where i=4 to N−1) information processing device A(i) receives the algorithm data a(i−1) and the computational result data b(i−2) transmitted from the (i−1)th information processing device A(i−1). Also, the ith information processing device A(i) uses data stored in the ith information processing device A(i) itself to execute computations according to the algorithm expressed by the information included in the received algorithm data a(i−1). The ith information processing device A(i) acquires the data of the result of executing the computations (computational result data b(i−1)).

Here, in the present embodiment, the computational result data b(i−1) reflects the preceding computational result data b(i−2). As an example, the preceding computational result data b(i−2) may be included in the computational result data b(i−1). As another example, when the computational result data b(i−1) is computed, the preceding computational result data b(i−2) may be used in the computation.

Thereafter, the ith information processing device A(i) transmits predetermined algorithm data a(i) and the computational result data b(i−1) to the (i+1)th information processing device A(i+1).

Here, the algorithm data a(i) is data stating a predetermined algorithm, and is data that includes information indicating the algorithm.

The Nth information processing device receives the algorithm data a(N−1) transmitted from the (N−1)th information processing device A(N−1). Also, the Nth information processing device A(N) uses data stored in the Nth information processing device A(N) itself to execute computations according to the algorithm expressed by the information included in the received algorithm data a(N−1). The Nth information processing device A(N) acquires the data of the result of executing the computations (computational result data b(N−1)).

Here, in the present embodiment, the computational result data b(N−1) reflects the preceding computational result data b(N−2). As an example, the preceding computational result data b(N−2) may be included in the computational result data b(N−1). As another example, when the computational result data b(N−1) is computed, the preceding computational result data b(N−2) may be used in the computation.

Thereafter, the Nth information processing device A(N) transmits the computational result data b(N−1) to the first information processing device A(1).

Overview of Information Processing Device

Figure 2:
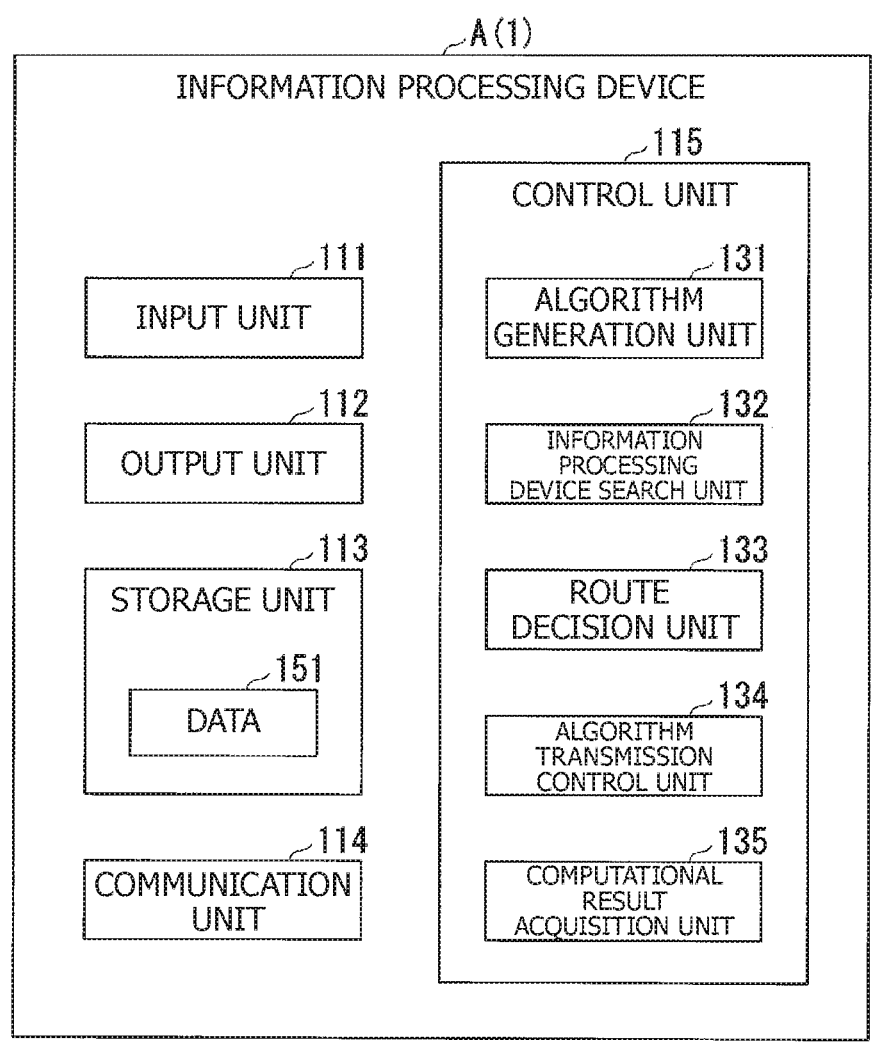
FIG. 2 is a diagram illustrating a schematic configuration example of a first information processing device according to an embodiment of the present invention.

FIG. 2 is a diagram illustrating a schematic configuration example of the first information processing device A(1) according to an embodiment of the present invention.

Figure 3:
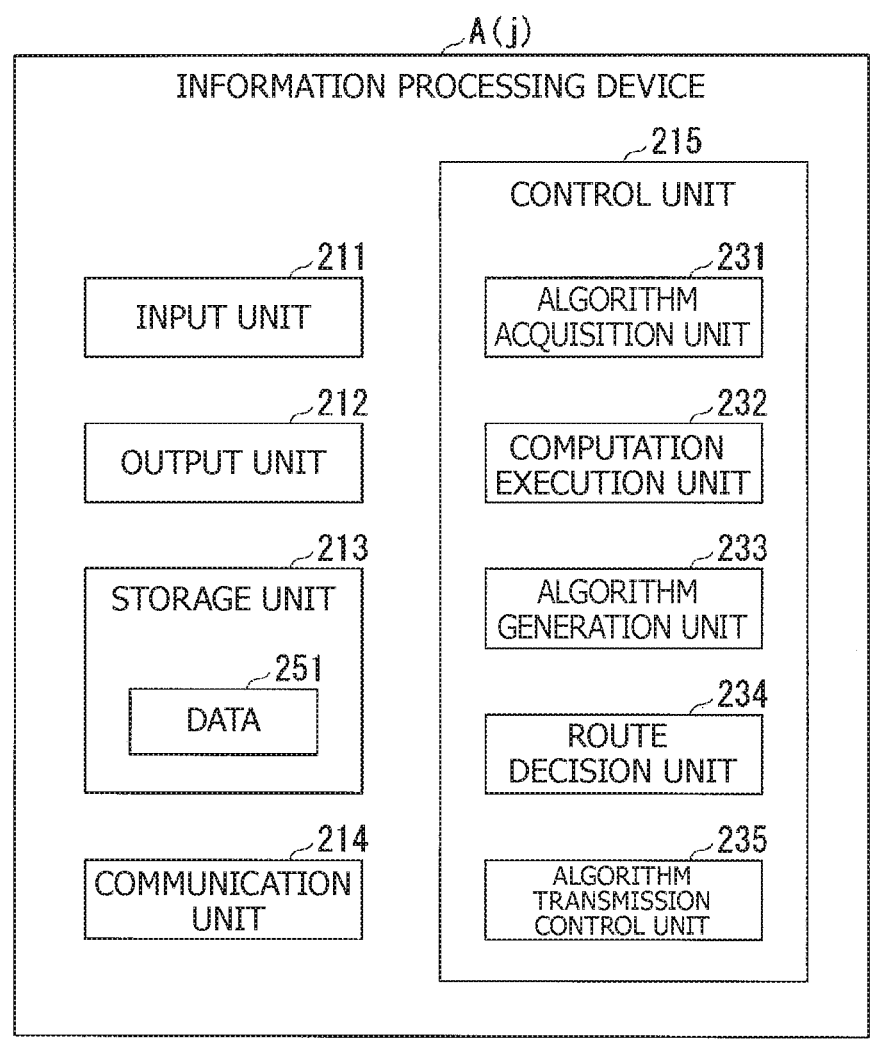
FIG. 3 is a diagram illustrating a schematic configuration example of a jth (where j=2 to N−1) information processing device according to an embodiment of the present invention.

FIG. 3 is a diagram illustrating a schematic configuration example of a jth (where j=2 to N−1) information processing device A(j) according to an embodiment of the present invention.

Figure 4:
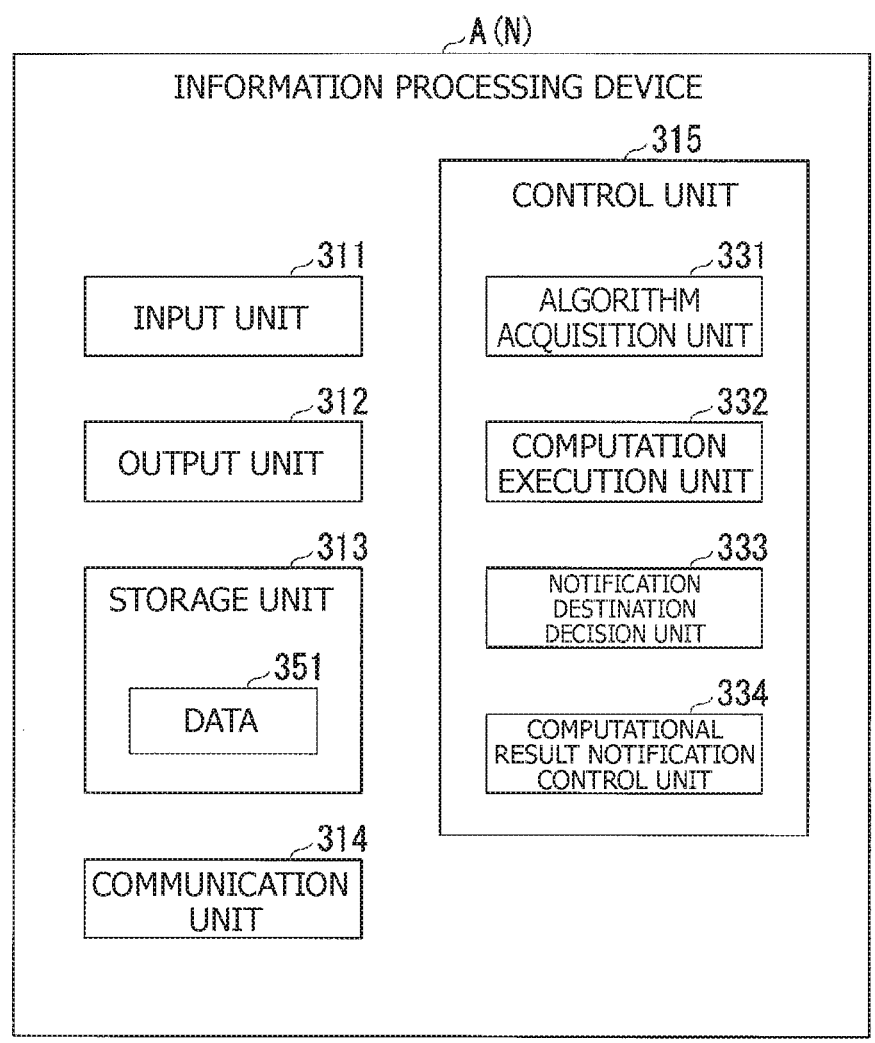
FIG. 4 is a diagram illustrating a schematic configuration example of an Nth information processing device according to an embodiment of the present invention.

FIG. 4 is a diagram illustrating a schematic configuration example of the Nth information processing device A(N) according to an embodiment of the present invention.

Here, in the present embodiment, the description distinguishes the first information processing device A(1), the jth (where j=2 to N−1) information processing device A(j), and the Nth information processing device A(N) for convenience, but an information processing device capable of functioning as each of any two of these may also be used, and an information processing device capable of functioning as each of any three of these may also be used.

As an example, each of the information processing devices A(1) to A(N) illustrated in FIG. 1 may include functions enabling each to become an information processing device at any turn in the order (in other words, functions encompassing all of the functions illustrated in FIGS. 2, 3, and 4).

Overview of First Information Processing Device

The description will refer to FIG. 2. The first information processing device A(1) is provided with an input unit 111, an output unit 112, a storage unit 113, a communication unit 114, and a control unit 115.

The input unit 111 inputs various information from external sources. As an example, the input unit 111 is provided with an operation unit that is operated by a user (person), and inputs information according to an operation performed on the operation unit by the user. The operation unit may be a device such as a keyboard or a mouse, for example.

As another example, the input unit 111 may input information that is output from an external device. The external device may be a portable storage medium such as a Universal Serial Bus (USB) memory, for example.

The output unit 112 outputs information externally. As an example, the output unit 112 may be provided with a display that outputs by displaying information to a user. The display may be a device such as a liquid crystal panel, for example. As another example, the output unit 112 may be provided with a sound output unit that outputs information as sound to a user. The sound output unit may be a device such as a speaker, for example. As another example, the output unit 112 may output information to an external device. The external device may be a portable storage medium, for example.

Note that the operation unit provided in the input unit 111 and the display provided in the output unit 112 may also be combined as a touch panel, for example. In this case, the function of the operation unit is achieved by a function of inputting information in accordance with an operation depending on a state of the touch panel being touched by the user, while the function of the display is achieved by a function of displaying information to the user on the touch panel.

The storage unit 113 stores various data. In the example of FIG. 2, the storage unit 113 stores data 151.

The storage unit 113 may store algorithm data a(1) transmitted from the first information processing device A(1) itself, or store one or more of the received computational result data b(N−1). Note that the data stored in the storage unit 113 may also be reused, for example.

The communication unit 114 communicates with the other information processing devices A(2) to A(N).

In the present embodiment, information that identifies each device is set in each of the information processing devices A(1) to A(N). The communication unit 114 uses the information that identifies each device as transmission source information or transmission destination information to communicate with the other information processing devices A(2) to A(N), for example.

In the present embodiment, the communication unit 114 includes the function of a data receiving unit that receives data from another device and the function of a data transmitting unit that transmits data to another device.

Note that the reception function of the communication unit 114 may also be integrated with the function of the input unit 111, for example, but is distinguished in the present embodiment for convenience.

Similarly, the transmission function of the communication unit 114 may also be integrated with the function of the output unit 112, for example, but is distinguished in the present embodiment for convenience.

The control unit 115 is provided with an algorithm generation unit 131, an information processing device search unit 132, a route decision unit 133, an algorithm transmission control unit 134, and a computational result acquisition unit 135.

The algorithm generation unit 131 generates a predetermined algorithm.

Here, the present embodiment illustrates a case in which the same algorithm is transmitted to the second to Nth information processing devices A(2) to A(N) by the first information processing device A(1). The algorithm may be an algorithm having any content, and an algorithm to be executed by the second to Nth information processing devices A(2) to A(N) is set.

The information processing device search unit 132 searches for at least the second information processing device A(2) among the other information processing devices A(2) to A(N). Here, any method may be used as the method of searching for the other information processing devices A(2) to A(N).

The route decision unit 133 decides a route including the other information processing devices A(2) to A(N) (at least the second information processing device A(2)) found in the search performed by the information processing device search unit 132.

As an example, the information processing device search unit 132 may search for all of the other information processing devices A(2) to A(N).

In this case, the route decision unit 133 decides a route including all of the other information processing devices A(2) to A(N) found in the search by the information processing device search unit 132. In this case, in the first information processing device A(1), the information processing devices at all turns in the order from the second information processing device A(2) to the Nth information processing device A(N) are decided.

Note that in the first information processing device A(1), fixed information processing devices may be preset as the information processing devices at all turns in the order from the second information processing device A(2) to the Nth information processing device A(N). In this case, the function of the information processing device search unit 132 and the function of the route decision unit 133 do not have to be provided in the first information processing device A(1).

As another example, the information processing device search unit 132 searches for only the second information processing device A(2) among the other information processing devices A(2) to A(N). In this case, the route decision unit 133 decides a route including the second information processing device A(2) found in the search by the information processing device search unit 132. In this case, in the route decided in the first information processing device A(1), the third and subsequent information processing devices are undetermined. In this case, the second and subsequent information processing devices are configured to decide the third and subsequent information processing devices.

As another example, the information processing device search unit 132 may search for the second information processing device A(2) and any number (here, a number less than or equal to (N−3)) of a subset of the other information processing devices from among the other information processing devices A(2) to A(N). In this case, the route decision unit 133 decides a route including the second information processing device A(2) found in the search by the information processing device search unit 132 and some of the other information processing devices. In this case, in the route decided in the first information processing device A(1), the information processing devices at the turns in the order not searched for are undetermined. In this case, the second and subsequent information processing devices are configured to decide the undetermined information processing devices.

The algorithm transmission control unit 134 causes the communication unit 114 to transmit data stating an algorithm (the algorithm data a(1)) generated by the algorithm generation unit 131 to the second information processing device A(2).

Here, in the present embodiment, information indicating the route decided by the route decision unit 133 (also referred to as the "route information" for convenience) is added to the algorithm data a(1). The route information may be added so as to be included inside the algorithm data a(1) or may be added outside the algorithm data a(1), for example. Note that the route information may also be considered to be a part of the algorithm. In this case, the algorithm is considered to include the route information.

The computational result acquisition unit 135 acquires computational result data b(N−1) transmitted from the Nth information processing device A(N) and received by the communication unit 114.

Here, in the present embodiment, the first information processing device A(1) initially sends the algorithm data a(1). Thereafter, data related to the algorithm data a(1) is successively transmitted from the second information processing device A(2) to the Nth information processing device A(N) and subjected to predetermined computations, and the computational result data b(N−1) acquired by the Nth information processing device A(N) is returned to the originating first information processing device A(1). With this arrangement, the first information processing device A(1) is capable of transmitting the algorithm data a(1) and receiving the computational result data b(N−1) corresponding to the algorithm data a(1).

Overview of jth (where j=2 to N−1) Information Processing Device A(j)

The description will refer to FIG. 3. Note that for convenience, the jth (where j=2 to N−1) information processing devices A(j) will be described collectively, and will be described using common signs (the signs illustrated in the drawings).

The jth information processing device A(j) is provided with an input unit 211, an output unit 212, a storage unit 213, a communication unit 214, and a control unit 215.

The functions of the input unit 211, the output unit 212, the storage unit 213, and the communication unit 214 are generally similar to the functions of the input unit 111, the output unit 112, the storage unit 113, and the communication unit 114 in the first information processing device A(1), respectively, and detailed description is omitted here.

In the example of FIG. 3, the storage unit 213 stores data 251.

For example, the storage unit 213 may store one or more of the received algorithm data a(j−1), the computational result data b(j−2) received in the case in which j is 3 or greater, the algorithm data a(j) transmitted from the jth information processing device A(j) itself, and the computational result data b(j−1) transmitted from the jth information processing device A(j) itself. Note that the data stored in the storage unit 213 may also be reused, for example.

The control unit 215 is provided with an algorithm acquisition unit 231, a computation execution unit 232, an algorithm generation unit 233, a route decision unit 234, and an algorithm transmission control unit 235.

The algorithm acquisition unit 231 acquires the algorithm data a(j−1) transmitted from the information processing device one turn earlier in the order, namely the (j−1)th information processing device A(j−1), and received by the communication unit 214. Also, in the case in which the computational result data b(j−2) is also transmitted from the (j−1)th information processing device A(j−1), the computational result data b(j−2) is also received by the communication unit 214.

The computation execution unit 232 uses the data 251 stored in the storage unit 213 to execute computations according to the algorithm acquired by the algorithm acquisition unit 231. In this case, the computation execution unit 232 follows the algorithm to execute the computations while also using the computational result data b(j−2) received from the (j−1)th information processing device A(j−1) as necessary.

With this arrangement, the computation execution unit 232 acquires the computational result data b(j−1). At this point, the computation execution unit 232 may cause some or all of the computational result data acquired in the information processing device(s) at earlier turns in the order to be included in the computational result data b(j−1), for example.

On the basis of the algorithm data a(j−1) received from the (j−1)th information processing device A(j−1), the algorithm generation unit 233 generates the algorithm of the algorithm data a(j) to be transmitted to the information processing device at the next turn in the order, namely the (j+1)th information processing device A(j+1).

Here, in the present embodiment, the algorithm generation unit 233 adopts the same algorithm as the algorithm stated in the algorithm data a(j−1) received from the (j−1)th information processing device A(j−1), and generates the algorithm data a(j) stating the adopted algorithm.

The route decision unit 234 decides a route including at least the information processing device at the next turn in the order, namely the (j+1)th information processing device A(j+1).

At this point, in the case in which the entire route (the information processing devices at all turns in the order) from the second information processing device A(2) to the Nth information processing device A(N) has been decided in the first information processing device A(1), the route decision unit 234 decides the route according to the already-decided route.

Also, with regard to the route (the entire route or a part of the route) already decided in the information processing devices A(1) to A(j−1) at earlier turns in the order than the jth information processing device A(j) itself, the route decision unit 234 may adopt the already-decided route as-is or decide a route according to the already-decided route, for example.

Additionally, the route decision unit 234 may also decide part or all of a route (a part of the entire route) that was undetermined in the information processing devices A(1) to A(j−1) at earlier turns in the order than the jth information processing device A(j) itself. In this case, the route decision unit 234 may also include a function similar to the information processing device search unit 132, and decide a route on the basis of the results of information processing devices found in a search by the function, for example.

As an example, a configuration may be used in which each of the information processing devices A(1) to A(N−1) decides the information processing devices A(2) to A(N) at the next turn in the order (the next communication peer).

The algorithm transmission control unit 235 causes the communication unit 214 to transmit data stating an algorithm (the algorithm data a(j)) generated by the algorithm generation unit 233 to the (j+1)th information processing device A(j+1).

Here, in the present embodiment, information (route information) indicating the route decided by the route decision unit 234 is added to the algorithm data a(j).

Overview of Nth Information Processing Device A(N)

The description will refer to FIG. 4. The Nth information processing device A(N) is provided with an input unit 311, an output unit 312, a storage unit 313, a communication unit 314, and a control unit 315.

The functions of the input unit 311, the output unit 312, the storage unit 313, and the communication unit 314 are generally similar to the functions of the input unit 111, the output unit 112, the storage unit 113, and the communication unit 114 in the first information processing device A(1), respectively, and detailed description is omitted here.

In the example of FIG. 4, the storage unit 313 stores data 351.

For example, the storage unit 313 may store one or more of the received algorithm data a(N−1), the received computational result data b(N−2), and the computational result data b(N−1) transmitted from the Nth information processing device A(N) itself. Note that the data stored in the storage unit 313 may also be reused, for example.

The control unit 315 is provided with an algorithm acquisition unit 331, a computation execution unit 332, a notification destination decision unit 333, and a computational result notification control unit 334.

The algorithm acquisition unit 331 acquires the algorithm data a(N−1) transmitted from the information processing device one turn earlier in the order, namely the (N−1)th information processing device A(N−1), and received by the communication unit 314. Also, in the case in which the computational result data b(N−2) is also transmitted from the (N−1)th information processing device A(N−1), the computational result data b(N−2) is also received by the communication unit 314.

The computation execution unit 332 uses the data 351 stored in the storage unit 313 to execute computations according to the algorithm acquired by the algorithm acquisition unit 331. In this case, the computation execution unit 332 follows the algorithm to execute the computations while also using the computational result data b(N−2) received from the (N−1)th information processing device A(N−1) as necessary.

With this arrangement, the computation execution unit 332 acquires the computational result data b(N−1). At this point, the computation execution unit 332 may cause some or all of the computational result data acquired in the information processing device(s) at earlier turns in the order to be included in the computational result data b(N−1), for example.

The notification destination decision unit 333 decides another information processing device to be notified of the computational result data b(N−1).

In the present embodiment, the notification destination decision unit 333 decides the first information processing device A(1) as the notification destination. In the present embodiment, information that identifies the first information processing device A(1) is assumed to be included in the route information acquired by the Nth information processing device A(N) by traversing the first information processing device A(1) to the second and subsequent information processing devices A(2) to A(N−1).

As another example, the notification destination decision unit 333 may also decide on a device other than the first information processing device A(1) as the notification destination. The device treated as the notification destination may be preset or decided in real time by the notification destination decision unit 333, for example.

As an example, information that identifies the device treated as the preset notification destination may be acquired by the Nth information processing device A(N) by traversing the first information processing device A(1) to the second and subsequent information processing devices A(2) to A(N−1). As another example, information that identifies the device treated as the notification destination may be preset in the Nth information processing device A(N).

As another example, the notification destination decision unit 333 may also have a function similar to the information processing device search unit 132, and decide the notification destination on the basis of the results of information processing devices found in a search by the function, for example.

The computational result notification control unit 334 causes the communication unit 314 to transmit the computational result data b(N−1) to the notification destination decided by the notification destination decision unit 333 (in the present embodiment, the first information processing device A(1)).

Overview of Information Processing Device Table

Figures 5, 6:
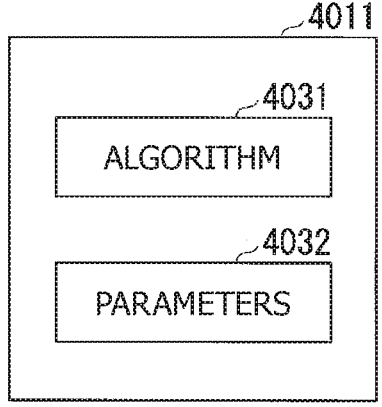
FIG. 5 is a diagram illustrating an example of an information processing device table according to an embodiment of the present invention.
FIG. 6 is a diagram illustrating a schematic example of data transmitted from the first information processing device according to an embodiment of the present invention.

FIG. 5 is a diagram illustrating an example of an information processing device table 3011 according to an embodiment of the present invention.

The information processing device search unit 132 in the first information processing device A(1) (or the function in another device having a similar function) may also use a table related to information processing devices (information processing device table) 3011.

The information processing device table 3011 is stored in the storage unit 113, for example.

The information processing device table 3011 stores identification information, a power on/off state, and other attributes (such as an attribute α and an attribute β in the example of FIG. 5) in association with each other for each information processing device.

Any attributes may be used as the attributes. For example, attributes such as a group to which the information processing device belongs, a region where the information processing device exists, the age or gender of a user who uses the information processing device, and a past level of cooperation of the information processing device (such as the number of times the information processing device has participated in algorithm transmission as illustrated in FIG. 1, for example) may be used. As a specific example, the level of cooperation may be a value based on the number or frequency of responses to questions or the like.

In the example of FIG. 5, numerical information such as "0001" or "0002" is used as the identification information.

In the example of FIG. 5, "on" or "off" is used as the power on/off state, in which "on" indicates that the information processing device is powered on, and "off" indicates that the information processing device is powered off.

In the present embodiment, the information processing device search unit 132 generates and updates the information processing device table 3011 on the basis of the results of information processing devices found in a search.

Note that some of the information in the information processing device table 3011 may be preset.

Also, some of the information in the information processing device table 3011 may be written by a user.

Also, in an information processing device storing the information processing device table 3011, information about the device itself (the information processing device storing the information processing device table 3011) may or may not be stored in the information processing device table 3011.

In the present embodiment, the route decision unit 133 in the first information processing device A(1) (or the function in another device having a similar function) may include powered-on information processing devices in the route, but does not include powered-off information processing devices in the route. In other words, in the present embodiment, a method of deciding (selecting) information processing devices to include in the route from among the information processing devices that are powered on may be used.

Also, for example, the route decision unit 133 in the first information processing device A(1) (or the function in another device having a similar function) may include information processing devices belonging to a predetermined group (for example, the same group) in the route, but not include information processing devices not belonging to the group in the route. In other words, in the present embodiment, a method of deciding (selecting) information processing devices to include in the route from among the information processing devices belonging to a predetermined group may be used.

Note that the same applies to other attributes, and a method of deciding (selecting) information processing devices to include in the route from among the information processing devices having a predetermined attribute in a predetermined state may be used.

Also, for example, a method of deciding (selecting) one information processing device (or a predetermined number of information processing devices) given the highest priority from among two or more different information processing device candidates on the basis of the state of one or more predetermined attributes may be used.

Overview of Transmission Data

FIG. 6 is a diagram illustrating a schematic example of data (transmission data 4011) transmitted from the first information processing device A(1) according to an embodiment of the present invention.

The transmission data 4011 includes an algorithm 4031 (herein referring to data stating the algorithm) and parameters 4032.

In the example of FIG. 6, the parameters 4032 used when executing the algorithm 4031 are added to the algorithm 4031. Note that the parameters 4032 may also be considered to be included in the algorithm 4031.

Also, in the present embodiment, route information is included in the transmission data 4011.

Figure 7:
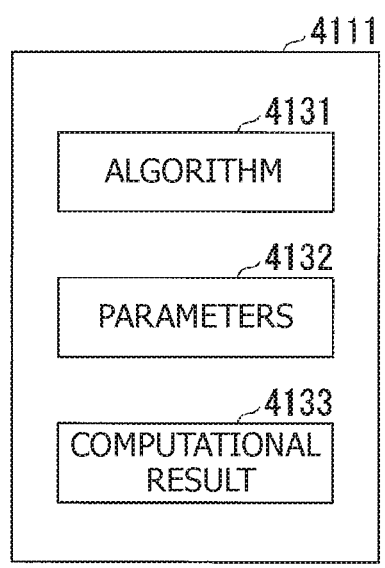
FIG. 7 is a diagram illustrating a schematic example of data transmitted from the jth (where j=2 to N−1) information processing device according to an embodiment of the present invention.

FIG. 7 is a diagram illustrating a schematic example of data (transmission data 4111) transmitted from the jth (where j=2 to N−1) information processing device A(j) according to an embodiment of the present invention.

The transmission data 4111 includes an algorithm 4131 (herein referring to data stating the algorithm), parameters 4132, and a computational result 4133.

Also, in the present embodiment, route information is included in the transmission data 4111.

Here, the transmission data 4111 illustrated in FIG. 7 is generally the transmission data 4011 illustrated in FIG. 6 with the addition of the computational result 4133.

In the present embodiment, the computational result 4133 corresponds to the computational result data b(j−1).

Figure 8:
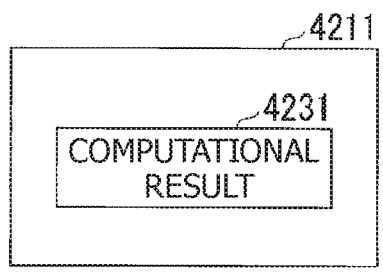
FIG. 8 is a diagram illustrating a schematic example of data transmitted from the Nth information processing device according to an embodiment of the present invention.

FIG. 8 is a diagram illustrating a schematic example of data (transmission data 4211) transmitted from the Nth information processing device A(N) according to an embodiment of the present invention.

The transmission data 4211 includes a computational result 4231.

In the present embodiment, the computational result 4231 corresponds to the computational result data b(N−1).

Overview of Overall Operations in Information Processing System

Figure 9:
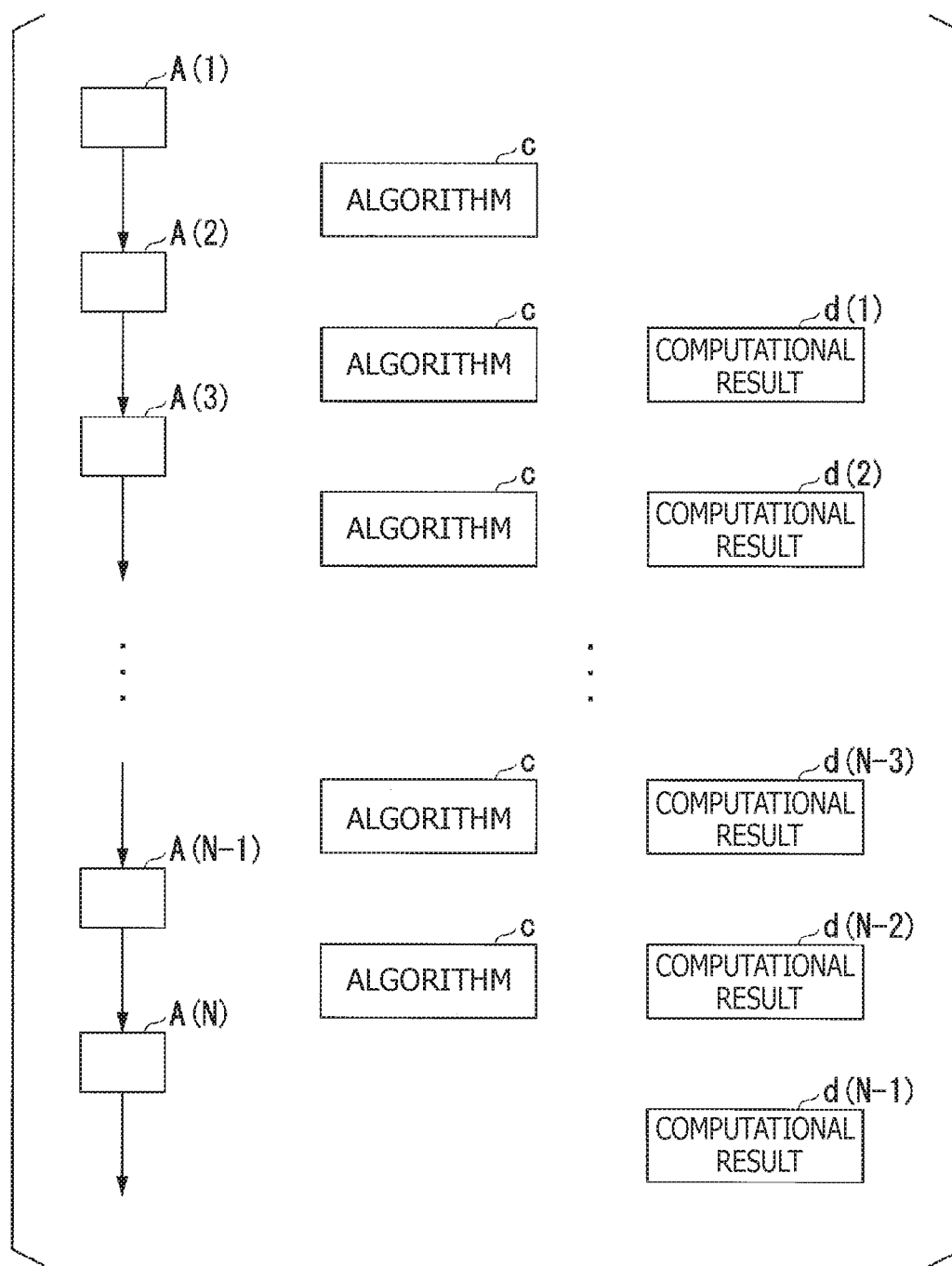
FIG. 9 is a diagram illustrating an outline of overall operations in the information processing system according to an embodiment (first embodiment) of the present invention.

FIG. 9 is a diagram illustrating an outline of overall operations in the information processing system 1 according to an embodiment (first embodiment) of the present invention.

In the example of FIG. 9, data stating the same algorithm C is transmitted from the first information processing device A(1) to the Nth information processing device A(N) as the algorithm data a(1) to a(N−1). Note that the parameters in each of the algorithm data a(1) to a(N−1) may be the same or different, for example.

Also, in the example of FIG. 9, respective computational results d(1) to d(N−1) are transmitted from the second information processing device A(2) to the Nth information processing device A(N).

With this arrangement, in this example, computations according to the same algorithm C are executed in each of the second information processing device A(2) to the Nth information processing device A(N) using data respectively stored in each information processing device, and these execution results (the computational results d(1) to d(N−1)) are finally transmitted in a notification to the first information processing device A(1).

Note that each of the computational results d(1) to d(N−1) may be presented independently, or each may be substantially included in the next computational result by using the previous computational result in the computations by each of the information processing devices A(3) to A(N) as the computational results are transmitted from the second information processing device A(2) to the Nth information processing device A(N), for example.

At this point, if the same algorithm C is expressed by a predetermined function F(x) using a predetermined variable x, the algorithm data a(1), the algorithm data a(2), the algorithm data a(3), and so on become F(x), F(F(x)), F(F(F(x))), and so on, for example.

Example of Specific Application

FIG. 9 will be referenced to illustrate an example of a specific application.

As an example, the first information processing device A(1) can distribute the content of the algorithm C for copying the content of a test to the other information processing devices A(2) to A(N), and acquire list information of the information processing devices A(2) to A(N) that received the content of the test. In this case, the algorithm C prescribes a process of copying and saving information about the content of a predetermined test. The information about the content of the test may be included in the data that the first information processing device A(1) transmits to the second information processing device A(2), or may be included in data stored in the second information processing device A(2) and extracted from the data, for example. Also, to notify that each of the information processing devices A(2) to A(N) has copied the content of the test, the algorithm C prescribes a process of including identification information of each device itself (the information processing devices A(2) to A(N)) in each of the computational result data d(1) to d(N−1). With this arrangement, the content of the test is copied in each of the second information processing device A(2) to the Nth information processing device A(N), and in addition, a list (the computational result data d(N−1)) of the identification information of all of the information processing devices A(2) to A(N) in which the content of the test has been copied (that is, the information processing devices that received the content of the test) is acquired by the first information processing device A(1).

Here, the identification information of each of the information processing devices A(2) to A(N) is included in the data stored in each of the information processing devices A(2) to A(N).

Note that instead of the identification information of each of the information processing devices A(2) to A(N), identification information of an entity such as a user (for example, a person who receives the test) who operates each of the information processing devices A(2) to A(N) may also be used, for example.

As another example, the first information processing device A(1) can distribute the content of the algorithm C for determining whether the other information processing devices A(2) to A(N) pass or fail a test, and acquire list information of the determination results regarding passing or failing the test for each of the information processing devices A(2) to A(N). In this case, the algorithm C prescribes a process of determining passing or failing by referencing information about a solution to a predetermined test. The information about the solution to the test in each of the information processing devices A(2) to A(N) is included in the data stored in each of the information processing devices A(2) to A(N). Also, to issue a notification including the determination results regarding passing or failing for each of the information processing devices A(2) to A(N), the algorithm C prescribes a process of including information indicating the determination result regarding passing or failing in each device itself (the information processing devices A(2) to A(N)) in each of the computational result data d(1) to d(N−1). With this arrangement, passing or failing is determined on the basis of the solution to the test in each of the second information processing device A(2) to the Nth information processing device A(N), and in addition, a list (the computational result data d(N−1)) of information indicating each determination result regarding passing or failing for all of the information processing devices A(2) to A(N) is acquired by the first information processing device A(1).

Note that in the list (computational result data d(N−1)), identification information of each of the information processing devices A(2) to A(N), their corresponding users, or the like is associated with the information indicating the determination result regarding passing or failing for each of the information processing devices A(2) to A(N).

The first information processing device A(1) can acquire the data of the determination results regarding passing or failing without collecting the data of the solution (submitted answer) from each of the information processing devices A(2) to A(N).

As the data of the determination results regarding passing or failing, data related to passing results only may be used, data related to failing results only may be used, or data related to both may be used.

Overview of Processes Performed in Information Processing Devices

Processes Performed in First Information Processing Device

Figure 10:
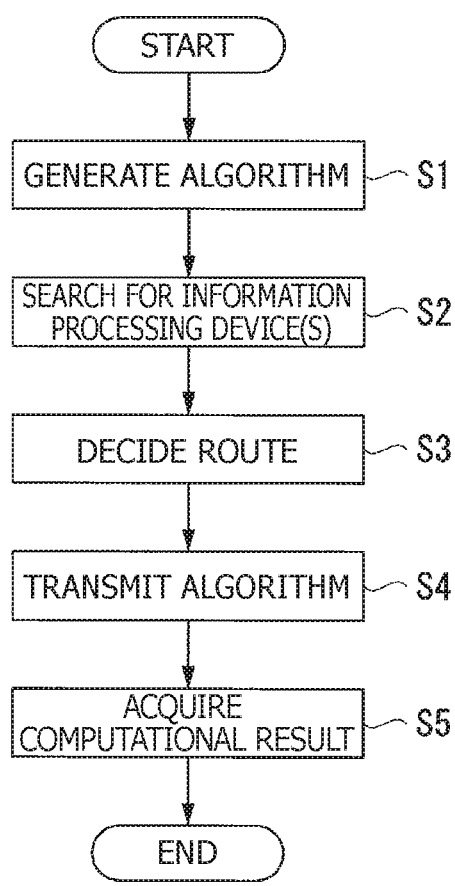
FIG. 10 is a diagram illustrating an example of a processing sequence performed in the first information processing device according to an embodiment of the present invention.

FIG. 10 is a diagram illustrating an example of a processing sequence performed in the first information processing device A(1) according to an embodiment of the present invention.

Step S1

The algorithm generation unit 131 generates an algorithm (in the example of FIG. 9, the algorithm C), and proceeds to the process of step S2.

Step S2

The information processing device search unit 132 searches for at least the second information processing device A(2) as the next communication peer, and proceeds to the process of step S3. Note that in the case in which the first information processing device A(1) decides all of the information processing devices A(2) to A(N), the information processing device search unit 132 searches for all of the information processing devices A(2) to A(N).

Step S3

The route decision unit 133 decides a route including at least the next communication peer on the basis of the search results from the information processing device search unit 132, and proceeds to the process of step S4. Note that in the case in which the first information processing device A(1) decides all of the information processing devices A(2) to A(N), the route decision unit 133 decides the entire route.

Step S4

The algorithm transmission control unit 134 transmits data (algorithm data a(1)) stating the algorithm generated by the algorithm generation unit 131 to the next communication peer (the second information processing device A(2)) according to the route decided by the route decision unit 133, and proceeds to the process of step S5.

Step S5

The computational result acquisition unit 135 acquires (collects) information about the final computational result (computational result data b(N−1)) from the Nth information processing device A(N), and ends the current process flow.

Processes Performed in Jth (where j=2 to N−1) Information Processing Device

Figure 11:
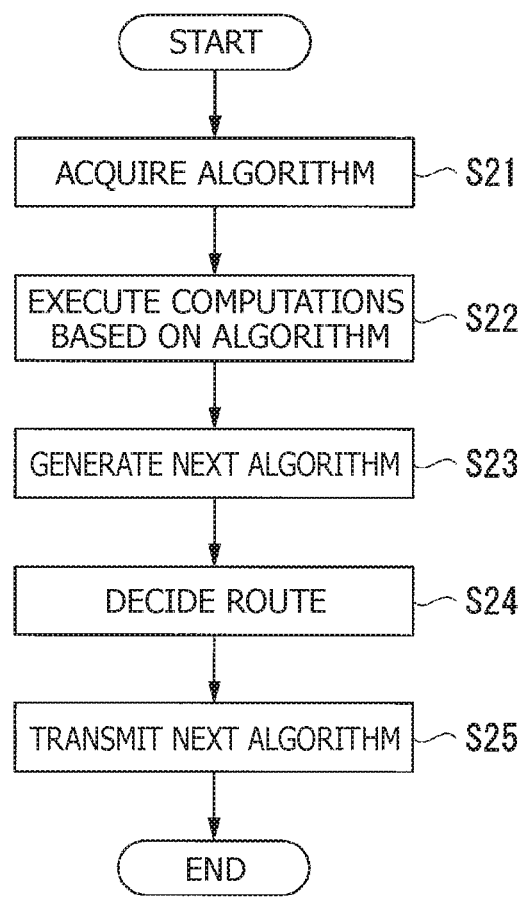
FIG. 11 is a diagram illustrating an example of a processing sequence performed in the jth (where j=2 to N−1) information processing device according to an embodiment of the present invention.

FIG. 11 is a diagram illustrating an example of a processing sequence performed in the jth (where j=2 to N−1) information processing device A(j) according to an embodiment of the present invention.

Step S21

The algorithm acquisition unit 231 acquires the algorithm stated in the algorithm data a(j−1) on the basis of the algorithm data a(j−1) transmitted from the information processing device A(j−1) one turn earlier in the order, and proceeds to the process of step S22.

Step S22

On the basis of the algorithm acquired by the algorithm acquisition unit 231, the computation execution unit 232 uses the data 251 stored in the storage unit 213 to execute computations according to the algorithm, and proceeds to the process of step S23.

Step S23

The algorithm generation unit 233 generates (in this case, duplicates, for example) the algorithm (in the example of FIG. 9, the same algorithm C) to transmit to the information processing device A(j+1) at the next turn in the order, and proceeds to the process of step S24.

Step S24

The route decision unit 234 decides a route including at least the next communication peer, and proceeds to the process of step S25. Note that in the case in which the first information processing device A(1) decides the entire route, the route decision unit 234 decides a route such that the route is the same as the already-decided route (such as by copying the route, for example).

Step S25

The algorithm transmission control unit 235 transmits data (algorithm data a(j)) stating the algorithm generated by the algorithm generation unit 233 to the next communication peer (the (j+1)th information processing device A(j+1)) according to the route decided by the route decision unit 234, and ends the current process flow. At this time, the algorithm transmission control unit 235 also transmits the computational result data b(j−1) based on the result of the computations executed by the computation execution unit 232 to the next communication peer (the (j+1)th information processing device A(j+1)).

Processes Performed in Nth Information Processing Device

Figure 12:
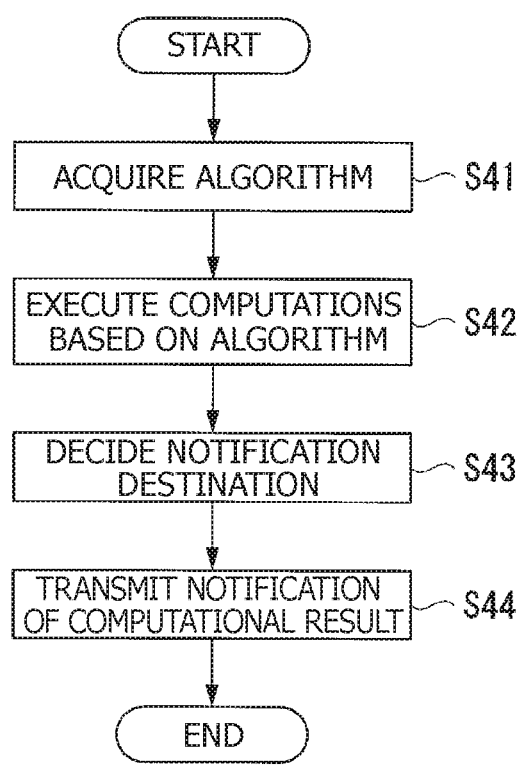
FIG. 12 is a diagram illustrating an example of a processing sequence performed in the Nth information processing device according to an embodiment of the present invention.

FIG. 12 is a diagram illustrating an example of a processing sequence performed in the Nth information processing device A(N) according to an embodiment of the present invention.

Step S41

The algorithm acquisition unit 331 acquires the algorithm stated in the algorithm data a(N−1) on the basis of the algorithm data a(N−1) transmitted from the information processing device A(N−1) one turn earlier in the order, and proceeds to the process of step S42.

Step S42

On the basis of the algorithm acquired by the algorithm acquisition unit 331, the computation execution unit 332 uses the data 351 stored in the storage unit 313 to execute computations according to the algorithm, and proceeds to the process of step S43.

Step S43

The notification destination decision unit 333 decides the notification destination of the computational result, and proceeds to the process of step S44. Note that in the case in which the first information processing device A(1) has designated the notification destination (for example, the first information processing device A(1)), the notification destination decision unit 333 decides the notification destination to be the designated notification destination. In this case, information designating the notification destination is transmitted from the first information processing device A(1) to the Nth information processing device A(N).

Step S44

The computational result notification control unit 334 notifies the notification destination by transmitting the computational result data b(N−1) based on the result of the computations executed by the computation execution unit 332 to the notification destination, and ends the current process flow.

Here, the example of FIG. 1 is configured to transmit the computational result data b(N−1) obtained by the Nth information processing device A(N) at the last turn in the order to the first information processing device A(1), but another example may be configured to transmit the computational result data b(N−1) obtained by the Nth information processing device A(N) at the last turn in the order to another device. The other device may be any one or more information processing devices among the second information processing device A(2) to the (N−1)th information processing device A(N−1), or a different information processing device (not illustrated). The different information processing device may be predetermined, for example, and information designating the different information processing device may be added to the algorithm data a(1) to a(N−1).

Also, the present embodiment illustrates a case of transmitting the computational result data b(N−1) obtained by the Nth information processing device A(N) at the last turn in the order to any device treated as the notification destination, but a configuration that transmits some or all of the computational result data b(j) from among the second information processing device A(2) to the (N−1)th information processing device A(N−1) at turns partway through the order to any device treated as the notification destination.

In addition, any device may be used as the notification destination for each of the computational result data b(1) to b(N−1). Furthermore, the notification destination for each of the computational result data b(1) to b(N−1) may be the same device or different devices, for example.

As an example, the Nth information processing device A(N) may issue a notification including the Nth computational result data b(N−1) to each of the first information processing device A(1) to the (N−1)th information processing device A(N−1). In this case, the final computational result data b(N−1) is shared by all of the information processing devices A(1) to A(N).

Also, in the present embodiment, after using the received data (for example, the algorithm data and the computational result data), each of the information processing devices A(2) to A(N) may delete the data or save some or all of the data in storage.

Also, in the present embodiment, after transmitting the transmitted data (for example, the algorithm data and the computational result data), each of the information processing devices A(1) to A(N) may delete the data or save some or all of the data in storage.

Also, in the present embodiment, each of the information processing devices A(1) to A(N) included on a single route is included on the route one time only, but as another example, the same information processing device may be included two or more times on a single route in some cases.

Also, in the present embodiment, the way in which the plurality of information processing devices A(1) to A(N) communicate by turns may be achieved using blockchain technology, for example.

About First Embodiment

As above, in the information processing system 1 according to the present embodiment, it is possible to increase the efficiency of executing predetermined computations using data from a plurality of information processing devices A(1) to A(N). The information processing system 1 according to the present embodiment is particularly useful in processing big data.

In the information processing system 1 according to the present embodiment, the data stored in each of the information processing devices A(2) to A(N) is not transmitted (forwarded), but instead, data stating an algorithm (the algorithm data a(2) to a(N−1)) is successively communicated by turns, and data related to a computational result (the computational result data b(1) to b(N−2)) is successively handed over. For this reason, the information processing system 1 according to the present embodiment is particularly efficient in cases in which an enormous amount of data is stored in each of the information processing devices A(2) to A(N), for example.

In the information processing system 1 according to the present embodiment, by increasing the efficiency of the overall process, fast response, fast data sharing, and fast large-scale computational processing are possible, for example.

Also, in the information processing system 1 according to the present embodiment, in the case of adopting a configuration not provided with server functions, it is possible to save on the costs associated with installing and maintaining a server, for example.

Furthermore, in the information processing system 1 according to the present embodiment, by adopting communication between the information processing devices A(1) to A(N), it is also possible to reduce communication costs, for example.

Also, in the information processing system 1 according to the present embodiment, by taking measures such as encryption and setting predetermined rights, it is also possible to ensure security, for example.

Here, the information processing system 1 according to the present embodiment illustrates a case in which data stating an algorithm (the algorithm data a(2) to a(N−1)) and data related to a computational result (the computational result data b(1) to b(N−2)) are successively communicated by turns in each of the information processing devices A(2) to A(N), but as another example, a configuration in which the computational result data b(1) to b(N−2) is not communicated or a configuration in which the computational result data b(1) to b(N−2) is communicated by the algorithm data a(2) to a(N−1) is not communicated together may also be used. In other words, the present embodiment may also be considered to be a configuration in which data stating an algorithm (the algorithm data a(2) to a(N−1)) is successively communicated by turns in each of the information processing devices A(2) to A(N), and in which any other further additions to the configuration may be provided as necessary.

Second Embodiment

Figure 13:
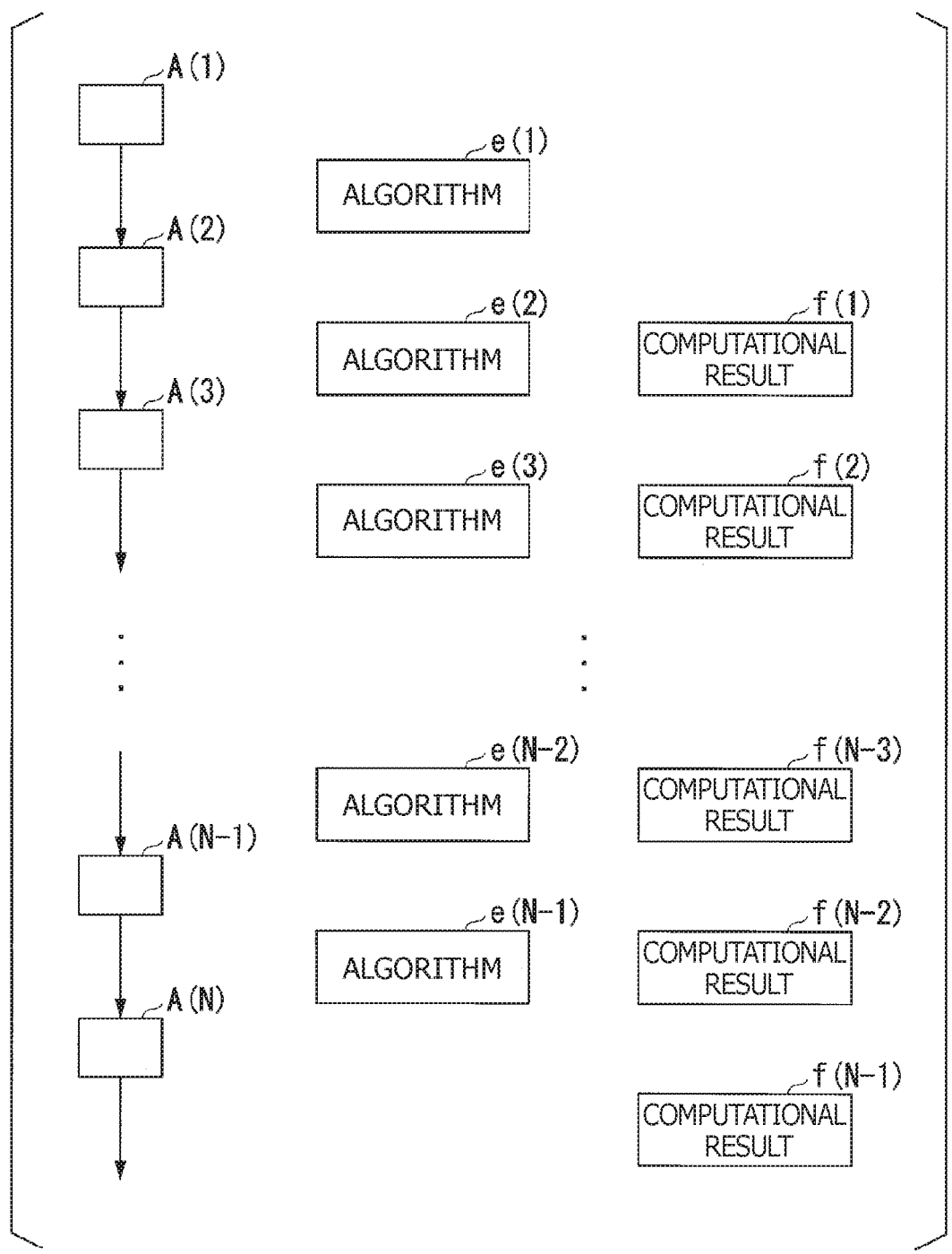
FIG. 13 is a diagram illustrating an outline of overall operations in the information processing system according to an embodiment (second embodiment) of the present invention.

The description will refer to FIG. 13.

The present embodiment differs from the first embodiment in that when the algorithm is transmitted from the first information processing device A(1) to the Nth information processing device A(N), the content of the algorithm may change, but is otherwise similar to the first embodiment. Consequently, for convenience, the present embodiment is described using the same signs (the signs illustrated in the drawings) as the case of the first embodiment, except for the signs illustrated in FIG. 13.

Overview of Overall Operations in Information Processing System

FIG. 13 is a diagram illustrating an outline of overall operations in the information processing system 1 according to an embodiment (second embodiment) of the present invention.

In the example of FIG. 13, data stating algorithms whose respective content may be different is transmitted from the first information processing device A(1) to the Nth information processing device A(N) as algorithm data e(1) to e(N−1). Note that the parameters in each of the algorithm data e(1) to e(N−1) may be the same or different, for example.

Also, in the example of FIG. 13, respective computational results d(1) to d(N−1) are transmitted from the second information processing device A(2) to the Nth information processing device A(N).

Here, in the jth (where j=2 to N−1) information processing device A(j) of the present embodiment, the algorithm generation unit 233 generates an algorithm that is the same as, or is different from, the algorithm acquired by the algorithm acquisition unit 231 as the next algorithm.

As an example, all of the algorithms from the first information processing device A(1) to the Nth information processing device A(N) may be predetermined by the first information processing device A(1). In this case, information that respectively designates (specifies) all of these algorithms may be included in the algorithm data e(1) transmitted from the first information processing device A(1), for example.

As another example, some or all of the second information processing device A(2) to the (N−1)th information processing device A(N−1) may also store, in the storage unit 213, a rule for generating the next algorithm on the basis of the algorithm acquired by the algorithm acquisition unit 231. The rule may be stored in the storage unit 213 in advance or the rule may be input from an external source at any timing and stored in the storage unit 213, for example. Also, in the case in which j is 3 or greater, the rule may be a rule for generating the next algorithm on the basis of the algorithm acquired by the algorithm acquisition unit 231 and the received computational result data, for example.

Note that the method used to generate the next algorithm may be a method of newly generating an algorithm or a method of generating the next algorithm by partially modifying a previous algorithm (such as the immediately preceding algorithm), for example.

Also, in the present embodiment, in the case in which j is 2 or greater, the algorithm generation unit 233 of the jth information processing device A(j) may also generate the next algorithm on the basis of some or all of the data stored in the jth information processing device A(j) (as well as other data as necessary).

Also, in the present embodiment, in the case in which j is 3 or greater, the algorithm generation unit 233 of the jth information processing device A(j) may also generate the next algorithm on the basis of some or all of the computational result data received from the (j−1)th information processing device A(j−1) (as well as other data as necessary).

With this arrangement, in this example, computations according to algorithms e(1) to e(N−1) which may differ from each other are executed in each of the second information processing device A(2) to the Nth information processing device A(N) using data respectively stored in each information processing device, and these execution results (computational results f(1) to f(N−1)) are finally transmitted in a notification to the first information processing device A(1).

Note that each of the computational results f(1) to f(N−1) may be presented independently, or each may be substantially included in the next computational result by using the previous computational result in the computations by each of the information processing devices A(3) to A(N) as the computational results are transmitted from the second information processing device A(2) to the Nth information processing device A(N), for example.

At this point, if a plurality of different algorithm data a(1) to a(N−1) is expressed by predetermined functions F<1>(x) to F<N−1>(x) using a predetermined variable x, the algorithm data a(1), the algorithm data a(2), the algorithm data a(3), and so on become F<1>(x), F<2>(F<1>(x)), F<3>(F<2>(F<1>(x))), and so on, for example.

Example of Specific Application

FIG. 13 will be referenced to illustrate an example of a specific application.

As an example, the first information processing device A(1) can distribute the content of the algorithm e(1) for copying the content of a test to the other information processing devices A(2) to A(N), and acquire list information of the information processing devices A(2) to A(N) that received the content of the test. In this case, each of the algorithms e(1) to e(N−1) prescribes a process of generating and saving information about the content of a predetermined test. In this case, in the present example, the respective algorithms e(1) to e(N−1) are at least partially different from each other. For example, in each of the algorithms e(1) to e(N−1), the portion of the procedure that determines a plurality of choices and their order of arrangement in a multiple-choice question may be different. Also, to notify that each of the information processing devices A(2) to A(N) has generated the content of the test, each of the algorithms e(1) to e(N−1) prescribes a process of including identification information of each device itself (the information processing devices A(2) to A(N)) in each of the computational result data f(1) to f(N−1).

Note that the example of FIG. 13 differs from the example of FIG. 9 in that the respective algorithms e(1) to e(N−1) may be different from each other, but is otherwise similar to the example of FIG. 9.

As another example, the first information processing device A(1) can distribute the content of the algorithm e(1) for determining whether the other information processing devices A(2) to A(N) pass or fail a test, and acquire list information of the determination results regarding passing or failing the test for each of the information processing devices A(2) to A(N). In this case, each of the algorithms e(1) to e(N−1) prescribes a process of determining passing or failing by referencing information about a predetermined solution to the test. In this case, in the present example, the respective algorithms e(1) to e(N−1) are at least partially different from each other. For example, when there is a large number of problems containing a mix of problems to be solved and problems that do not need to be solved, and the mix is different for each of the information processing devices A(2) to A(N), the portion of the procedure that determines the problems to be graded (that is, the problems to be solved) may be different in each of the algorithms e(1) to e(N−1). Also, to issue a notification including the determination results regarding passing or failing for each of the information processing devices A(2) to A(N), each of the algorithms e(1) to e(N−1) prescribes a process of including information indicating the determination result regarding passing or failing in each device itself (the information processing devices A(2) to A(N)) in each of the computational result data f(1) to f(N−1).

Note that the example of FIG. 13 differs from the example of FIG. 9 in that the respective algorithms e(1) to e(N−1) may be different from each other, but is otherwise similar to the example of FIG. 9.

About Second Embodiment

As above, in the information processing system 1 according to the present embodiment, it is possible to increase the efficiency of executing predetermined computations using data from a plurality of information processing devices A(1) to A(N). In this case, in the information processing system 1 according to the present embodiment, it is possible to change the algorithm when the data stating an algorithm (algorithm data) is successively communicated by turns in each of the information processing devices A(2) to A(N). With this arrangement, in the information processing system 1 according to the present embodiment, it is possible to change the algorithm to make the processing appropriate along the entire route, for example.

Third Embodiment

Figure 14:
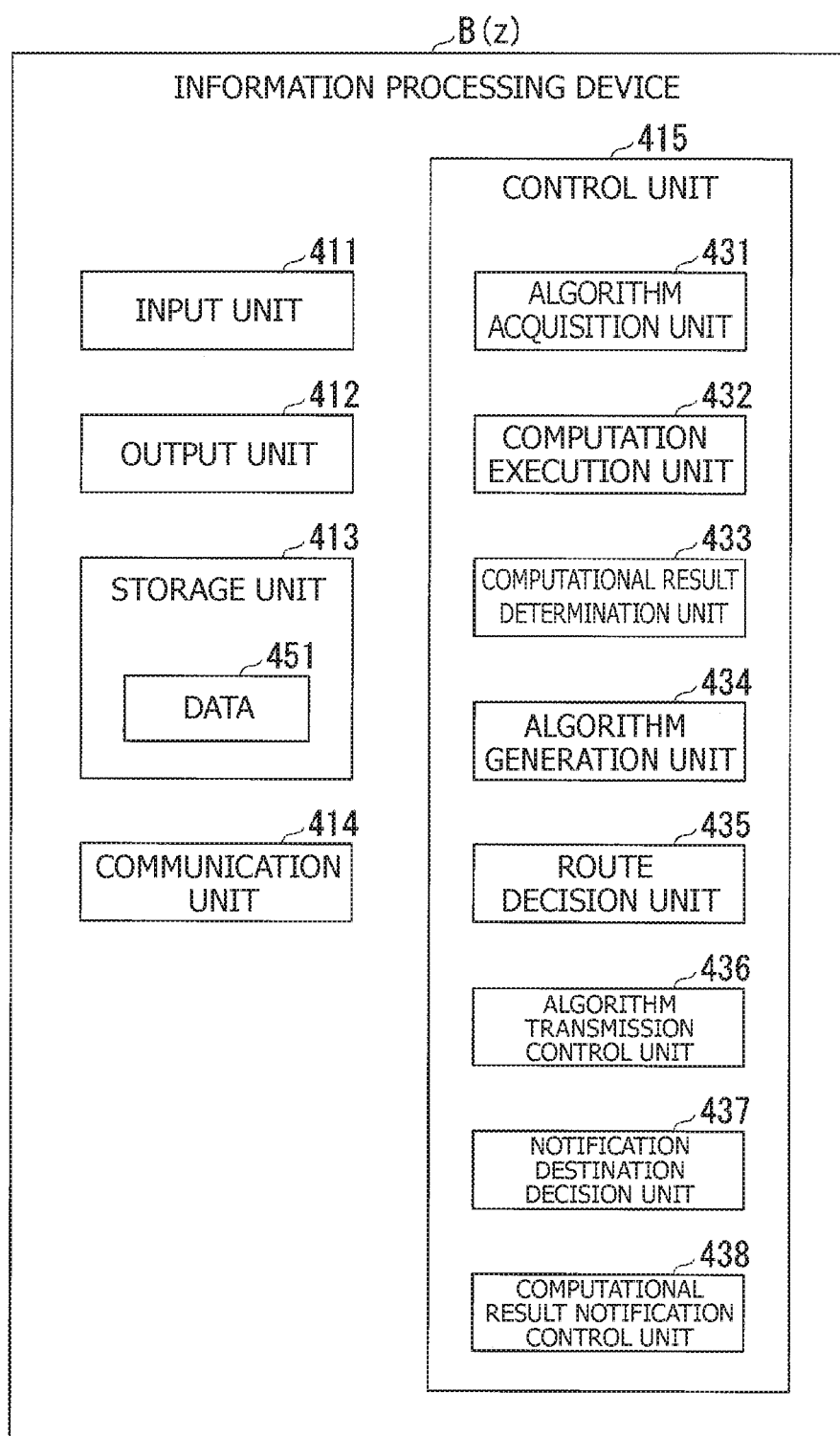
FIG. 14 is a diagram illustrating a schematic configuration example of a zth (where z=2 to N) information processing device according to an embodiment (third embodiment) of the present invention.
Figure 15:
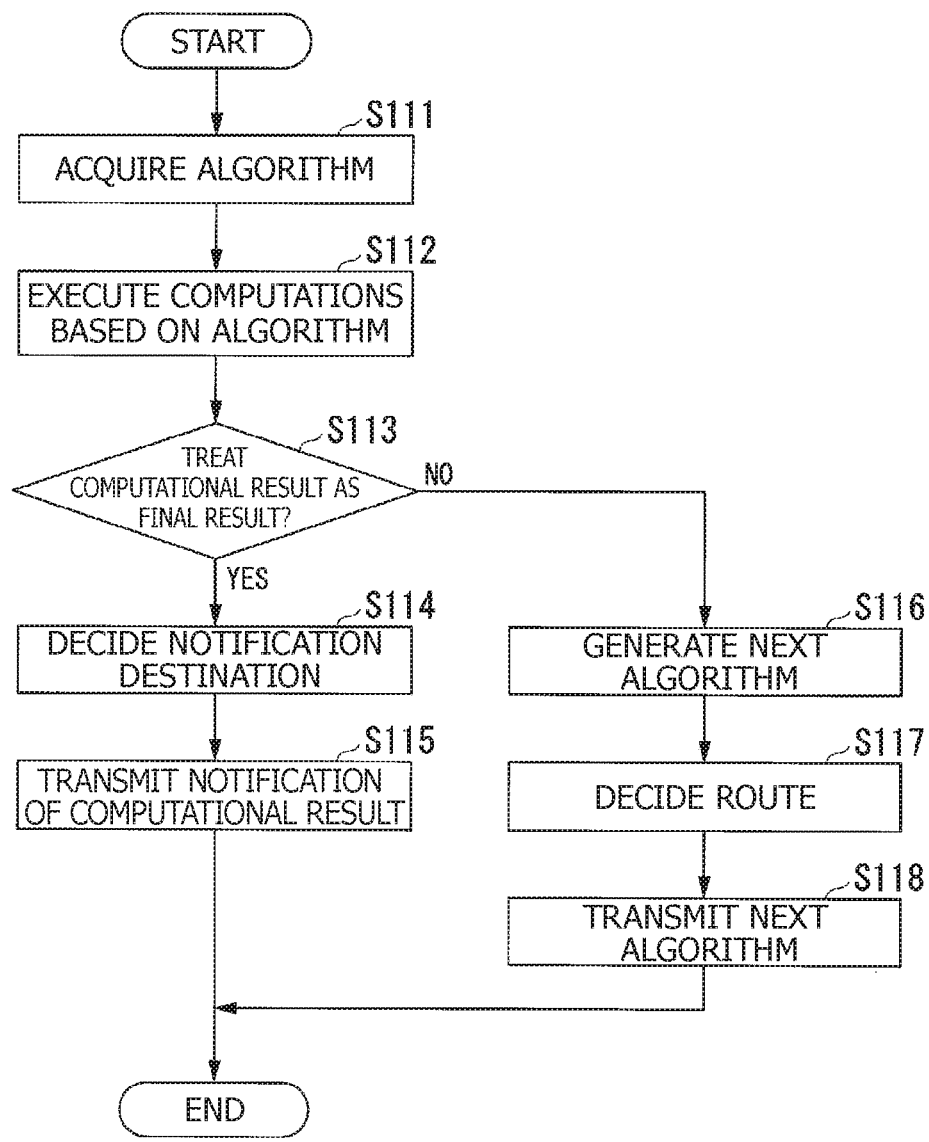
FIG. 15 is a diagram illustrating an example of a processing sequence in the zth (where z=2 to N) information processing device according to an embodiment (third embodiment) of the present invention.

The description will refer to FIGS. 14 and 15.

The present embodiment differs from the foregoing embodiments (the first embodiment and the second embodiment) by determining whether or not the execution result of the computations according to the algorithm by each of the information processing devices is an adequate result, but is otherwise similar to the foregoing embodiments. Consequently, for convenience, the present embodiment is described using the same signs (the signs illustrated in the diagrams) as the case of the foregoing embodiments (the first embodiment and the second embodiment), except for the signs illustrated in FIGS. 14 and 15.

Overview of Information Processing Device

FIG. 14 is a diagram illustrating a schematic configuration example of a zth (as an example, z=3 to N, but the description of the present embodiment also includes the case in which z=2) information processing device B(z) according to an embodiment (third embodiment) of the present invention. Note that in the present embodiment, the total number (N) of information processing devices included in the route may vary, but will be described as being N devices (in the present embodiment, N may vary) for convenience.

The zth information processing device B(z) is provided with an input unit 411, an output unit 412, a storage unit 413, a communication unit 414, and a control unit 415.

The functions of the input unit 411, the output unit 412, the storage unit 413, and the communication unit 414 are generally similar to the functions of the input unit 111, the output unit 112, the storage unit 113, and the communication unit 114 in the first information processing device A(1) according to the first embodiment, respectively, and detailed description is omitted here.

In the example of FIG. 14, the storage unit 413 stores data 451.

The control unit 415 is provided with an algorithm acquisition unit 431, a computation execution unit 432, a computational result determination unit 433, an algorithm generation unit 434, a route decision unit 435, an algorithm transmission control unit 436, a notification destination decision unit 437, and a computational result notification control unit 438.

The algorithm acquisition unit 431 acquires the algorithm data a(z−1) transmitted from the information processing device one turn earlier in the order, namely the (z−1)th information processing device B(z−1), and received by the communication unit 414. Also, in the case in which the computational result data b(z−2) is also transmitted from the (z−1)th information processing device B(z−1), the computational result data b(z−2) is also received by the communication unit 414.

The computation execution unit 432 uses the data 451 stored in the storage unit 413 to execute computations according to the algorithm acquired by the algorithm acquisition unit 431. In this case, the computation execution unit 432 follows the algorithm to execute the computations while also using the computational result data b(z−2) received from the (z−1)th information processing device B(z−1) as necessary.

With this arrangement, the computation execution unit 432 acquires the computational result data b(z−1). At this point, the computation execution unit 432 may cause some or all of the computational result data acquired in the information processing device(s) at earlier turns in the order to be included in the computational result data b(z−1), for example.

The computational result determination unit 433 determines whether or not to treat the computational result data b(z−1) obtained as a result of the computations executed by the computation execution unit 432 as a final computational result.

At this point, a predetermined basis of determination is used to determine whether or not the computational result in question is a final computational result, for example.

Any basis may be used as the predetermined basis of determination.

As an example, the basis used as the predetermined basis of determination may treat the computational result as the final computational result in the case in which the number of information processing devices ((z−1) devices) that have already executed computations according to an algorithm is equal to a predetermined threshold or greater, and not treat the computational result as the final computational result in other cases.

As another example, the basis used as the predetermined basis of determination may treat the computational result as the final computational result in the case in which the amount of information included in the obtained computational result is equal to a predetermined threshold or greater, and not treat the computational result as the final computational result in other cases.

As another example, the basis used as the predetermined basis of determination may treat the computational result as the final computational result in the case in which the length of time that has elapsed since the time at which the first algorithm data a(1) was transmitted from the first information processing device B(1) is equal to a predetermined threshold or greater, and not treat the computational result as the final computational result in other cases. In this case, information about the time or the length of time is successively transmitted from the first information processing device B(1) to the subsequent information processing devices B(j).

Note that a basis of determination that is the same for all of the information processing devices B(z) or a basis of determination that may be different for each of the information processing devices B(z) may be used as such a basis of determination, for example.

Also, such a basis of determination may be designated by the first information processing device B(1), or a basis of determination may be generated by each of the information processing devices B(z), for example.

As an example, all of the bases of determination of the second information processing device B(2) and subsequent information processing devices (in this example, the information processing devices up to the Nth information processing device B(N)) may be predetermined by the first information processing device B(1). In this case, information that respectively designates (specifies) all of these bases of determination may be included in the algorithm data a(1) transmitted from the first information processing device B(1), for example.

As another example, some or all of the second information processing device B(2) and subsequent information processing devices (in this example, the information processing devices up to the Nth information processing device B(N)) may independently generate a basis for determination. Any method may be used as the method of generating the basis of determination.

On the basis of the algorithm data a(z−1) received from the (z−1)th information processing device B(z−1), the algorithm generation unit 434 generates the algorithm of the algorithm data a(z) to transmit to the information processing device at the next turn in the order, namely the (z+1)th information processing device B(z+1).

The route decision unit 435 decides a route including at least the information processing device at the next turn in the order, namely the (z+1)th information processing device B(z+1). As an example, a configuration may be used in which each of the information processing devices B(1) to B(N−1) decides the information processing devices B(2) to B(N) at the next turn in the order (the next communication peer).

The algorithm transmission control unit 436 causes the communication unit 414 to transmit data stating an algorithm (the algorithm data a(z)) generated by the algorithm generation unit 434 to the (z+1)th information processing device B(z+1).

Here, in the present embodiment, information (route information) indicating the route decided by the route decision unit 435 is added to the algorithm data a(z).

The notification destination decision unit 437 decides another information processing device to be notified of the computational result data b(z−1).

In the present embodiment, the notification destination decision unit 437 decides the first information processing device B(1) as the notification destination. In the present embodiment, information that identifies the first information processing device B(1) is assumed to be included in the route information acquired by the Nth information processing device B(N) by traversing the first information processing device B(1) to the second and subsequent information processing devices B(2) to B(N−1).

As another example, the notification destination decision unit 437 may also decide a device other than the first information processing device B(1) as the notification destination. The device treated as the notification destination may be preset or decided in real time by the notification destination decision unit 437, for example.

As an example, information that identifies the device treated as the preset notification destination may be acquired by the Nth information processing device B(N) by traversing the first information processing device B(1) to the second and subsequent information processing devices B(2) to B(N−1). As another example, information that identifies the device treated as the notification destination may be preset in any information processing device (in this example, at least an information processing device that may become the Nth information processing device B(N)).

As another example, the notification destination decision unit 437 may also have a function similar to the information processing device search unit 132, and decide the notification destination on the basis of the results of information processing devices found in a search by the function, for example.

The computational result notification control unit 438 causes the communication unit 414 to transmit the computational result data b(z−1) to the notification destination decided by the notification destination decision unit 437 (in the present embodiment, the first information processing device B(1)).

Overview of Processes Performed in Information Processing Devices

FIG. 15 is a diagram illustrating an example of a processing sequence in the zth (where z=2 to N) information processing device B(z) according to an embodiment (third embodiment) of the present invention.

Step S111

The algorithm acquisition unit 431 acquires the algorithm stated in the algorithm data a(z−1) on the basis of the algorithm data a(z−1) transmitted from the information processing device B(z−1) one turn earlier in the order, and proceeds to the process of step S112.

Step S112

On the basis of the algorithm acquired by the algorithm acquisition unit 431, the computation execution unit 432 uses the data 451 stored in the storage unit 413 to execute computations according to the algorithm, and proceeds to the process of step S113.

Step S113

The computational result determination unit 433 determines whether or not to treat the result (computational result) of the computations executed by the computation execution unit 432 as the final computational result.

As a result of the determination, in the case in which the computational result determination unit 433 determines to treat the result (computational result) of the computations executed by the computation execution unit 432 as the final computational result, the flow proceeds to the process of step S114.

On the other hand, if the result of the determination is that the computational result determination unit 433 determines not to treat the result (computational result) of the computations executed by the computation execution unit 432 as the final computational result, the flow proceeds to the process of step S116.

Step S114

In the case in which the computational result determination unit 433 determines to treat the computational result as the final computational result, the notification destination decision unit 437 decides the notification destination of the computational result, and proceeds to the process of step S115. Note that in the case in which the first information processing device B(1) has designated the notification destination (for example, the first information processing device B(1)), the notification destination decision unit 437 decides the notification destination to be the designated notification destination. In this case, information designating the notification destination is transmitted from the first information processing device B(1) to the Nth information processing device B(N).

Step S115

The computational result notification control unit 438 notifies the notification destination by transmitting the computational result data b(z−1) based on the result of the computations executed by the computation execution unit 432 to the notification destination, and ends the current process flow.

Step S116

In the case in which the computational result determination unit 433 determines not to treat the computational result as the final computational result, the algorithm generation unit 434 generates an algorithm to transmit to the information processing device B(z+1) at the next turn in the order, and proceeds to the process of step S117.

Step S117

The route decision unit 435 decides a route including at least the next communication peer, and proceeds to the process of step S118. Note that in the case in which the first information processing device B(1) decides the entire route, the route decision unit 435 decides a route such that the route is the same as the already-decided route.

Step S118

The algorithm transmission control unit 436 transmits data (algorithm data a(z)) stating the algorithm generated by the algorithm generation unit 434 to the next communication peer (the (z+1)th information processing device B(z+1)) according to the route decided by the route decision unit 435, and ends the current process flow. At this time, the algorithm transmission control unit 436 also transmits the computational result data b(z−1) based on the result of the computations executed by the computation execution unit 432 to the next communication peer (the (z+1)th information processing device B(z+1)).

Here, the present embodiment illustrates a case in which the obtained computational result is determined to be treated as the final computational result in the Nth information processing device B(N), and the first information processing device B(1) is notified of the obtained computational result.

Note that in the present embodiment, in the case in which the obtained computational result is determined to be treated as the final computational result in any information processing device among the second information processing device B(2) to the (N−1)th information processing device B(N−1), the first information processing device B(1) is notified of the computational result obtained by the determining information processing device.

In addition, the basis of determination for determining whether or not to treat the obtained computational result as the final computational result in an information processing device may also be updated for each of the information processing devices B(z), for example.

Furthermore, the computational results obtained by a plurality of information processing devices B(z) may be compared, and the basis of determination for determining whether or not to treat the obtained computational result as the final computational result in an information processing device may be updated on the basis of a result of the comparison, for example. As an example, in the case in which the predetermined number or greater of computational results have the same value or values in a predetermined range, a basis of determination that accepts these computational results as valid may be generated. As another example, a basis of determination that does not accept computational results not having the same value or having a value outside a predetermined range as valid may be generated.

About Third Embodiment

As above, the information processing device B(z) according to the present embodiment determines whether or not to treat the computational result data b(z−1) obtained as a result of executing computations as the final computational result. With this arrangement, in the information processing device B(z) according to the present embodiment, in the case in which the computational result data is inadequate as the final computational result, the route can be lengthened (in other words, an algorithm can be transmitted to the next information processing device B(z+1)), whereas in the case in which the computational result data is adequate as the final computational result, the route can be closed (in other words, the transmission of an algorithm to another information processing device can be stopped).

Fourth Embodiment

The example of FIG. 1 according to the first embodiment illustrates a route in which the first information processing device A(1) to the Nth information processing device A(N) exist in a series relationship, but as another example, a route that includes a parallel portion may also be used.

The present embodiment describes a case in which a route that includes a parallel portion (also referred to as a "layered portion" for convenience) is used.

Figure 16:
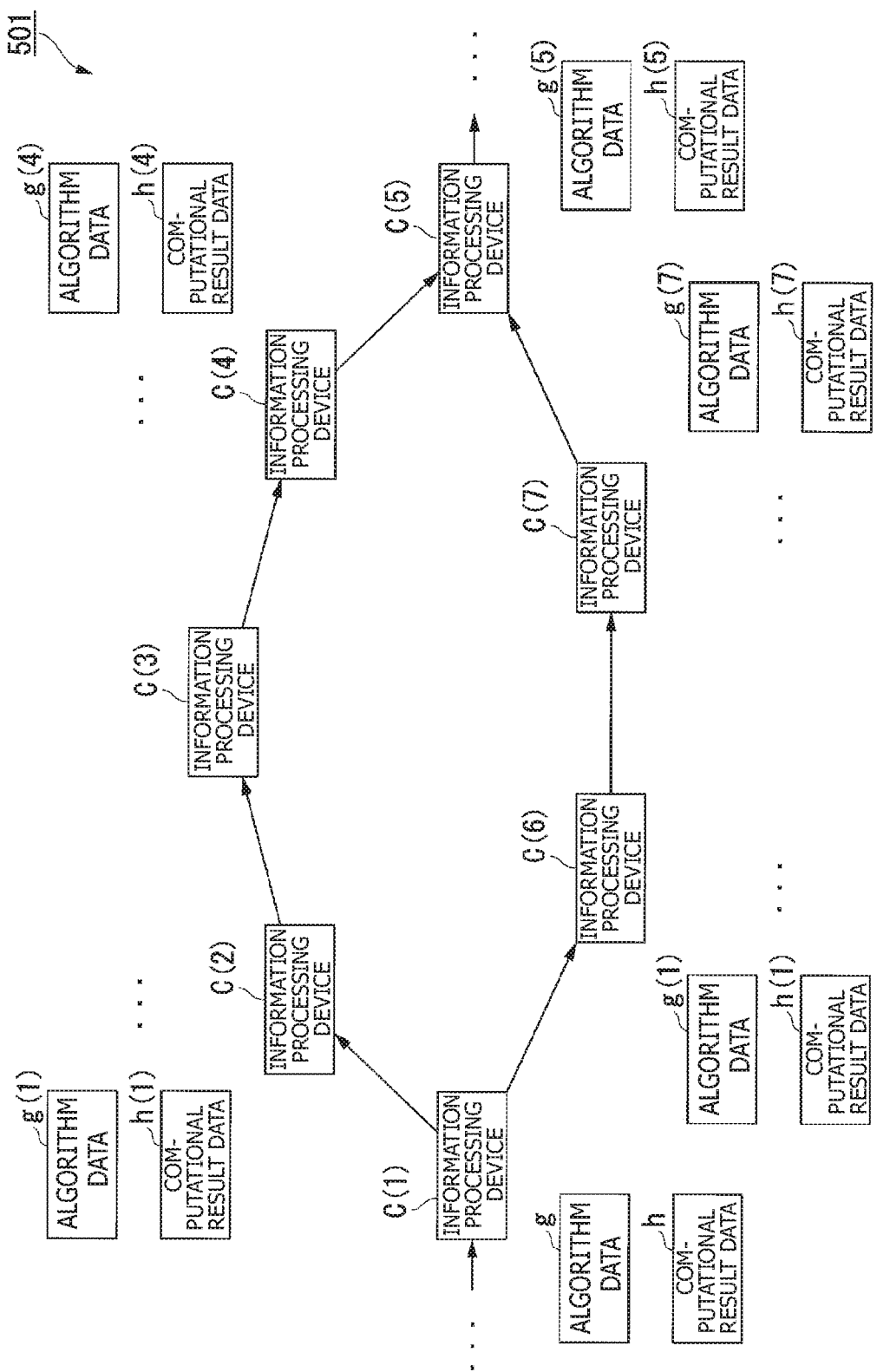
FIG. 16 is a diagram illustrating a schematic configuration example of a layered portion according to an embodiment (fourth embodiment) of the present invention.
Figure 17:
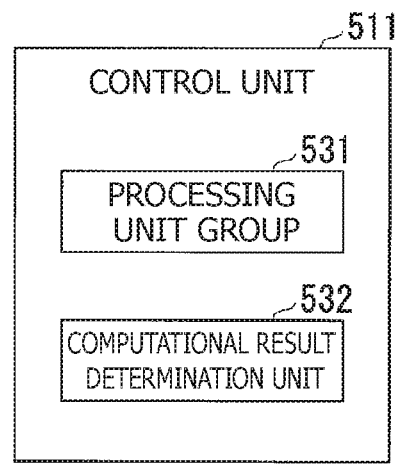
FIG. 17 is a diagram illustrating a schematic configuration example of a control unit in an information processing device according to an embodiment (fourth embodiment) of the present invention.
Figure 18:
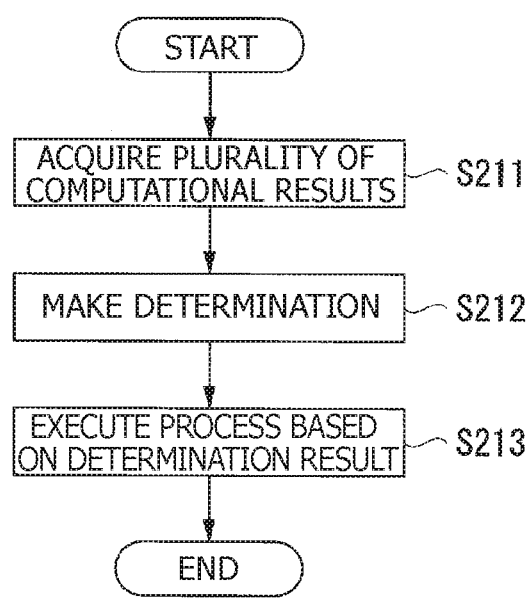
FIG. 18 is a diagram illustrating an example of a processing sequence performed in an information processing device according to an embodiment (fourth embodiment) of the present invention.

The description will refer to FIGS. 16 to 18.

The present embodiment differs from the foregoing embodiments (the first embodiment to the third embodiment) in that a route that includes a layered portion is used, but is otherwise similar to the foregoing embodiments. Consequently, for convenience, the present embodiment is described using the same signs (the signs illustrated in the diagrams) as the case of the foregoing embodiments (the first embodiment to the third embodiment), except for the signs illustrated in FIGS. 16 to 18.

Overview of Layered Portion Included in Route

FIG. 16 is a diagram illustrating a schematic configuration example of a layered portion 501 according to an embodiment (fourth embodiment) of the present invention.

FIG. 16 illustrates just the layered portion 501 of an entire route like the one illustrated in FIG. 1.

In the example of FIG. 16, seven information processing devices C(1) to C(7) are illustrated. Note that in the present embodiment, the numbers (1 to 7) of the plurality of information processing devices C(1) to C(7) do not necessarily match the turns (the order of the information processing devices on the route).

Between the information processing device C(1) and the information processing device C(5), a route section divided into two parallel branches exists. In other words, a route section containing the information processing device C(1), the information processing device C(2), the information processing device C(3), the information processing device C(4), and the information processing device C(5) in series and a route section containing the information processing device C(1), the information processing device C(6), the information processing device C(7), and the information processing device C(5) in series exist.

Herein, in the example of the entire route, one or more information processing devices (not illustrated) exist at turns before the information processing device C(1), while in addition, one or more information processing devices (not illustrated) exist at turns after the information processing device C(5).

Note that, as another example, the information processing device C(1) may also be the first information processing device, and furthermore, the information processing device C(5) may also be the Nth information processing device. Also, as another example, the information processing device C(5) may be the first information processing device that is notified of a computational result, and in the example of FIG. 16, receives a notification of the computational result from the two different information processing devices C(4) and C(7).

Also, although the present embodiment illustrates a route including a route section divided into two parallel branches, a route including a route section divided into three or more parallel branches may also be used. Furthermore, a route that includes two or more route sections with parallel branches (branching sections) may also be used.

In the example of FIG. 16, algorithm data g and computational result data h are transmitted to the information processing device C(1) from the information processing device (not illustrated) one turn earlier in the order than the information processing device C(1).

Also, provided that y=1 to 7, algorithm data g(y) and computational result data h(y) are transmitted from the information processing device C(y).

The information processing device C(1) transmits the algorithm data g(1) and the computational result data h(1) to the two different information processing devices C(2) and C(6).

Overview of Information Processing Device

FIG. 17 is a diagram illustrating a schematic configuration example of a control unit 511 in the information processing device C(5) according to an embodiment (fourth embodiment) of the present invention.

The information processing device C(5) receives the algorithm data g(4) and g(7) as well as the computational result data h(4) and g(7) from the two different information processing devices C(4) and C(7).

The control unit 511 in the information processing device C(5) is provided with a processing unit group 531 and a computational result determination unit 532.

The processing unit group 531 includes the various processing units illustrated in the foregoing embodiments (the first embodiment to the third embodiment), a detailed description of which is omitted here.

The computational result determination unit 532 makes a predetermined determination regarding a plurality of computational result data, and performs a predetermined process according to the result of the determination, as necessary.

Here, any of various types of determinations may be performed as the predetermined determination. For example, a determination such as a determination regarding consistency or a determination regarding properties such as the number of traversed information processing devices may be used, for example.

In addition, any of various types of processes may be used as the predetermined process. For example, a process such as a process of selecting one or more or a process of combining two or more may be used, for example.

Also, in the predetermined determination, a determination using a basis related to a predetermined process performed according to the result of the determination may be performed, for example. As a specific example, for the process of selecting one or more, a determination based on a basis for selecting may be performed, or for the process of combining two or more, a determination based on a basis for combining may be performed. As the basis for selecting, a basis for determining whether or not to select may be used, for example. As the basis for combining, a basis such as a basis for determining whether or not to combine or a basis for determining (deciding) a ratio of combination may be used, for example.

As an example, the computational result determination unit 532 determines the consistency of a plurality of computational result data, and performs a process according to the result of the determination, as necessary. For example, the computational result determination unit 532 performs a process of combining the plurality of computational result data determined to be consistent. Note that the computational result determination unit 532 may also perform a process of selecting (adopting) a portion (or alternatively, not adopting a portion) of the plurality of computational result data determined to be inconsistent.

In the example of FIG. 16, the computational result determination unit 532 determines that the computational result data h(4) and h(7) are consistent by confirming that the computational result data h(4) has traversed the three information processing devices C(2), C(3), and C(4), and the computational result data h(7) has traversed the two information processing devices C(6) and C(7). As a result of this determination, the computational result determination unit 532 performs a process of combining the computational result data h(4) and h(7), and treats the combined result as a single piece of computational result data.

In this way, the computational result determination unit 532 may be configured to determine the consistency of a plurality of computational result data, and on the basis of the result of the determination, perform a process such as selecting which computational result data to adopt or discard, or combining the computational result data. In addition, the computational result determination unit 532 may also decide a ratio of combination and combine computational result data according to the decided ratio of combination.

As another example, the computational result determination unit 532 determines the number of traversed information processing devices for a plurality of computational result data, and performs a process according to the result of the determination, as necessary. For example, the computational result determination unit 532 performs a process of selecting (adopting) computational result data that has traversed more information processing devices after branching, and discarding (not adopting) any other computational result data.

In the example of FIG. 16, the computational result determination unit 532 confirms that the computational result data h(4) has traversed the three information processing devices C(2), C(3), and C(4) while the computational result data h(7) has traversed the two information processing devices C(6) and C(7), and thereby determines to select the computational result data h(4) that has traversed more information processing devices. As a result of this determination, the computational result determination unit 532 performs a process of selecting the computational result data h(4).

Here, in the case in which three of more pieces of computational result data exist after branching, the computational result determination unit 532 may select one piece of computational result data or select a predetermined number of two or more pieces of computational result data, for example.

In the case of selecting a predetermined number of two or more pieces of computational result data, the computational result determination unit 532 may select the predetermined number of pieces of computational result data in order of the most traversed information processing devices, for example.

In this case, the computational result determination unit 532 may also combine the selected two or more pieces of computational result data.

In this way, the computational result determination unit 532 may be configured to determine the number of traversed information processing devices for a plurality of computational result data, and on the basis of the result of the determination, perform a process such as selecting which computational result data to adopt or discard, or combining the computational result data. In addition, the computational result determination unit 532 may also decide a ratio of combination and combine computational result data according to the decide ratio of combination.

At this point, any basis other than those given as an example may also be used as the basis for selecting which computational result data to adopt or discard. For example, a basis such as a basis that preferentially selects computational result data received at an earlier (or later) time or a basis that preferentially selects computational result data that has traversed a specific information processing device may be used, for example.

Also, the computational result determination unit 532 may select a single piece of computational result data, select a predetermined number of two or more pieces of computational result data, or select any number of pieces of computational result data satisfying a predetermined basis. For example, the computational result determination unit 532 may select all computational result data that satisfy a predetermined basis. With this configuration, the case of selecting all of the computational result data among the candidate computational result data, the case of selecting a portion of the computational result data among the candidate computational result data, and the case of selecting none of the computational result data are conceivable. Note that a configuration may also be used in which the computational result determination unit 532 selects at least one piece of computational result data on the basis of a predetermined basis, for example.

In addition, the predetermined basis may be set using a threshold, for example. In this case, a configuration can be used in which the predetermined basis is determined to be satisfied when a predetermined value related to the computational result data is equal to or greater than a predetermined threshold (or alternatively, less than a predetermined threshold or the like). The value used as the predetermined value may be a value such as the number of traversed information processing devices, for example.

Overview of Processes Performed in Information Processing Devices

FIG. 18 is a diagram illustrating an example of a processing sequence performed in the information processing device C(5) according to an embodiment (fourth embodiment) of the present invention.

Step S211

The computational result determination unit 532 acquires a plurality of computational results received for a plurality of parallel route sections.

Step S212

The computational result determination unit 532 determines a property such as whether the acquired plurality of computational results is consistent or inconsistent, or the number of traversed information processing devices. Note that the content of the determination is not limited to the above, and the content of a variety of other determinations may also be used.

Step S213

The computational result determination unit 532 executes a process on the basis of the result of the determination on the acquired plurality of computational results.

Here, as an example regarding a determination of consistency or inconsistency, the computational result determination unit 532 may execute a process of combining a plurality of computational results in the case of determining that the computational results are consistent. The process used as the process of combining the plurality of computational results may be a process of generating information including all of the information of the plurality of computational results as the combined result, for example.

As another example regarding a determination of consistency or inconsistency, the computational result determination unit 532 may execute a process of selecting and adopting one or more computational results as a portion of the plurality of computational results in the case of determining that the computational results are inconsistent. Any of various rules may be used and preset as the rule for selecting one or more of the plurality of computational results, for example.

Here, in the example of FIG. 16, the information processing device C(5) receives two pieces of algorithm data g(4) and g(7).

In the case in which the same algorithm is stated in each of the two pieces of algorithm data g(4) and g(7), in the information processing device C(5), it is sufficient for the function of an algorithm acquisition unit (for example, the algorithm acquisition unit 231 illustrated in FIG. 3) to acquire the algorithm stated in either piece of algorithm data g(4) or g(7).

On the other hand, in the case in which different algorithms are respectively stated in the two pieces of algorithm data g(4) and g(7), in the information processing device C(5), the function of an algorithm acquisition unit (for example, the algorithm acquisition unit 231 illustrated in FIG. 3) may acquire the algorithm stated in either piece of algorithm data g(4) or g(7), or acquire the respective algorithms stated in both pieces of algorithm data g(4) and g(7). Also, in the information processing device C(5), the function of an algorithm generation unit (for example, the algorithm generation unit 233 illustrated in FIG. 3) may generate an algorithm combining the algorithms respectively stated in such a plurality of algorithm data, for example.

Note that the result of determining a property such as the consistency of the plurality of computational result data or the number of traversed information processing devices may also be utilized in deciding a route in the future, for example. For example, a method may be used in which information such as a numerical value expressing the consistency of the plurality of computational result data or a numerical value expressing the number of traversed information processing devices (also referred to as "determination value information" for convenience) is calculated, and in the case in which the determination value (determination value information) of the computational result data obtained for the plurality of information processing devices is a predetermined threshold or higher (which is herein treated as a positive outcome), the combination of the plurality of information processing devices is included in a future route, whereas in the case in which the determination value (determination value information) of the computational result data obtained for the plurality of information processing devices is lower than the predetermined threshold (which is herein treated as a negative outcome), the combination of the plurality of information processing devices is not included in a future route.

About Fourth Embodiment

As above, in the information processing device C(5) according to the present embodiment, a property such as the consistency or inconsistency of a plurality of computational results or the number of traversed information processing devices is determined. With this arrangement, in the information processing device C(5) according to the present embodiment, a determination result regarding the plurality of computational results can be utilized in a process such as selecting each of the computational results or combining two or more of the computational results, for example.

Here, a configuration capable of toggling the process of making a determination by the computational result determination unit 532 on or off may also be used. Such toggling may be performed according to an operation performed by a user of the information processing device C(5) or the like, or may be performed automatically by the information processing device C(5) according to a predetermined rule, for example. In the state in which the process of making a determination by the computational result determination unit 532 is on, the computational result determination unit 532 makes a predetermined determination and performs a predetermined process, as necessary. On the other hand, in the state in which the process of making a determination by the computational result determination unit 532 is off, the computational result determination unit 532 performs a predetermined process such as selecting which computational result data to adopt or discard or combining the computational result data in a predetermined manner, without making a predetermined determination, for example.

Fifth Embodiment

The present embodiment describes a case of aggregating data from one or more information processing devices not included on a route into one or more information processing devices included on the route.

The description will refer to FIGS. 19 to 23.

The present embodiment differs from the foregoing embodiments (the first embodiment to the fourth embodiment) in that data aggregation is performed, but is otherwise similar to the foregoing embodiments. Consequently, for convenience, the present embodiment is described using the same signs (the signs illustrated in the drawings) as the case of the foregoing embodiments (the first embodiment to the fourth embodiment), except for the signs illustrated in FIGS. 19 to 23.

Data Aggregation

First, data aggregation will be described.

Figure 19:
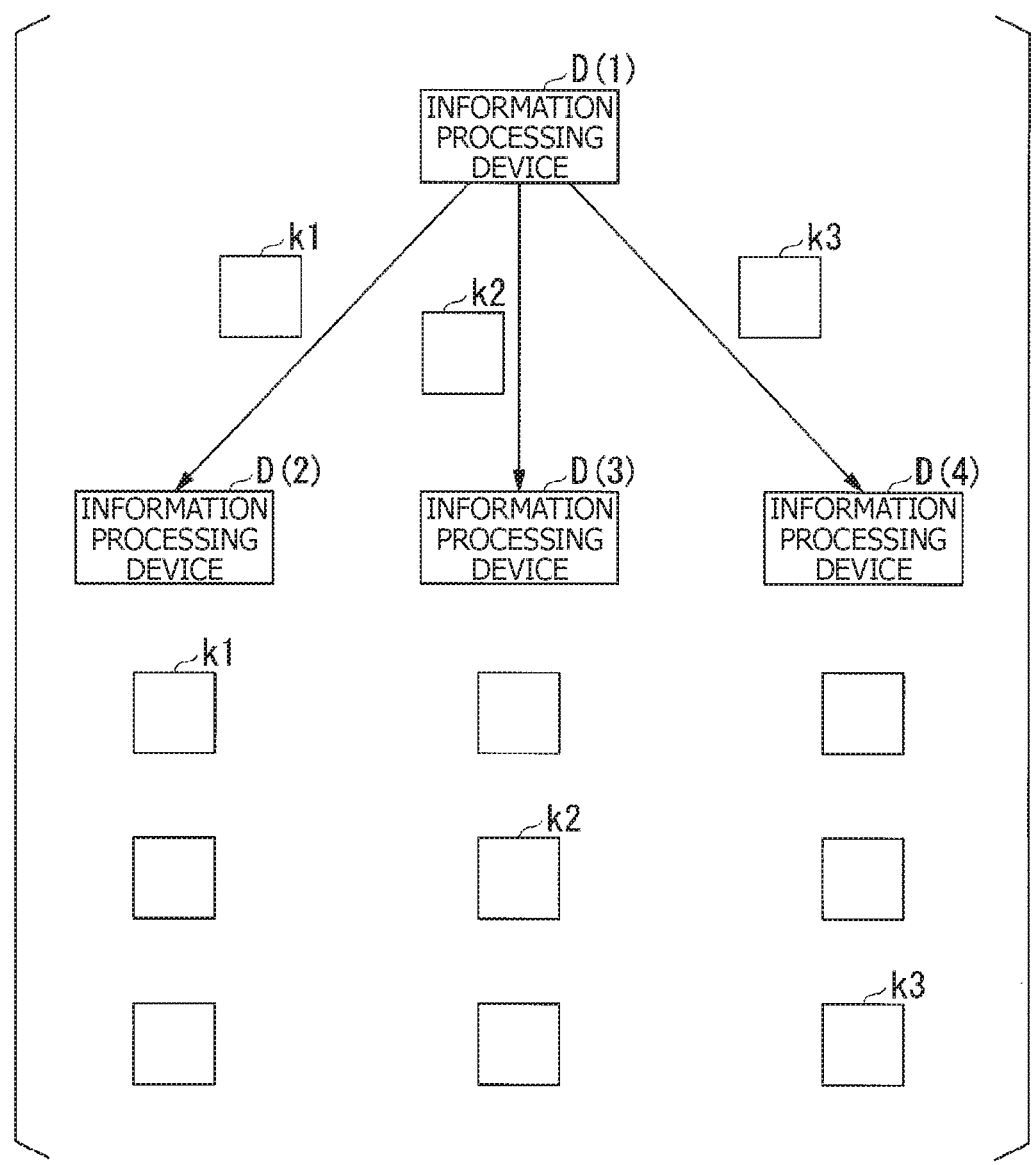
FIG. 19 is a diagram illustrating an outline of data aggregation performed in information processing devices according to an embodiment (fifth embodiment) of the present invention.
Figure 20:
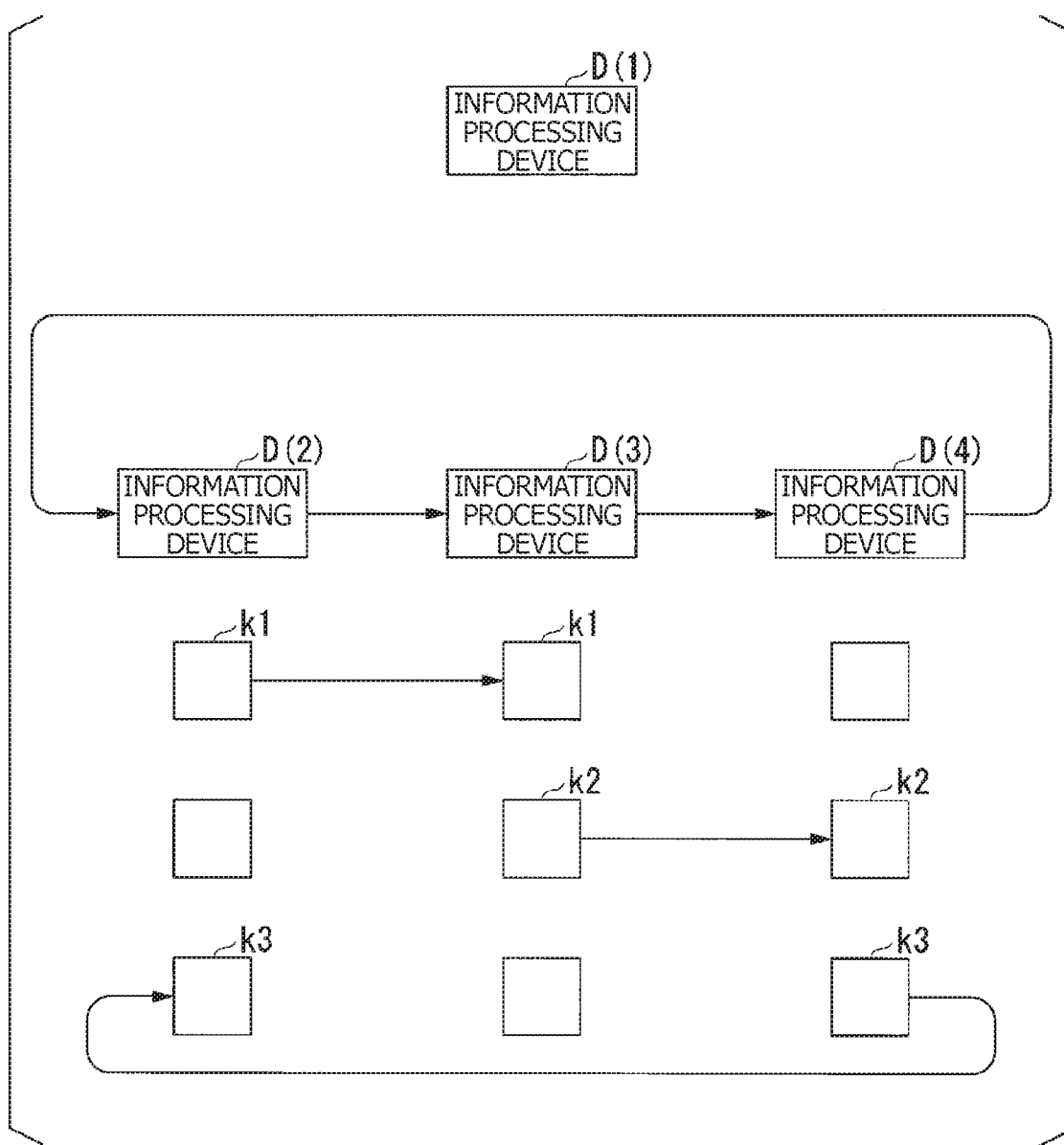
FIG. 20 is a diagram illustrating an outline of data aggregation performed in information processing devices according to an embodiment (fifth embodiment) of the present invention.
Figure 21:
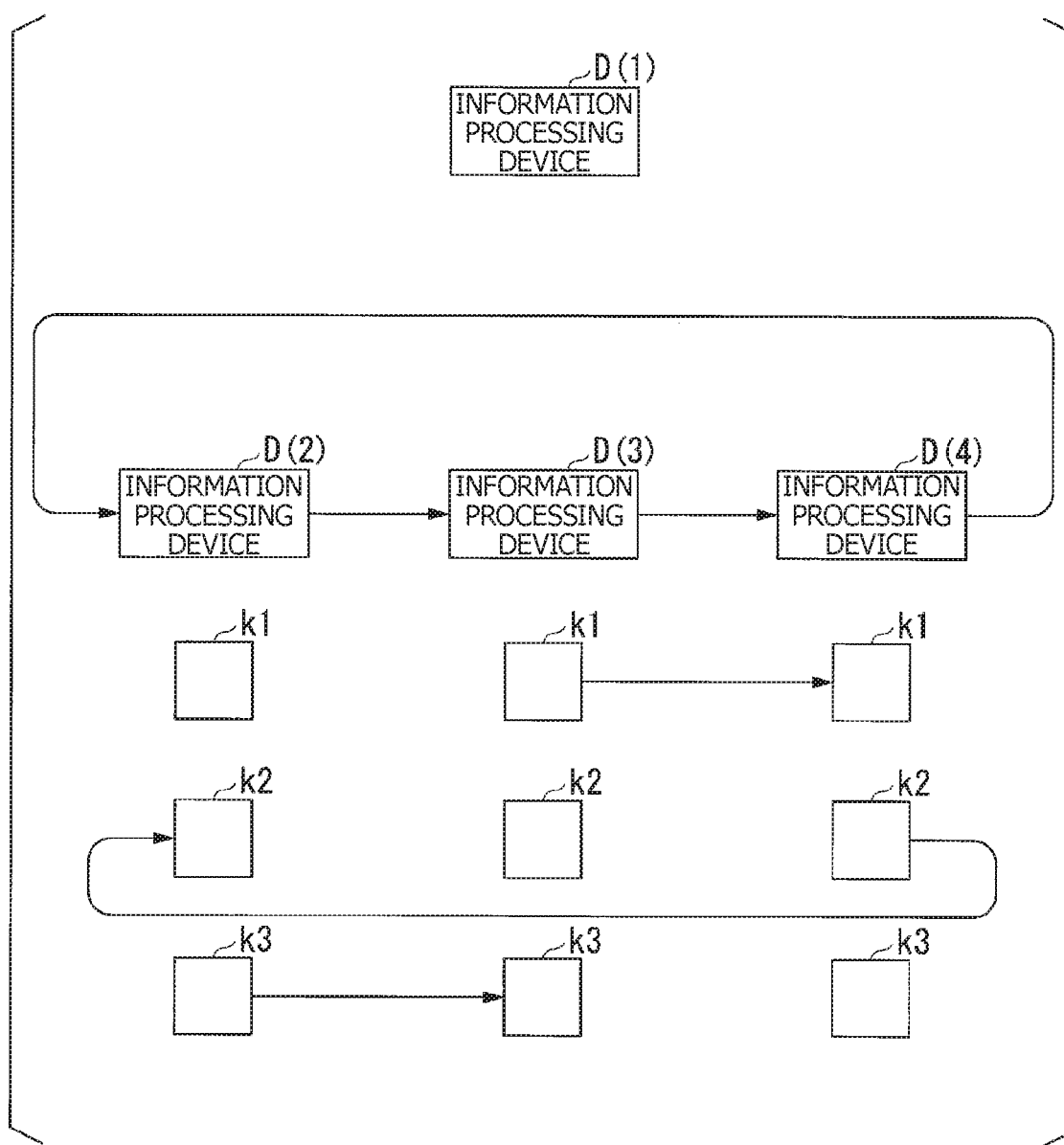
FIG. 21 is a diagram illustrating an outline of data aggregation performed in information processing devices according to an embodiment (fifth embodiment) of the present invention.

FIGS. 19, 20, and 21 are each a diagram illustrating an outline of data aggregation performed in information processing devices D(1) to D(4) according to an embodiment (fifth embodiment) of the present invention.

FIG. 19 illustrates four information processing devices D(1) to D(4). Note that in the present embodiment, the numbers (1 to 4) of the plurality of information processing devices D(1) to D(4) do not necessarily match the turns (the order of the information processing devices on the route).

The information processing device D(1) stores three pieces of data k1 to k3 in its own storage unit (not illustrated). The present case illustrates an example of a method of causing the data k1 to k3 to be stored in the other information processing devices D(2) to D(4).

In the example of FIG. 19, the information processing device D(1) transmits one piece of data k1 to the information processing device D(2), transmits another piece of data k2 to the information processing device D(3), and transmits another piece of data k3 to the information processing device D(4). With this arrangement, each of the information processing devices D(2) to D(4) stores one piece each of the three pieces of data k1 to k3.

Note that the information processing device D(1) and the three information processing devices D(2) to D(3) may exist in a server-client relationship with each other, for example.

In the example of FIG. 20, the information processing device D(2) transmits one piece of data k1 to the information processing device D(3). The information processing device D(3) transmits one piece of data k2 to the information processing device D(4). The information processing device D(4) transmits one piece of data k3 to the information processing device D(2).

With this arrangement, each of the information processing devices D(2) to D(4) stores two pieces each of the three pieces of data k1 to k3.

In the example of FIG. 21, the information processing device D(2) transmits one piece of data k3 to the information processing device D(3). The information processing device D(3) transmits one piece of data k1 to the information processing device D(4). The information processing device D(4) transmits one piece of data k2 to the information processing device D(2).

With this arrangement, each of the information processing devices D(2) to D(4) stores all of the three pieces of data k1 to k3.

In the examples of FIGS. 19 to 21, the plurality of information processing devices D(2) to D(3) complement and share the data received from the information processing device D(1) with the other information processing devices D(2) to D(3) automatically, for example.

As illustrated in FIGS. 19 to 21, when causing shared data k1 to k3 to be stored in the plurality of information processing devices D(2) to D(4), in many cases, a process of exchanging the data k1 to k3 among the information processing devices D(2) to D(4) is more efficient than a process of the single information processing device D(1) transmitting the data k1 to k3 to each of the information processing devices D(2) to D(4), for example.

The information processing system according to the present embodiment uses such a process of data aggregation.

Here, with the technology illustrated in FIGS. 19 to 21, it is possible to deliver the data k1 to k3 to the plurality of information processing devices D(2) to D(3) in a distributed manner, for example.

For example, in the plurality of information processing devices D(2) to D(4), distributed encryption of the data k1 to k3 may be performed, and secret sharing scheme may be used as a specific example.

Also, after the delivery of the data k1 to k3 to the plurality of information processing devices D(2) to D(4) is completed, usage rights (also called "terms of use" or the like) for the data k1 to k3 may be managed in the information processing device D(1) that is the source of the data distribution or in another predetermined device (not illustrated). In this case, even if the data k1 to k3 is shared by the plurality of information processing devices D(2) to D(4), only a device with rights will be able to use the data k1 to k3.

Overview of Information Processing System

Figure 22:
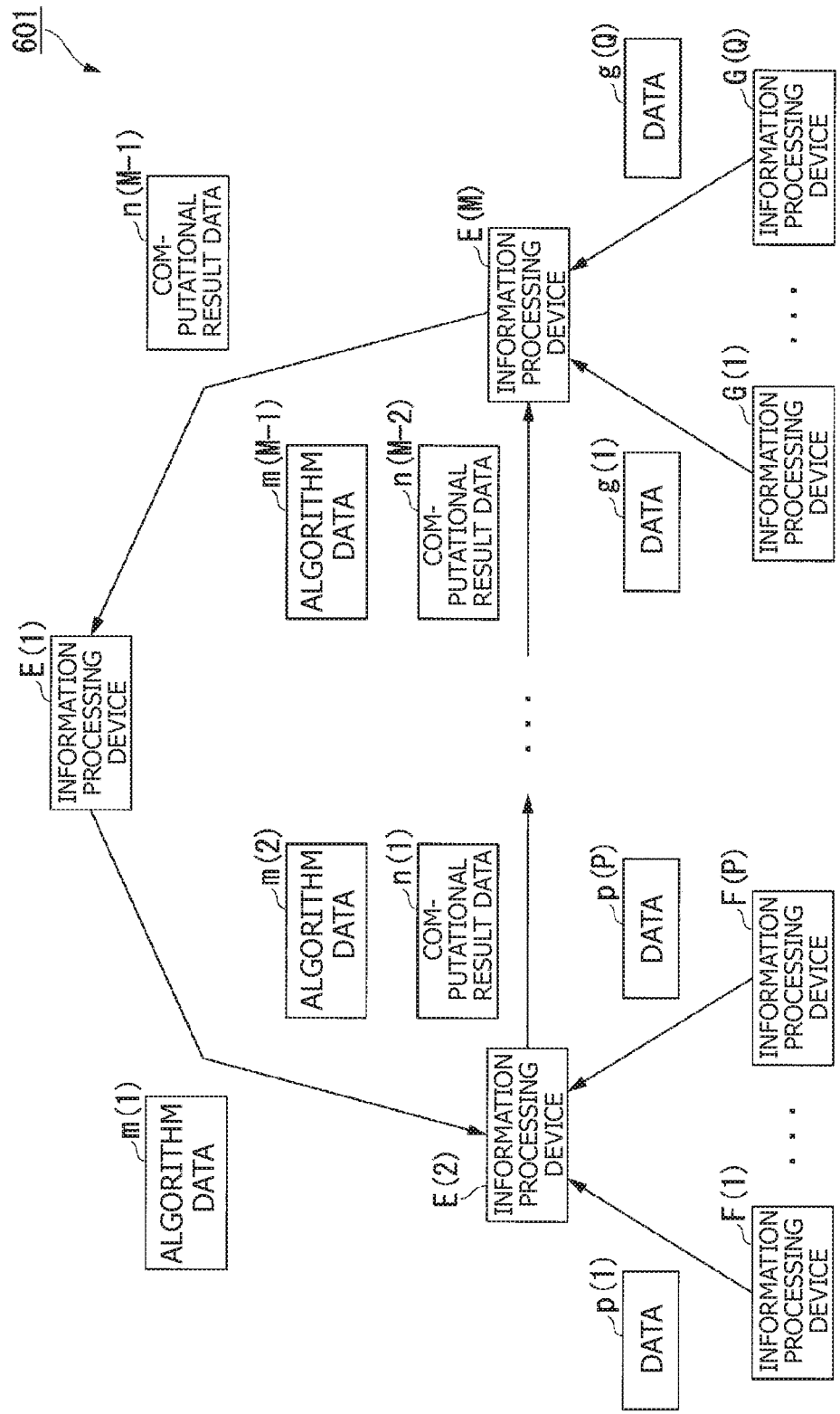
FIG. 22 is a diagram illustrating a schematic configuration example of an information processing system according to an embodiment (fifth embodiment) of the present invention.

FIG. 22 is a diagram illustrating a schematic configuration example of an information processing system 601 according to an embodiment (fifth embodiment) of the present invention.

The information processing system 601 according to the present embodiment is provided with M (in the present embodiment, M is taken to be an integer equal to or greater than 3) information processing devices E(1) to E(M).

Also, the information processing system 601 according to the present embodiment is provided with P (in the present embodiment, P is taken to be an integer equal to or greater than 1) information processing devices F(1) to F(P).

Also, the information processing system 601 according to the present embodiment is provided with Q (in the present embodiment, Q is taken to be an integer equal to or greater than 1) information processing devices G(1) to G(Q).

The example of FIG. 22 illustrates algorithm data m(1) to m(M−1) respectively transmitted from the information processing devices E(1) to E(M−1) and computational result data n(1) to n(M−1) respectively transmitted from each of the information processing devices E(2) to E(M).

Also, the information processing devices F(1) to F(P) respectively store data p(1) to p(P).

Also, the information processing devices G(1) to G(Q) respectively store data q(1) to q(Q).

Overview of Operations by Information Processing System

In the information processing system 601 according to the present embodiment, first, the information processing devices communicate with each other to aggregate data into specific information processing devices (in the example of FIG. 22, the information processing devices E(2) and E(M)).

In the example of FIG. 22, each of the information processing devices F(1) to F(P) transmits the data p(1) to p(P) stored in the information processing device itself to the information processing device E(2). The information processing device E(2) receives and stores the data p(1) to p(P) in its own storage unit.

Also, in the example of FIG. 22, each of the information processing devices G(1) to G(Q) transmits the data q(1) to q(Q) stored in the information processing device itself to the information processing device E(M). The information processing device E(M) receives and stores the data q(1) to q(Q) in its own storage unit.

Here, the information processing device E(2) and the information processing device E(M) are included on a route on which an algorithm is successively transmitted.

Following the flow of the route, the information processing device E(2) uses the bundle of data p(1) to p(P) aggregated from the other information processing devices F(1) to F(P) or a bundle in which the data p(1) to p(P) is included in data (not illustrated) stored in the information processing device E(2) itself to execute computations according to the algorithm.

Similarly, following the flow of the route, the information processing device E(M) uses the bundle of data q(1) to q(Q) aggregated from the other information processing devices G(1) to G(Q) or a bundle in which the data q(1) to q(Q) is included in data (not illustrated) stored in the information processing device E(M) itself to execute computations according to the algorithm.

Overview of Processes Performed in Information Processing System

Figure 23:
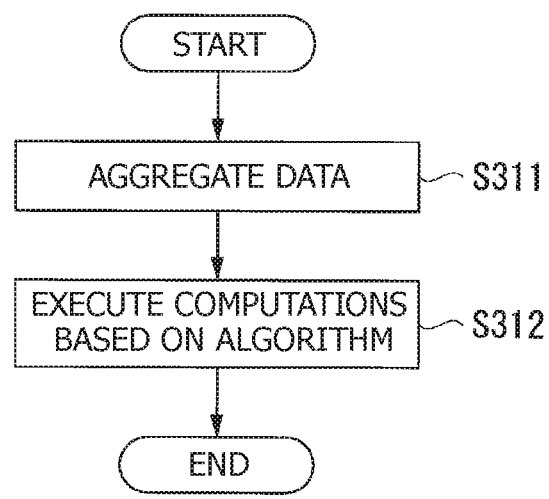
FIG. 23 is a diagram illustrating an example of a processing sequence performed in an information processing system according to an embodiment (fifth embodiment) of the present invention.

FIG. 23 is a diagram illustrating an example of a processing sequence performed in the information processing system 601 according to an embodiment (fifth embodiment) of the present invention.

Step S311

In the information processing system 601, first, data aggregation is performed, and the flow proceeds to the process of step S312. With this arrangement, data to be used in computations according to an algorithm is aggregated into specific information processing devices (in the example of FIG. 22, the information processing devices E(2) and E(M)).

Step S312

In the information processing system 601, following the flow of the route, a process such as the execution of computations according to an algorithm (for example, a process similar to the case of the example of FIG. 1) is successively performed on the basis of the algorithm by turns in the first information processing device E(1) to the Mth information processing device E(M).

About Fifth Embodiment

As above, in the information processing system 601 according to the present embodiment, data (herein, data that is not algorithm data) stored in each of a plurality of different information processing devices (in the example of FIG. 22, the plurality of different information processing devices F(1) to F(P) and E(2) or the plurality of different information processing devices G(1) to G(Q) and E(M)) is transferred among the plurality of different information processing devices, and thereafter, the flow of a route is followed to execute computations according to an algorithm.

According to such a configuration, in the information processing system 601 according to the present embodiment, increased efficiency can be attained with respect to data aggregation and the execution of computations according to an algorithm as a whole.

As a specific example, all of the data stored in 10 different information processing devices may be transmitted and aggregated into a single information processing device (herein referred to as the "information processing device R1" for convenience) among the 10, all of the data stored in another 10 different information processing devices may be transmitted and aggregated into a single information processing device (herein referred to as the "information processing device R2" for convenience) among the other 10, and a route that includes these two information processing devices R1 and R2 may be formed (decided).

As above, in the information processing system 601 according to the present embodiment, the data p(1) to p(P) and q(1) to q(Q) is transferred from one or more information processing devices F(1) to F(P) and G(1) to G(Q) not included on a route to one or more information processing devices E(2) and E(M) included on the route, and in the information processing devices E(2) and E(M) included on the route, computations are executed on the basis of an algorithm using the data p(1) to p(P) and q(1) to q(Q).

With this arrangement, in the information processing system 601 according to the present embodiment, a process that is efficient as a whole can be achieved.

About Information Processing Devices

In the foregoing embodiments (the first embodiment to the fifth embodiment), any of various types of information processing devices may be used as the information processing devices included on a route.

Information Processing Devices on a Plurality of Different Networks

Figure 24:
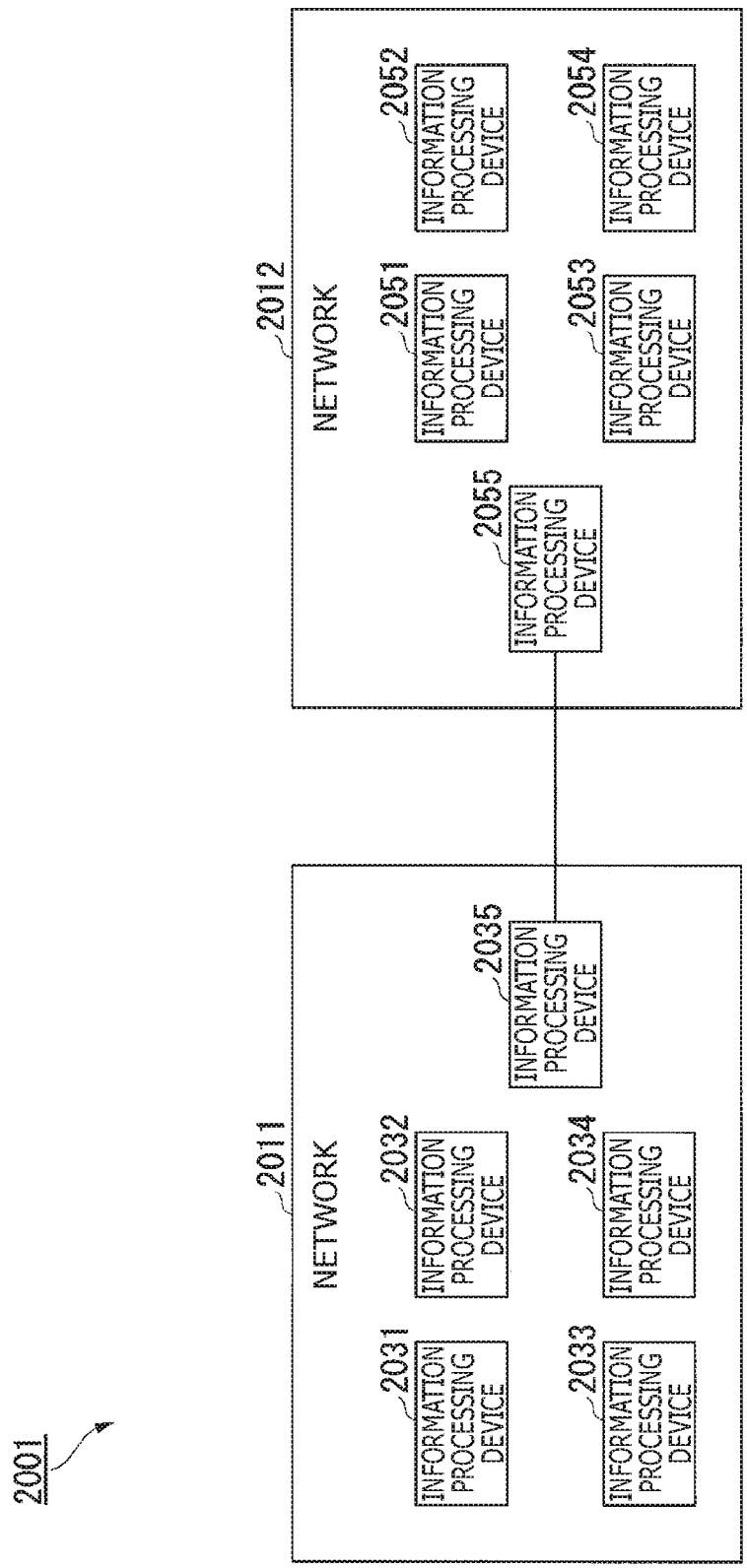
FIG. 24 is a diagram illustrating an example of a communication system.

FIG. 24 is a diagram illustrating an example of a communication system 2001.

The communication system 2001 includes a plurality of (in the example of FIG. 24, two) networks 2011 and 2012.

The network 2011 includes a plurality of information processing devices 2031 to 2035.

The network 2012 includes a plurality of information processing devices 2051 to 2055.

The example of FIG. 24 illustrates a case in which the two information processing devices 2035 and 2055 on the plurality of different networks 2011 and 2012 communicate with each other.

In the foregoing embodiments (the first embodiment to the fifth embodiment), the information processing devices included on a single route may be information processing devices included on the same network (in the example of FIG. 24, the network 2011 or the network 2012) or information processing devices included on different networks, for example.

Also, in the data aggregation as illustrated in FIGS. 19 to 22, the information processing devices that communicate with each other may be information processing devices included on the same network (in the example of FIG. 24, the network 2011 or the network 2012) or information processing devices included on different networks, for example.

Information Processing Devices on Serverless Network

Figure 25:
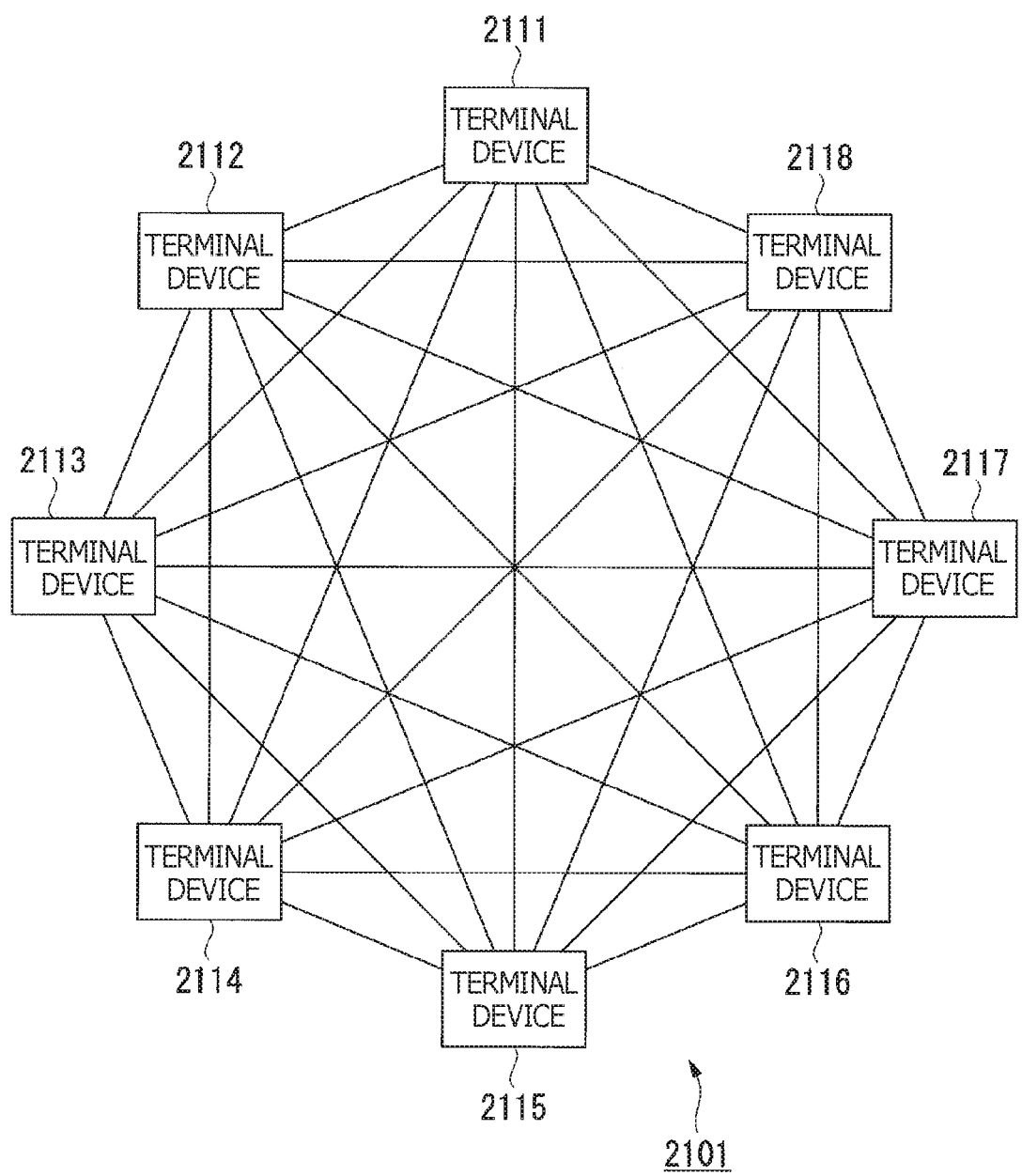
FIG. 25 is a diagram illustrating an example of a serverless communication system.

FIG. 25 is a diagram illustrating an example of a serverless communication system 2101.

The communication system 2101 is provided with a plurality of terminal devices 2111 to 2118. In this example, each of the terminal devices 2111 to 2118 corresponds to an information processing device.

In the communication system 2101, a server is not present, and the terminal devices 2111 to 2118 communicate with each other. The example of FIG. 25 illustrates a case in which each of the terminal devices 2111 to 2118 is capable of communicating with the other terminal devices 2111 to 2118 by round robin.

In the communication system 2101, cooperation by the terminal devices 2111 to 2118 makes it possible to construct an infrastructure without the need for a server.

In the communication system 2101, P2P communication may also be performed by crossing networks configured using network address translation (NAT), for example.

In the foregoing embodiments (the first embodiment to the fifth embodiment), some or all of the information processing devices included on a single route may be terminal devices included in the serverless communication system 2101, for example.

Also, in the data aggregation as illustrated in FIGS. 19 to 22, some or all of the information processing devices that communicate with each other may be terminal devices included in the serverless communication system 2101, for example.

Overview of Hardware Configuration of Information Processing Device

Figure 26:
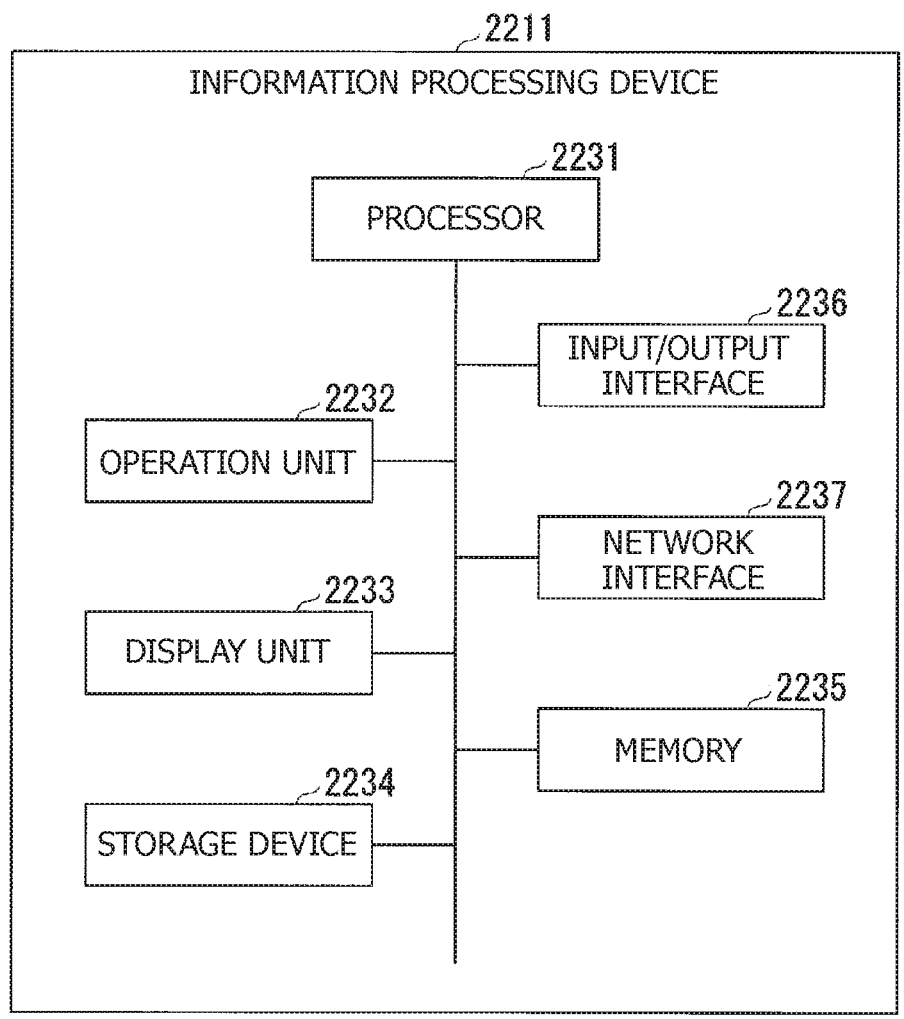
FIG. 26 is a diagram illustrating an example of a hardware configuration of an information processing device according to an embodiment of the present invention.

FIG. 26 is a diagram illustrating an example of a hardware configuration of an information processing device 2211 according to an embodiment of the present invention.

The information processing device 2211 having the hardware configuration as illustrated in FIG. 26 may be used as the information processing devices in the foregoing embodiments (the first embodiment to the fifth embodiment).

Note that a configuration like that of the information processing device 2211 according to the example of FIG. 26 may also be partially modified and applied to a variety of devices, for example.

In the example of FIG. 26, the information processing device 2211 is provided with a processor 2231, an operation unit 2232, a display unit 2233, a storage device 2234, memory 2235, an input/output interface 2236, a network interface 2237, and a bus 2311 connecting these components.

The processor 2231 includes a central processing unit (CPU) or the like, and executes a program to thereby execute processing prescribed by the program.

The operation unit 2232 is provided with one or more input devices such as a keyboard and a mouse, and receives operations performed by a user (person).

The display unit 2233 has a screen, and outputs by displaying information on the screen.

The storage device 2234 is a non-volatile storage unit including a hard disk or the like, for example, and stores data. The storage device 2234 (or the memory 2235) may also store the program executed by the processor 2231, for example.

The memory 2235 is a volatile storage unit including random access memory (RAM) or the like, and temporarily stores data. For example, dynamic random access memory (DRAM) may be used as the RAM.

The input/output interface 2236 is an interface that connects to an external recording medium or the like.

The network interface 2237 is an interface that connects to an external network.

Here, the information processing device 2211 may be provided with a single processor or two or more processors as the processor 2231. As an example, the information processing device 2211 may be provided with a plurality of CPUs, and may achieve an overall process by having each of the CPUs respectively execute processes while also causing the plurality of CPUs to cooperate with each other.

Sixth Embodiment

The present embodiment describes an information processing device that can be used in a variety of information processing systems including the information processing systems (for example, the information processing systems 1 and 601) according to the first to fifth embodiments. Note that the information processing device according to the present embodiment may be the same as any of the information processing devices described in the first to fifth embodiments.

In the information processing system according to the first to fifth embodiments, a plurality of information processing devices successively transmit algorithm data by turns in a predetermined sequence. In this case, as a configuration example, the same program may be installed or the like in all of the information processing devices, such that all of the information processing devices are configured to have the same functions. The present embodiment describes an information processing device having such a configuration.

Figure 27:
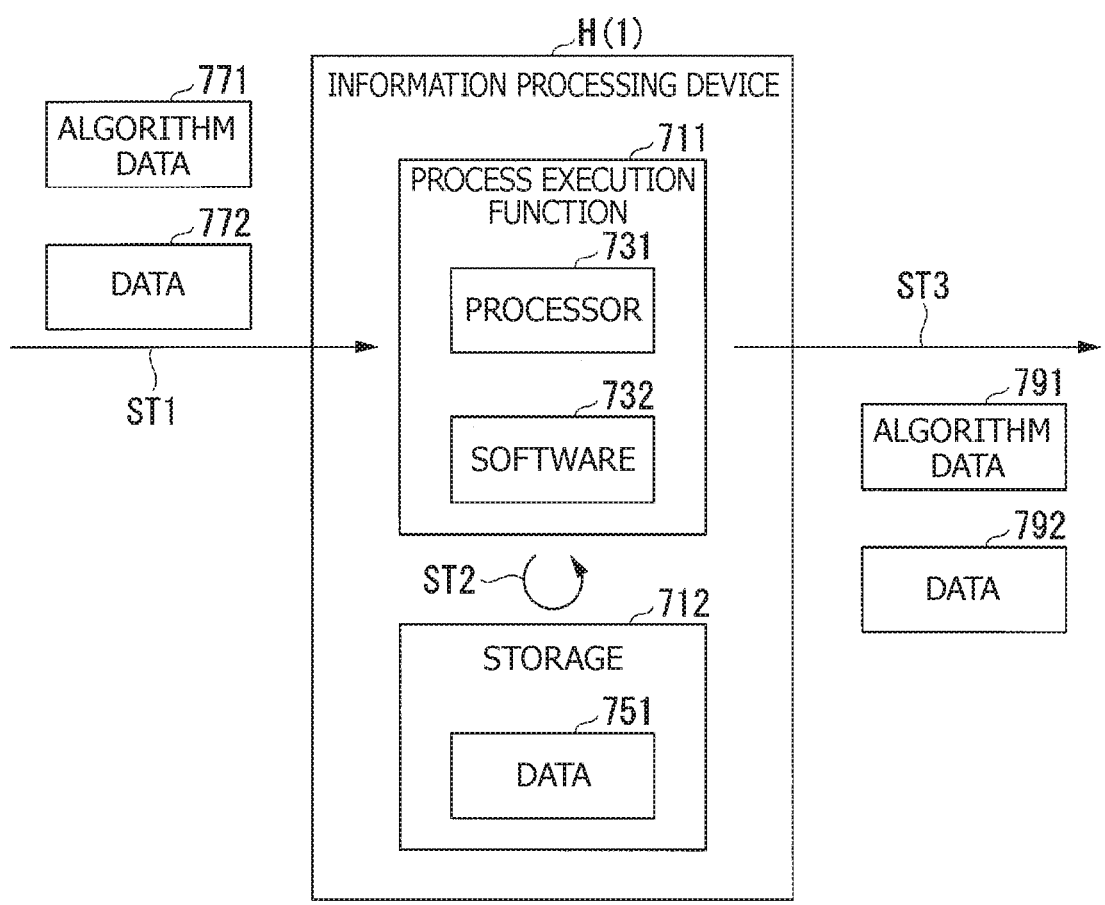
FIG. 27 is a diagram illustrating a schematic configuration example of an information processing device according to an embodiment (sixth embodiment) of the present invention.

FIG. 27 is a diagram illustrating a schematic configuration example of an information processing device H(1) according to an embodiment (sixth embodiment) of the present invention.

At this point, an overview of the functions of the information processing device H(1) will be described. Note that for each function of the information processing device H(1), a function similar to a function described in the first to fifth embodiments may be used, for example.

The information processing device H(1) is provided with a process execution function 711 and storage 712.

The process execution function 711 is provided with a processor 731 and software 732. The processor 731 is a CPU or the like. The software 732 includes a program. The program achieves a function of executing a process of successively transmitting algorithm data according to the present embodiment.

The process execution function 711 executes various processes by having the processor 731 read out and execute various processes.

Note that the software 732 may be stored in any storage unit, and for example may be stored in the storage 712 or in a different storage unit than the storage 712.

The storage 712 stores data 751.

Note that the storage 712 is one example of a storage unit, and any type of storage unit may be used as the storage 712.

In the information processing device H(1), the process execution function 711 executes a receiving process ST1, a computing process ST2, and a transmitting process ST3.

The receiving process ST1 is a process of receiving algorithm data 771 from another information processing device. The receiving process ST1 may also include a process of receiving data 772 (in the present embodiment, data other than the algorithm data 771) from the other information processing device. In the receiving process ST1, the data 772 may be received from another information processing device simultaneously with the algorithm data 771, or the data 772 may be received at a different timing than the algorithm data 771. Here, the process of receiving different data simultaneously may be a process of receiving different data at the same time (or at partially overlapping times), but in the present embodiment, may also include a process of receiving different data consecutively one after the other in time.

The computing process ST2 is a process of using the data 751 stored in the storage 712 to execute computations based on an algorithm stated in the algorithm data 771 received by the receiving process ST1.

As an example, the computing process ST2 applies the algorithm stated in the algorithm data 771 received by the receiving process ST1 to the data 751 retained in the information processing device H(1), and acquires a result of the computations.

The transmitting process ST3 is a process of receiving algorithm data 791 to another information processing device. The transmitting process ST3 may also include a process of transmitting data 792 (in the present embodiment, data other than the algorithm data 791) to the other information processing device. In the transmitting process ST3, the data 792 may be transmitted to another information processing device simultaneously with the algorithm data 791, or the data 792 may be transmitted at a different timing than the algorithm data 791. Here, the process of transmitting different data simultaneously may be a process of transmitting different data at the same time (or at partially overlapping times), but in the present embodiment, may also include a process of transmitting different data consecutively one after the other in time.

Herein, the data 772 in the receiving process ST1 may be any data, and for example may include data related to the result of computations executed in another information processing device.

Also, the data 792 in the transmitting process ST3 may be any data, and for example may include data related to the result of computations executed in the computing process ST2.

In the present embodiment, an information processing system provided with U (in the present embodiment, U is taken to be an integer equal to or greater than 2) information processing devices H(1) to H(U) having the same functions as the information processing device H(1) is constructed. The functions are achieved by installing the common software 732 in each of the information processing devices H(1) to H(U), for example.

Note that in the present embodiment, the U information processing devices H(1) to H(U) have similar functions. Consequently, in the present embodiment, the U information processing devices H(1) to H(U) will be described by referencing the same signs as those illustrated in FIG. 27 for convenience.

Through the common software 732, each of the information processing devices H(1) to H(U) has a function of executing the receiving process ST1, a function of executing the computing process ST2, and a function of executing the transmitting process ST3.

As an example, the U information processing devices H(1) to H(U) are capable of successively transmitting an algorithm in sequential order. In this case, each of the information processing devices H(1) to H(U) executes the receiving process ST1 of receiving the algorithm data 771 from the preceding information processing device (that is, one device upstream in the sequence), the computing process ST2 of executing computations based on the algorithm stated in the received algorithm data 771, and the transmitting process ST3 of transmitting the algorithm data 791 to the next information processing device (that is, one device downstream in the sequence). Note that the receiving process ST1 may also include a process of receiving the data 772 from an upstream information processing device. In addition, the transmitting process ST3 may also include a process of transmitting the data 792 to the next downstream information processing device.

Note that although the present embodiment describes the case in which the U information processing devices H(1) to H(U) sequentially transmit an algorithm in the above series order for the sake of simplicity, the U information processing devices H(1) to H(U) may be arranged sequentially in any order.

Furthermore, as another example, the U information processing devices H(1) to H(U) may also sequentially transmit an algorithm according to the order of any route in which both series and parallel sections are used.

As an example, if the computing process ST2 in the first information processing device H(1) is treated as the initial process, the execution of the computing process ST2 and the transmitting process ST3 by each of the information processing devices H(1) to H(U) may be considered to be performed consecutively in a predetermined sequence. Note that in this case, the receiving process ST1 by an information processing device on the receiving side is performed in correspondence with the transmitting process ST3 by an information processing device on the transmitting side.

As another example, if the transmitting process ST3 in the first information processing device H(1) is treated as the initial process, the execution of the receiving process ST1 and the computing process ST2 by the second information processing device H(2) to the Uth information processing device H(U) may be considered to be performed consecutively in a predetermined sequence. Note that in this case, the transmitting process ST3 by an information processing device on the transmitting side is performed in correspondence with the receiving process ST1 by an information processing device on the receiving side. Also, in this case, the algorithm data 791 may be transmitted from the Uth information processing device H(U) to the first information processing device H(1), and the first information processing device H(1) may perform the receiving process ST1 treating the algorithm data 791 as the algorithm data 771 to be received and the computing process ST2 of executing computations based on the algorithm stated in the received algorithm data 771, for example.

Here, the first information processing device H(1) may also be used as the next downstream information processing device with respect to the last (most downstream) information processing device H(U).

In this case, in a configuration in which the first (initial) information processing device H(1) performs the receiving process ST1 of receiving the algorithm data 791 transmitted from the last information processing device H(U) as the algorithm data 771, the U information processing devices H(1) to H(U) form a ring configured to transmit the algorithm on a looping route as an example.

Also, although each of the information processing devices H(1) to H(U) has the functions of executing the receiving process ST1, the computing process ST2, and the transmitting process ST3, each information processing device does not necessarily have to execute each of the processes.

As an example, in the case in which the first information processing device H(1) transmits an initial algorithm to the second information processing device H(2), the first information processing device H(1) does not have to execute the receiving process ST1. The first information processing device H(1) may generate the initial algorithm or receive the initial algorithm from another device, for example.

Also, each of the information processing devices H(1) to H(U) does not have to execute the computing process ST2.

As an example, the first information processing device H(1) does not have to execute the computing process ST2 based on the initial algorithm.

As an example, any of the information processing devices H(1) to H(U) may execute the receiving process ST1 of receiving the algorithm data 771 from an upstream information processing device, and execute the transmitting process ST3 of transmitting the algorithm data 791 stating an algorithm according to the algorithm stated in the received algorithm data 771 to the next downstream information processing device, without executing the computing process ST2 based on the algorithm stated in the algorithm data 771.

Also, each of the information processing devices H(1) to H(U) does not have to execute the transmitting process ST3.

As an example, the last information processing device H(U) does not have to transmit, to another information processing device, the algorithm data 791 stating an algorithm according to the algorithm stated in the algorithm data 771 received from an upstream information processing device.

In this way, in the present embodiment, the U information processing devices H(1) to H(U) having the common software 732 installed generally exist in a functionally equal relationship and possess the same functions as each other, but depending on the sequence on the route or other conditions, each information processing device may not execute some functions in some cases, or the content of the processes when executing some functions may be changed in some cases. Aspects in which the content of the processes are changed include, for example, aspects in which removals, additions, modifications, or the like are made to the content to be transmitted in the transmitting process ST3, aspects in which removals, additions, modifications, or the like are made to the content to be received in the receiving process ST1, and aspects in which removals, additions, modifications, or the like are made to the content to be computed in the computing process ST2.

As an example, in the case of receiving the algorithm data 771 from an upstream information processing device, executing computations based on an algorithm stated in the received algorithm data 771, and transmitting the algorithm data 791 stating an algorithm according to the received algorithm, none of the information processing devices H(1) to H(U) have to transmit data related to a result of the computations to the next downstream information processing device (whether simultaneously or at another timing). One example of a reason for adopting such a configuration is that in an information processing device that does not transmit data related to a result of the computations, it may be necessary to apply the action (computations) of the algorithm to data retained in the information processing device, but it may not be necessary to notify an external device of the result of the computations.

Note that even if such a reason exists, a configuration in which the information processing device transmits data related to a result of the computations to the next downstream information processing device may still be adopted. In this configuration, data expressing the success or failure of a process associated with the computations may be used as the data related to a result of the computations.

Note that although the present embodiment describes the case in which all of the information processing devices H(1) to H(U) are provided with the same functions, as an exception, some information processing devices may also be provided with different functions.

As an example, rights for becoming the first information processing device from which the initial algorithm originates may be provided. In this case, only one or more information processing devices given these rights from among the information processing devices H(1) to H(U) may become the first information processing device. The rights may be set according to any method. For example, information expressing the rights may be set by being stored or the like in the relevant information processing device(s).

Figure 28:
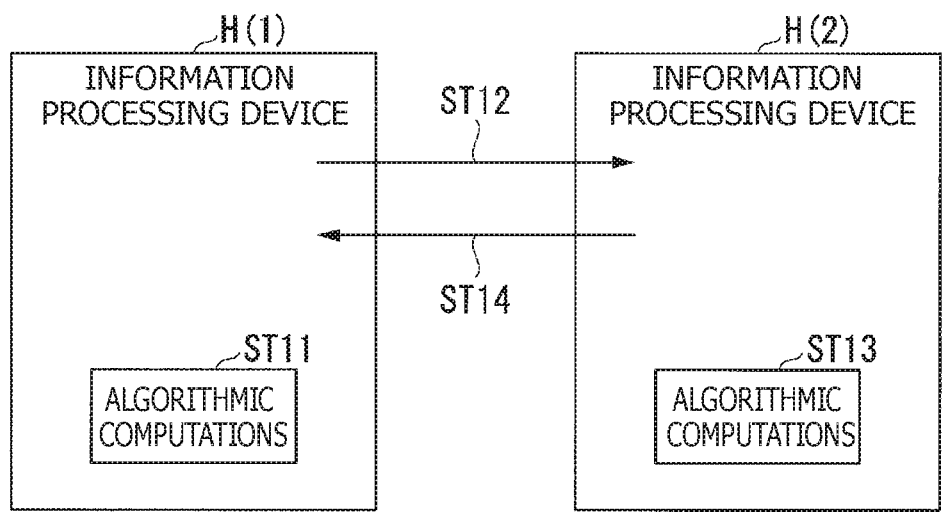
FIG. 28 is a diagram illustrating an example of a process performed in two information processing devices according to an embodiment (sixth embodiment) of the present invention.
Figure 29:
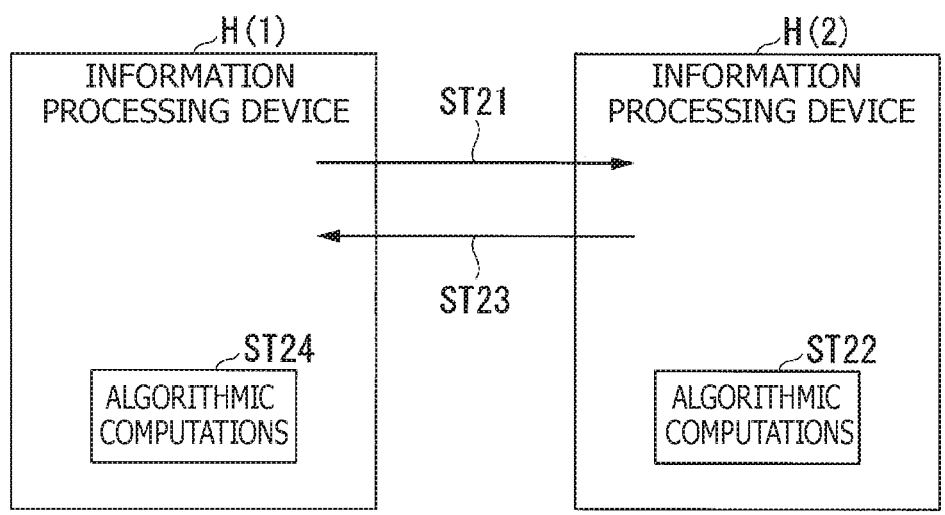
FIG. 29 is a diagram illustrating an example of a process performed in two information processing devices according to an embodiment (sixth embodiment) of the present invention.
Figure 30:
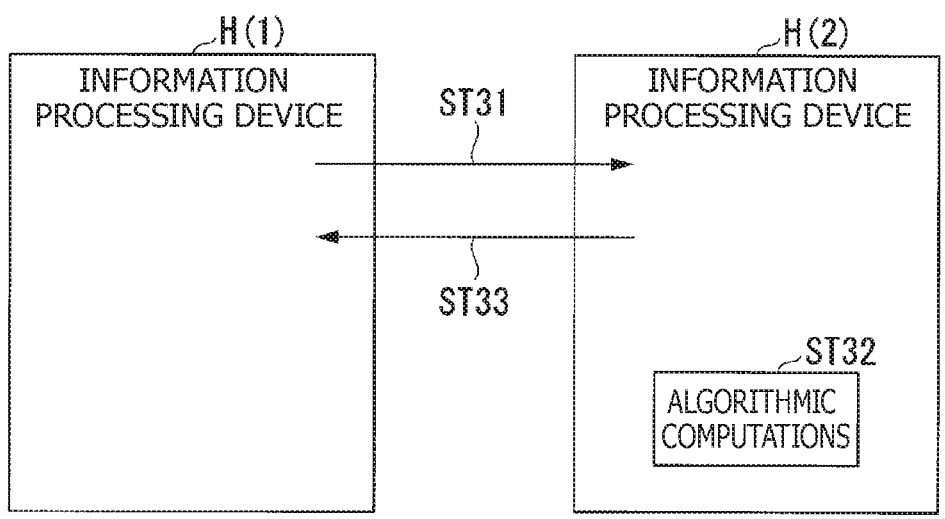
FIG. 30 is a diagram illustrating an example of a process performed in two information processing devices according to an embodiment (sixth embodiment) of the present invention.

Example of Processes in Information Processing System Provided with Two Information Processing Devices FIGS. 28 to 30 will be referenced to illustrate an example of processes in an information processing system provided with two information processing devices H(1) and H(2).

FIG. 28 is a diagram illustrating an example of processes in two information processing devices (in this example, the first information processing device H(1) and the second information processing device H(2)) according to an embodiment (sixth embodiment) of the present invention. This is an example of the minimum configuration, and is an example of a case of executing computations based on an algorithm in the first information processing device H(1).

In the example of FIG. 28, in a computing process ST11, the information processing device H(1) executes computations based on an initial algorithm.

Next, in a transmitting process ST12, the information processing device H(1) transmits algorithm data stating an algorithm according to the initial algorithm to the information processing device H(2). In response, in a receiving process (not illustrated), the information processing device H(2) receives the algorithm data transmitted from the information processing device H(1). In this case, data related to a result of the computations in the computing process ST11 or the like may be transmitted from the information processing device H(1) to the information processing device H(2) simultaneously with the algorithm data or at another timing.

In a computing process ST13, the information processing device H(2) executes computations based on the algorithm stated in the algorithm data received from the information processing device H(1).

Next, in a transmitting process ST14, the information processing device H(2) transmits algorithm data stating an algorithm according to the received algorithm to the information processing device H(1). In response, in a receiving process (not illustrated), the information processing device H(1) receives the algorithm data transmitted from the information processing device H(2). In this case, data related to a result of the computations in the computing process ST13 or the like may be transmitted from the information processing device H(2) to the information processing device H(1) simultaneously with the algorithm data or at another timing.

Note that the process of transmitting algorithm data from the information processing device H(2) to the information processing device H(1) does not have to be performed. For example, a process of transmitting data related to a result of the computations in the computing process ST13 or the like may be performed.

Here, in the present example, the first information processing device H(1) adopts a computing process rather than a receiving process as the initial process for transmitting an algorithm.

Also, in the present example, the first information processing device H(1) receives data (for example, algorithm data or other data) transmitted from the last, namely, the second, information processing device H(2).

Also, in the example of FIG. 28, the first information processing device H(1) plays a role of issuing a command regarding the transmission of an algorithm (here, a command giving an instruction to start transmission of an algorithm), for example.

Additionally, in the example of FIG. 28, the first information processing device H(1) also plays a role of receiving a notification of data related to a result regarding the transmission of an algorithm, and totalizing the data or the like, for example.

FIG. 29 is a diagram illustrating an example of processes in two information processing devices (in this example, the first information processing device H(1) and the second information processing device H(2)) according to an embodiment (sixth embodiment) of the present invention. This is another example of the minimum configuration, and is an example of a case of executing computations based on an algorithm in the first information processing device H(1).

In the example of FIG. 29, in a transmitting process ST21, the information processing device H(1) transmits algorithm data stating an algorithm according to the initial algorithm to the information processing device H(2). In response, in a receiving process (not illustrated), the information processing device H(2) receives the algorithm data transmitted from the information processing device H(1). In this case, other data may be transmitted from the information processing device H(1) to the information processing device H(2) simultaneously with the algorithm data or at another timing.

In a computing process ST22, the information processing device H(2) executes computations based on the algorithm stated in the algorithm data received from the information processing device H(1).

Next, in a transmitting process ST23, the information processing device H(2) transmits algorithm data stating an algorithm according to the received algorithm to the information processing device H(1). In response, in a receiving process (not illustrated), the information processing device H(1) receives the algorithm data transmitted from the information processing device H(2). In this case, data related to a result of the computations in the computing process ST22 or the like may be transmitted from the information processing device H(2) to the information processing device H(1) simultaneously with the algorithm data or at another timing.

In a computing process ST24, the information processing device H(1) executes computations based on the algorithm stated in the algorithm data received from the information processing device H(2).

Here, in the present example, the first information processing device H(1) adopts a transmitting process rather than a receiving process or a computing process as the initial process for transmitting an algorithm.

Also, in the present example, the first information processing device H(1) receives data (for example, algorithm data or other data) transmitted from the last, namely the second, information processing device H(2).

Also, in the example of FIG. 29, the first information processing device H(1) plays a role of issuing a command regarding the transmission of an algorithm (here, a command giving an instruction to start transmission of an algorithm), for example.

Additionally, in the example of FIG. 29, the first information processing device H(1) also plays a role of receiving a notification of data related to a result regarding the transmission of an algorithm, and totalizing the data or the like, for example.

FIG. 30 is a diagram illustrating an example of processes in two information processing devices (in this example, the first information processing device H(1) and the second information processing device H(2)) according to an embodiment (sixth embodiment) of the present invention. This is an example of the minimum configuration, and is an example of a case of not executing computations based on an algorithm in the first information processing device H(1).

In the example of FIG. 30, in a transmitting process ST31, the information processing device H(1) transmits algorithm data stating an algorithm according to the initial algorithm to the information processing device H(2). In response, in a receiving process (not illustrated), the information processing device H(2) receives the algorithm data transmitted from the information processing device H(1). In this case, other data may be transmitted from the information processing device H(1) to the information processing device H(2) simultaneously with the algorithm data or at another timing.

In a computing process ST32, the information processing device H(2) executes computations based on the algorithm stated in the algorithm data received from the information processing device H(1).

Next, in a transmitting process ST33, the information processing device H(2) transmits algorithm data stating an algorithm according to the received algorithm to the information processing device H(1). In response, in a receiving process (not illustrated), the information processing device H(1) receives the algorithm data transmitted from the information processing device H(2). In this case, data related to a result of the computations in the computing process ST32 or the like may be transmitted from the information processing device H(2) to the information processing device H(1) simultaneously with the algorithm data or at another timing.

Note that the process of transmitting algorithm data from the information processing device H(2) to the information processing device H(1) does not have to be performed. For example, a process of transmitting data related to a result of the computations in the computing process ST32 or the like may be performed.

Here, in the present example, the first information processing device H(1) adopts a transmitting process rather than a receiving process or a computing process as the initial process for transmitting an algorithm.

Also, in the present example, the first information processing device H(1) receives data (for example, algorithm data or other data) transmitted from the last, namely, the second, information processing device H(2).

Also, in the example of FIG. 30, the first information processing device H(1) plays a role of issuing a command regarding the transmission of an algorithm (here, a command giving an instruction to start transmission of an algorithm), for example.

Additionally, in the example of FIG. 30, the first information processing device H(1) also plays a role of receiving a notification of data related to a result regarding the transmission of an algorithm, and totalizing the data or the like, for example.

Examples of Application of Information Processing Devices According to Present Embodiment The information processing devices H(1) to H(U) according to the present embodiment may be applied to the information processing devices according to any of the aspects illustrated in the first embodiment to the fifth embodiment, and may also be applied to information processing devices according to another aspect. In such a case, the common software 732 illustrated in FIG. 27 includes information such as a program or parameters that achieve the functions to be included in the information processing devices applying the information processing devices H(1) to H(U) according to the present embodiment.

In the case in which the common software 732 is installed in each of the information processing devices H(1) to H(U), each of the information processing devices H(1) to H(U) may include a function of changing operation on the basis of a property such as the turn of each device itself (the information processing devices H(1) to H(U)) on the route along which the algorithm data is transmitted, for example.

As an example, each of the information processing devices H(1) to H(U) may also change operation according to the turn of each device itself. For example, in the case in which algorithm data is successively transmitted, each of the information processing devices H(1) to H(U) successively transmits information enabling each of the information processing devices H(1) to H(U) to ascertain the turn of each device itself (the information processing devices H(1) to H(U)). For a certain information processing device, the information may be information expressing the turn of an upstream information processing device or information expressing the turn of the certain information processing device (itself), for example. Each of the information processing devices H(1) to H(U) determines (decides) the turn of each device itself (the information processing devices H(1) to H(U)) on the basis of the information received from an upstream information processing device.

Here, as an aspect in which operation is different depending on the turn on the route, an aspect may be used in which the operation of the first is different from the operations from the second to the last, an aspect may be used in which the operation of the first, the operations from the second to the next-to-last, and the operation of the last are different, or another aspect may be used.

As an example, each of the information processing devices H(1) to H(U) may change operation according to an element other than the turn of each device itself (the information processing devices H(1) to H(U)). As the element, the date, the time, an attribute of each device itself (the information processing devices H(1) to H(U)), a result of a predetermined determination performed in each device itself (the information processing devices H(1) to H(U)), or at least a portion of data stored in each device itself (the information processing devices H(1) to H(U)) may be used, or at least a portion of data received from an upstream information processing device may be used, for example.

Also, each of the information processing devices H(1) to H(U) may change operation according to both the turn of each device itself (the information processing devices H(1) to H(U)) and another element.

Also, the first information processing device H(1) may start operating as the first in response to a predetermined operation performed by a user, or start operating as the first in response to a predetermined condition being satisfied in the common software 732, for example.

About Foregoing Embodiments

Configuration Examples According to One Example

The following illustrates (Configuration example 1-1) to (Configuration example 1-27).

(Configuration example 1-1) An information processing device (in the example of FIG. 27, the information processing device H(1)) is provided with a data receiving unit (a function unit that receives data, such as a communication unit, for example) having a function of receiving first algorithm data (in the example of FIG. 27, the algorithm data 771) that is data stating a first algorithm from a first information processing device (in the example of FIG. 27, an upstream information processing device), a computation execution unit (a function unit that executes computations) having a function of executing computations on the basis of the first algorithm data received by the data receiving unit and data (in the example of FIG. 27, the data 751) stored in a first storage unit (in the example of FIG. 27, the storage 712), and a data transmitting unit (a function unit that transmits data, such as a communication unit, for example) having a function of transmitting second algorithm data (in the example of FIG. 27, the algorithm data 791) that is data stating a second algorithm according to the first algorithm to a second information processing device (in the example of FIG. 27, a downstream information processing device).

(Configuration example 1-2) The information processing device (for example, the first information processing device) described in (Configuration example 1-1), wherein the data transmitting unit has a function of transmitting third algorithm data that is data stating an initial third algorithm to a next information processing device.

(Configuration example 1-3) The information processing device described in (Configuration example 1-2), wherein the computation execution unit has a function of executing computations on the basis of a fourth algorithm, and the data transmitting unit has a function of treating an algorithm according to the fourth algorithm as the third algorithm and transmitting the third algorithm data to the next information processing device.

(Configuration example 1-4) The information processing device described in (Configuration example 1-2) or (Configuration example 1-3), further provided with a first route decision unit (a function unit that decides an entire route) having a function of deciding all information processing devices (in the example of FIG. 27, the information processing devices H(1) to H(U)) to be included on a route along which an algorithm according to the third algorithm is transmitted and also deciding a sequence of transmission.

(Configuration example 1-5) The information processing device described in (Configuration example 1-4), wherein the first route decision unit has a function of deciding the information processing devices and the sequence on the basis of an attribute of the information processing devices.

(Configuration example 1-6) The information processing device described in any one of (Configuration example 1-1) to (Configuration example 1-5), further provided with a second route decision unit (a function unit that decides at least a part of a route) having a function of deciding one or more information processing devices, including the second information processing device, to be included on a route along which an algorithm according to the second algorithm is transmitted and also deciding a sequence of transmission.

(Configuration example 1-7) The information processing device described in (Configuration example 1-6), wherein the second route decision unit has a function of deciding the information processing device(s) and the sequence on the basis of an attribute of the information processing device(s).

(Configuration example 1-8) The information processing device described in any one of (Configuration example 1-1) to (Configuration example 1-7), wherein the second algorithm is the same as the first algorithm.

(Configuration example 1-9) The information processing device described in any one of (Configuration example 1-1) to (Configuration example 1-7), wherein the second algorithm is different from the first algorithm.

(Configuration example 1-10) The information processing device described in any one of (Configuration example 1-1) to (Configuration example 1-9), wherein the data receiving unit has a function of receiving data related to a result of computations in the first information processing device from the first information processing device.

(Configuration example 1-11) The information processing device described in (Configuration example 1-10), wherein the data receiving unit has a function of receiving data related to a result of computations in the first information processing device and the first algorithm data simultaneously from the first information processing device.

(Configuration example 1-12) The information processing device described in any one of (Configuration example 1-1) to (Configuration example 1-11), wherein the data transmitting unit has a function of transmitting data related to a result of the computations by the computation execution unit to the second information processing device.

(Configuration example 1-13) The information processing device described in (Configuration example 1-12), wherein the data transmitting unit has a function of transmitting data related to a result of the computations by the computation execution unit and the second algorithm data simultaneously to the second information processing device.

(Configuration example 1-14) The information processing device described in any one of (Configuration example 1-1) to (Configuration example 1-13), further provided with a first storage unit that stores data, wherein the computation execution unit has a function of executing computations using the data stored in the first storage unit.

(Configuration example 1-15) The information processing device described in any one of (Configuration example 1-1) to (Configuration example 1-14), wherein the data transmitting unit has a function of transmitting data related to a result of the computations by the computation execution unit to one or more predetermined information processing devices treated as a notification target.

(Configuration example 1-16) The information processing device described in (Configuration example 1-15), wherein the predetermined information processing device(s) at least includes the information processing device from which the algorithm data originated (in the example of FIG. 27, the first information processing device).

(Configuration example 1-17) The information processing device described in any one of (Configuration example 1-1) to (Configuration example 1-16), further provided with a first computational result determination unit (a function unit that makes such a determination) having a function of determining whether or not to treat data related to a result of computations by the computation execution unit as final data.

(Configuration example 1-18) The information processing device described in any one of (Configuration example 1-1) to (Configuration example 1-17), wherein the second algorithm data is transmitted to the second information processing device and at least one other information processing device.

(Configuration example 1-19) The information processing device described in (Configuration example 1-18), further provided with a second computational result determination unit (a function unit that makes such a determination) having a function of making a predetermined determination regarding data related to a result of computations with respect to two or more information processing devices from which the second algorithm data is transmitted.

(Configuration example 1-20) The information processing device described in any one of (Configuration example 1-1) to (Configuration example 1-19), wherein the data receiving unit receives data transmitted from another device, and the computation execution unit executes computations on the basis of the data received from the other device by the data receiving unit.

(Configuration example 1-21) The information processing device described in (Configuration example 1-20), wherein the other device is a device other than a target to which the algorithm is transmitted (a device not included on the route).

(Configuration example 1-22) The information processing device described in any one of (Configuration example 1-1) to (Configuration example 1-21), further provided with a second storage unit that stores some or all of the data received by the data receiving unit.

(Configuration example 1-23) The information processing device described in any one of (Configuration example 1-1) to (Configuration example 1-22), further provided with a third storage unit that stores some or all of the data transmitted by the data transmitting unit.

(Configuration example 1-24) An information processing method includes receiving first algorithm data, which is data stating a first algorithm, from a first information processing device, executing computations on the basis of the received first algorithm data and data stored in a first storage unit, and transmitting second algorithm data, which is data stating a second algorithm according to the first algorithm, to a second information processing device.

(Configuration example 1-25) A program causes a computer included in an information processing device to achieve a function of receiving first algorithm data, which is data stating a first algorithm, from a first information processing device, a function of executing computations on the basis of the received first algorithm data and data stored in a first storage unit, and a function of transmitting second algorithm data, which is data stating a second algorithm according to the first algorithm, to a second information processing device.

(Configuration example 1-26) In an information processing system, a plurality of information processing devices successively transmit algorithm data, which is data stating an algorithm, in a predetermined sequence, and at least one of the information processing devices executes computations based on the algorithm.

(Configuration example 1-27) In an information processing method, a plurality of information processing devices successively transmit algorithm data, which is data stating an algorithm, in a predetermined sequence, and at least one of the information processing devices executes computations based on the algorithm.

Configuration Examples According to Another Example

The following illustrates (Configuration example 2-1) to (Configuration example 2-16). For convenience, the description herein distinguishes among three types of information processing devices, namely a γfirst information processing device, a γsecond information processing device, and a γthird information processing device. An information processing device having any one set of functions from among these three types may be implemented, information processing devices having any two sets of functions from among these three types may be implemented, or information processing devices having the functions of all three types may be implemented, for example.

(Configuration example 2-1) An information processing system (in the example of FIG. 1, the information processing system 1) is provided with a plurality of information processing devices, including a γfirst information processing device (in the example of FIG. 1, the information processing device A(1)), a γsecond information processing device one turn downstream from the γfirst information processing device (in the example of FIG. 1, the information processing device A(2)), and one or more γthird information processing devices one or more turns downstream from the γsecond information processing device (in the example of FIG. 1, the information processing devices A(3) to A(N)). The γfirst information processing device transmits algorithm data that is data stating a predetermined algorithm (in the example of FIG. 1, the algorithm data a(1)) to the γsecond information processing device.

The γsecond information processing device executes computations on the basis of the algorithm data received from the γfirst information processing device and data stored in the γsecond information processing device (in the example of FIG. 3, the data 251), and transmits algorithm data that is data stating an algorithm according to the received algorithm (in the example of FIG. 1, the algorithm data a(2)) and data related to a result of the computations (in the example of FIG. 1, the computational result data b(1)) to the first downstream information processing device among the γthird information processing devices (in the example of FIG. 1, the information processing device A(3)).

(Configuration example 2-2) The information processing system described in (Configuration example 2-1), wherein two or more γthird information processing devices exist, and each γthird information processing device executes computations on the basis of the algorithm data received from the information processing device one turn upstream and data stored in the γthird information processing device, and acquires data related to a result of the computations.

(Configuration example 2-3) The information processing system described in (Configuration example 2-2), wherein each γthird information processing device other than the most downstream transmits algorithm data that is data stating an algorithm according to the algorithm stated in the algorithm data received from the information processing device one turn upstream and data related to a result of the computations to the information processing device one turn downstream.

(Configuration example 2-4) The information processing system described in any one of (Configuration example 2-1) to (Configuration example 2-3), wherein the γfirst information processing device decides all information processing devices to be included on a route that includes the γsecond information processing device and the γthird information processing device(s) (in the example of FIG. 1, the information processing device A(1) itself and the other information processing devices A(2) to A(N)).

(Configuration example 2-5) The information processing system described in any one of (Configuration example 2-1) to (Configuration example 2-3), wherein with regard to the route that includes the γsecond information processing device and the γthird information processing device(s), at least one information processing device among the γsecond information processing device and the γthird information processing device(s) decides the information processing device one turn downstream (for example, the example of FIG. 1).

(Configuration example 2-6) The information processing system described in (Configuration example 2-5), wherein at least one information processing device among the γthird information processing device(s) (for example, the information processing device B(z) illustrated in FIG. 14) determines whether or not the obtained result of the computations satisfies a predetermined basis, and treats the result of the computations as a final result of the computations upon determining that the result of the computations satisfies the basis.

(Configuration example 2-7) The information processing system described in any one of (Configuration example 2-4) to (Configuration example 2-6), wherein a method of deciding the information processing devices on the basis of information about attributes of the information processing devices (for example, the attribute information illustrated in FIG. 5) is used as the method of deciding the information processing devices.

(Configuration example 2-8) The information processing system described in any one of (Configuration example 2-4) to (Configuration example 2-7), wherein two or more branched route sections exist on the route, and at least one information processing device among the γthird information processing device(s) (for example, the information processing device C(5) illustrated in FIG. 16) makes a predetermined determination regarding the results of computations obtained in information processing devices on different branches.

(Configuration example 2-9) The information processing system described in any one of (Configuration example 2-4) to (Configuration example 2-8), wherein data (in the example of FIG. 22, the data p(1) to p(P) and q(1) to q(Q)) stored in devices not included on the route (in the example of FIG. 22, the information processing devices F(1) to F(P) and G(1) to G(Q)) is transmitted to at least one information processing device among the γsecond information processing device and the γthird information processing device(s) included on the route (in the example of FIG. 22, the information processing devices E(2) and E(M)), the data is stored in the at least one information processing device, and the data is used in computations by the at least one information processing device.

(Configuration example 2-10) The information processing system described in any one of (Configuration example 2-2) to (Configuration example 2-9), wherein the most downstream information processing device of the γthird information processing device(s) (in the example of FIG. 1, the information processing device A(N)) transmits data related to the acquired result of the computations to the γfirst information processing device or another device.

(Configuration example 2-11) The information processing system described in any one of (Configuration example 2-2) to (Configuration example 2-10), wherein at least one information processing device among the γsecond information processing device and γthird information processing device(s) stores some or all of the data received from the information processing device one turn upstream or the data transmitted to the information processing device one turn downstream (for example, the example of FIG. 1).

(Configuration example 2-12) The information processing system described in any one of (Configuration example 2-2) to (Configuration example 2-11), wherein all of the γsecond information processing device and the γthird information processing device(s) execute computations on the basis of algorithm data stating the same algorithm (in the example of FIG. 9, the algorithm c).

(Configuration example 2-13) The information processing system described in any one of (Configuration example 2-2) to (Configuration example 2-11), wherein at least one information processing device among the γsecond information processing device and the γthird information processing device(s) executes computations on the basis of algorithm data stating a different algorithm (in the example of FIG. 13, the algorithms e(1) to e(N−1)).

(Configuration example 2-14) The information processing system described in (Configuration example 2-13), wherein the information processing device one turn upstream from the at least one information processing device generates algorithm data stating the different algorithm (for example, the example of FIG. 13).

(Configuration example 2-15) An information processing method performed by a plurality of information processing devices including a γfirst information processing device, a γsecond information processing device one turn downstream from the γfirst information processing device, and one or more γthird information processing devices one or more turns downstream from the γsecond information processing device, wherein the γfirst information processing device transmits algorithm data that is data stating a predetermined algorithm to the γsecond information processing device, the γsecond information processing device executes computations on the basis of the algorithm data received from the γfirst information processing device and data stored in the γsecond information processing device, and transmits algorithm data that is data stating an algorithm according to the received algorithm and data related to a result of the computations to the first downstream information processing device among the γthird information processing device(s).

(Configuration example 2-16) A program causing a computer included in an information processing device to achieve a function of executing computations on the basis of algorithm data that is data stating a predetermined algorithm received from an information processing device one turn upstream and data stored in a storage unit (in the example of FIG. 26, the storage device 2234 or the memory 2235, for example), and a function of transmitting algorithm data that is data stating an algorithm according to the received algorithm and data related to a result of the computations to an information processing device one turn downstream.

Configuration Examples According to Another Example

The following illustrates (Configuration example 3-1) to (Configuration example 3-14).

(Configuration example 3-1) An information processing system provided with a plurality of information processing devices including a first information processing device, a second information processing device, and a third information processing device, wherein the first information processing device transmits first algorithm data that is data stating a first algorithm to the second information processing device, and the second information processing device executes computations on the basis of the first algorithm data received from the first information processing device and data stored in the second information processing device, and transmits second algorithm data that is data stating a second algorithm according to the first algorithm and data related to a result of the computations to the third information processing device.

(Configuration example 3-2) The information processing system described in (Configuration example 3-1), wherein, provided that W is an integer equal to or greater than 3, w is an integer from 1 to W, and each of W information processing devices is designated the wth information processing device, algorithms are transmitted on a route from the first information processing device to the Wth information processing device.

(Configuration example 3-3) The information processing system described in (Configuration example 3-2), wherein the first information processing device decides all of the information processing devices to be included on the route.

(Configuration example 3-4) The information processing system described in (Configuration example 3-2), wherein, for w from 2 to (W−1), at least one wth information processing device decides the next information processing device to which an algorithm is to be transmitted, namely the (w+1)th information processing device.

(Configuration example 3-5) The information processing system described in (Configuration example 3-4), wherein the Wth information processing device determines whether or not the obtained result of the computations satisfies a predetermined basis, and treats the result of the computations as a final result of the computations upon determining that the result of the computations satisfies the basis.

(Configuration example 3-6) The information processing system described in any one of (Configuration example 3-3) to (Configuration example 3-5), wherein a method of deciding the information processing devices on the basis of information about attributes of the information processing devices is used as the method of deciding the information processing devices.

(Configuration example 3-7) The information processing system described in any one of (Configuration example 3-2) to (Configuration example 3-6), wherein the Wth information processing device executes computations on the basis of the (W−1)th algorithm data received from the (W−1)th information processing device and data stored in the Wth information processing device, and transmits data related to a result of the computations to the first information processing device or another device.

(Configuration example 3-8) The information processing system described in any one of (Configuration example 3-2) to (Configuration example 3-6), wherein, in the case in which W is 4 or greater, for w from 3 to (W−1), the wth information processing device executes computations on the basis of the (w−1)th algorithm data received from the (w−1)th information processing device and data stored in the wth information processing device, and transmits wth algorithm data that is data stating a wth algorithm according to the (w−1)th algorithm stated in the (w−1)th algorithm data and data related to a result of the computations to the (w+1)th information processing device.

(Configuration example 3-9) The information processing system described in any one of (Configuration example 3-2) to (Configuration example 3-8), wherein for w from 2 to W, at least one wth information processing device stores some or all of the received data or the transmitted data.

(Configuration example 3-10) The information processing system described in any one of (Configuration example 3-2) to (Configuration example 3-9), wherein for w from 2 to W, all of the wth information processing devices execute computations on the basis of algorithm data stating the same algorithm.

(Configuration example 3-11) The information processing system described in any one of (Configuration example 3-2) to (Configuration example 3-10), wherein for w from 2 to W, at least one wth information processing device executes computations on the basis of algorithm data stating a different algorithm.

(Configuration example 3-12) The information processing system described in (Configuration example 3-11), wherein for w from 3 to W, at least one (w−1)th information processing device one turn upstream from the wth information processing device generates the algorithm data stating a different algorithm to be transmitted to the next wth information processing device.

(Configuration example 3-13) The information processing system described in any one of (Configuration example 3-2) to (Configuration example 3-12), wherein two or more branched route sections exist on the route, and a predetermined determination is made regarding the results of the computations obtained in the information processing devices on different branches.

(Configuration example 3-14) The information processing system described in any one of (Configuration example 3-2) to (Configuration example 3-13), wherein data stored in a device not included on the route is transmitted to the information processing device included on the route, the data is stored in the information processing device, and the data is used in the computations in the information processing device.

Note that in the description herein, two information processing devices with adjacent values of w are taken to exist in an upstream-downstream relationship with each other, but this is for convenience, and the information processing devices do not necessarily exist in such a relationship. Specifically, the description of a route on which W information processing devices are arranged sequentially for w=1 to W in series order is an example of a simple description, but in cases where two or more information processing devices exist on branched route sections, areas may occur where two information processing devices have adjacent values of w but do not exist in an upstream-downstream relationship with each other.

As above, a program for achieving the functions of a device according to an embodiment (such as the information processing devices 2031 to 2035, 2051 to 2055, 2211, A(1) to A(N), B(z), C(1) to C(7), D(1) to D(4), E(1) to E(m), F(1) to F(P), G(1) to G(Q), and H(1) to H(U), and the terminal devices 2111 to 2118, for example) may be recorded (stored) on a computer-readable recording medium (storage medium), and processes can be performed by causing a computer system to load and execute the program recorded on the recording medium.

Note that the "computer system" referred to here may be one that includes an operating system or hardware such as peripheral equipment.

Also, the "computer-readable recording medium" refers to a portable medium such as a flexible disk, a magneto-optical disc, read-only memory (ROM), writable non-volatile memory such as flash memory, or a Digital Versatile Disc (DVD), or refers to a storage device such as a hard disk built into the computer system.

Furthermore, the term "computer-readable recording medium" also encompasses a medium that holds the program for a fixed length of time, such as volatile memory (for example, DRAM) internal to a computer system that acts as a server or a client in the case in which the program is transmitted over a network such as the Internet or a communication channel such as a telephone circuit.

In addition, the program may also be transmitted from a computer system storing the program in a storage device or the like to another computer system through a transmission medium or by a wave transmitted through the transmission medium. Here, the "transmission medium" that transmits the program refers to a medium that has a function of transmitting information, like a network (communication network) such as the Internet or a communication channel (communication line) such as a telephone circuit.

The program may also be one for achieving a portion of the functions described above. Furthermore, the program may also be what is called a difference file (difference program) capable of achieving the functions described above in combination with a program already recorded in the computer system.

Note that although the foregoing describes the present invention using embodiments, technical scope of the present invention is not limited to these embodiments. It will be apparent to those skilled in the art that various changes and alternatives can be adopted without departing from the spirit and scope of the present invention.

REFERENCE SIGNS LIST

1, 601 information processing system
111, 211, 311, 411 input unit
112, 212, 312, 412 output unit
113, 213, 313, 413 storage unit
114, 214, 314, 414 communication unit
115, 215, 315, 415, 511 control unit
131, 233, 434 algorithm generation unit
132 information processing device search unit
133, 234, 435 route decision unit
134, 235, 436 algorithm transmission control unit
135 computational result acquisition unit
151, 251, 351, 451, k1 to k3, p(1) to p(P), q(1) to q(Q) data
231, 331, 431 algorithm acquisition unit
232, 332, 432 computation execution unit
333, 437 notification destination decision unit
334, 438 computational result notification control unit
433, 532 computational result determination unit
501 layered portion
531 processing unit group
711 process execution function
712 storage
731, 2231 processor
732 software
751, 772, 792 data
771, 791, a(1) to a(N−1), g, g(1) to g(7), m(1) to m(M−1) algorithm data
2001, 2101 communication system
2011, 2012 network
2111 to 2118 terminal device
2031 to 2035, 2051 to 2055, 2211, A(1) to A(N), B(z), C(1) to C(7), D(1) to D(4), E(1) to E(m), F(1) to F(P), G(1) to G(Q), H(1), H(2) information processing device
2232 operation unit
2233 display unit
2234 storage device
2235 memory
2236 input/output interface
2237 network interface 3011 information processing device table
4011, 4111, 4211 transmission data
4031, 4131, c, e(1) to e(N−1) algorithm
4032, 4132 parameters
4133, 4231, d(1) to d(N−1), f(1) to f(N−1) computational result
b(1) to b(N−1), h, h(1) to h(7), n(1) to n(M−1) computational result data

The invention claimed is:

1. An information processing unit comprising:
a data receiving unit which has the function of receiving first algorithm data that is data stating a first algorithm from a first information processing device;
a computation executing unit having a function of executing computations based on the first algorithm stated in the first algorithm data received by the data receiving unit and using data stored in a first storage unit in the computations on a basis of the first algorithm data and the data stored in the first storage unit; and
a data transmitting unit having a function of transmitting second algorithm data that is data stating a second algorithm according to the first algorithm to a second information processing device, wherein
the second algorithm data is transmitted to the second information processing device and at least one other information processing device,
for the two or more information processing devices to which the second algorithm data is transmitted, a second computational result determination unit having a function of making a predetermined determination regarding data related to a result of the computations, is provided, and
the second computational result determination unit has a function of performing a process on the data related to a result of the computations received from the two or more information processing devices to which the second algorithm data is transmitted in a branched manner from the information processing device different from the information processing device provided with the second computational result determination unit itself, the process being any of a process of determining a number of the information processing devices traversed after branching, and adopting a predetermined number of pieces of the data related to a result of the computations in order of the largest number of traversed information processing devices; a process of determining a time at which the data related to a result of the computations is received and preferentially adopting the data related to a result of the computations having an earlier time; a process of determining a time at which the data related to a result of the computations is received and preferentially adopting the data related to a result of the computations having a later time; and a process of determining whether or not a specific information processing device has been traversed after branching and preferentially adopting the data related to a result of the computations that has traversed the specific information processing device.

2. The information processing device according to claim 1, wherein
the data transmitting unit has a function of transmitting third algorithm data that is data stating an initial third algorithm to a next information processing device.

3. The information processing device according to claim 1, further comprising:
a second route decision unit having a function of deciding one or more information processing devices, including the second information processing device, to be included on a route along which an algorithm according to the second algorithm is transmitted and also deciding a sequence of transmission.

4. The information processing device according to claim 1, wherein
the data receiving unit has a function of receiving data related to a result of computations in the first information processing device from the first information processing device.

5. The information processing device according to claim 1, wherein
the data transmitting unit has a function of transmitting data related to a result of the computations by the computation execution unit to the second information processing device.

6. The information processing device according to claim 1, further comprising:
a first storage unit that stores data, wherein
the computation execution unit has a function of executing the computations using the data stored in the first storage unit.

7. The information processing device according to claim 1, wherein
the data transmitting unit has a function of transmitting data related to a result of the computations by the computation execution unit to one or more predetermined information processing devices treated as a notification target.

8. The information processing device according to claim 1, further comprising:
a first computational result determination unit having a function of determining whether or not to treat data related to a result of the computations by the computation execution unit as final data.

9. The information processing device according to claim 1, wherein
the data receiving unit receives data transmitted from another device, and
the computation execution unit executes the computations on a basis of the data received from the other device by the data receiving unit.

10. An information processing method comprising:
receiving first algorithm data that is data stating a first algorithm from a first information processing device;
executing computations based on the first algorithm stated in the received first algorithm data and using data stored in a first storage unit in the computations on a basis of the first algorithm data and the data stored in the first storage unit;
transmitting second algorithm data that is data stating a second algorithm according to the first algorithm to a second information processing device and at least one other information processing device; and
for the two or more information processing devices to which the second algorithm data is transmitted, performing a process on the data related to a result of the computations received from the two or more information processing devices to which the second algorithm data is transmitted in a branched manner from the information processing device different from the information processing device performing the process itself, the process being any of a process of determining a number of the information processing devices traversed after branching, and adopting a predetermined number of pieces of the data related to a result of the computations in order of the largest number of traversed information processing devices; a process of determining a time at which the data related to a result of the computations is received, and preferentially adopting the data related to a result of the computations having an earlier time; a process of determining a time at which the data related to a result of the computations is received, and preferentially adopting the data related to a result of the computations having a later time; and a process of determining whether or not a specific information processing device has been traversed after branching, and preferentially adopting the data related to a result of the computations that has traversed the specific information processing device.

* * * * *